US010313045B2

(12) United States Patent
Xiao et al.

(10) Patent No.: US 10,313,045 B2
(45) Date of Patent: Jun. 4, 2019

(54) WAVELENGTH-DIVISION MULTIPLEXING OPTICAL ASSEMBLY WITH INCREASED LANE DENSITY

(71) Applicant: Alliance Fiber Optic Products, Inc., Sunnyvale, CA (US)

(72) Inventors: Qijun Xiao, Fremont, CA (US); Shudong Xiao, Fremont, CA (US); Andy Fenglei Zhou, Fremont, CA (US); Dong Gui, San Jose, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/482,162

(22) Filed: Apr. 7, 2017

(65) Prior Publication Data
US 2018/0139520 A1    May 17, 2018

Related U.S. Application Data

(60) Provisional application No. 62/461,532, filed on Feb. 21, 2017, provisional application No. 62/461,521, (Continued)

(51) Int. Cl.
*G02B 6/293* (2006.01)
*H04J 14/02* (2006.01)

(52) U.S. Cl.
CPC ............ *H04J 14/02* (2013.01); *G02B 6/2938* (2013.01)

(58) Field of Classification Search
CPC .............. G02B 6/29367; G02B 6/2938; G02B 6/29365; G02B 6/4214; G02B 6/125; H04J 14/02; H04J 14/0202
See application file for complete search history.

(56) References Cited

U.S. PATENT DOCUMENTS 5,583,683 A * 12/1996 Scobey .................. G02B 5/288
359/587
6,167,171 A * 12/2000 Grasis .................. G02B 6/2938
385/24
(Continued)

FOREIGN PATENT DOCUMENTS

CN        102684794 A      9/2012
CN        106094118 A     11/2016
(Continued)

OTHER PUBLICATIONS

"Port." Hargrave's Communications Dictionary, Wiley, Frank Hargrave, Wiley, 1st edition, 2001. Credo Reference, https://search.credoreference.com/content/entry/hargravecomms/port/0?institutionId=743. Accessed Oct. 15, 2018.*

(Continued)

*Primary Examiner* — Tanya T Motsinger
(74) *Attorney, Agent, or Firm* — Adam R. Weeks

(57) ABSTRACT

A wavelength-division multiplexing (WDM) optical assembly with increased lane density is disclosed herein. The WDM optical assembly includes a WDM optical core subassembly including an optical signal router for routing an optical signal between a first side and a second side of a substrate. The WDM optical core subassembly further includes a first WDM filter having a first passband and a second WDM filter having a second passband. The WDM optical core subassembly forms a first optical path between a first common port, the first WDM filter, and a first channel port, and to form a second optical path between the second WDM filter, a second common port, and a second channel port. The WDM optical core subassembly increases lane density while decreasing size and complexity by including a plurality of common ports in optical communication with the same plurality of WDM filters.

20 Claims, 29 Drawing Sheets

Related U.S. Application Data filed on Feb. 21, 2017, provisional application No. 62/453,643, filed on Feb. 2, 2017.

(56) References Cited

U.S. PATENT DOCUMENTS

| | | | | |
|---|---|---|---|---|
| 6,198,857 B1* | 3/2001 | Grasis | ................ | G02B 6/29365 385/24 |
| 6,301,407 B1* | 10/2001 | Donaldson | ......... | G02B 6/29365 385/16 |
| 6,421,481 B1 | 7/2002 | Sappey | | |
| 7,843,644 B1* | 11/2010 | Wang | .................... | G02B 6/262 359/641 |
| 8,351,791 B1 | 1/2013 | Wang et al. | | |
| 9,401,773 B1* | 7/2016 | Gui | .......................... | G02B 6/42 |
| 9,551,833 B1* | 1/2017 | Li | ........................... | H04J 14/02 |
| 2003/0099434 A1* | 5/2003 | Liu | .................... | G02B 6/29367 385/31 |
| 2004/0005115 A1 | 1/2004 | Luo et al. | | |
| 2004/0076436 A1 | 4/2004 | Bergmann et al. | | |
| 2010/0329678 A1* | 12/2010 | Wang | ................ | G02B 6/29367 398/79 |
| 2017/0054507 A1* | 2/2017 | Elahmadi | .............. | H04L 7/0075 |
| 2017/0093488 A1* | 3/2017 | Wang | ............... | H04B 10/07955 |
| 2017/0254958 A1* | 9/2017 | Yue | ........................ | G02B 6/327 |
| 2017/0269314 A1* | 9/2017 | Gaal | ..................... | H05K 7/2039 |
| 2017/0276889 A1* | 9/2017 | Baba | ........................ | G02B 6/32 |
| 2017/0307819 A1* | 10/2017 | Ho | ..................... | G02B 6/12016 |
| 2018/0041280 A1* | 2/2018 | Elahmadi | ........... | H04B 10/6162 |
| 2018/0052289 A1* | 2/2018 | Lin | ..................... | G02B 6/12019 |
| 2018/0059340 A1* | 3/2018 | Lin | ..................... | G02B 6/29362 |
| 2018/0062756 A1* | 3/2018 | Ho | ....................... | H04B 10/572 |
| 2018/0139520 A1* | 5/2018 | Xiao | .................. | H04Q 11/0005 |
| 2018/0172928 A1* | 6/2018 | Ho | ........................ | G02B 6/4246 |
| 2018/0172933 A1* | 6/2018 | Noguchi | ............. | G02B 6/4281 |
| 2018/0220208 A1* | 8/2018 | Gui | .................... | H04Q 11/0005 |
| 2018/0284370 A1* | 10/2018 | Ho | ....................... | G02B 6/4237 |

FOREIGN PATENT DOCUMENTS

| | | |
|---|---|---|
| EP | 0947865 A1 | 10/1999 |
| WO | 2015065459 A1 | 5/2015 |

OTHER PUBLICATIONS

International Search Report and Written Opinion of the International Searching Authority; PCT/CN2018/075152; dated May 2, 2018; 10 Pages; Chinese Patent Office.

International Search Report and Written Opinion PCT/US2018/016388 dated Apr. 16, 2018.

\* cited by examiner

WAVELENGTH-DIVISION MULTIPLEXING OPTICAL ASSEMBLY WITH INCREASED LANE DENSITY

CROSS REFERENCE TO RELATED APPLICATIONS

This application claims the benefit of priority of U.S. Provisional Application Ser. No. 62/453,643, filed Feb. 2, 2017, U.S. Provisional Application Ser. No. 62/461,532, filed Feb. 21, 2017, and U.S. Provisional Application Ser. No. 62/461,521, filed Feb. 21, 2017, the content of each of which is relied upon and incorporated herein by reference in its entirety.

BACKGROUND

The disclosure relates generally to wavelength-division multiplexing (WDM) and demultiplexing, and more particularly, to WDM optical assemblies with increased lane density using a WDM filter having a passband in optical communication with two different WDM common ports.

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM assemblies and associated devices can be used as components in an optical network, such as a passive optical network (PON).

FIG. 1A is a perspective view of a typical WDM optical core subassembly 100. In particular, the WDM optical core subassembly 100 comprises a single WDM common port 102 in optical communication with four WDM channel ports 104A-104D by a plurality of WDM filters 106A-106D, each having a width ($W_1$), and a mirror 108 mounted to a substrate 110. The WDM optical core subassembly 100 positions all of the WDM filters 106A-106D and the mirror 108 on one surface of the substrate 110. The WDM filters 106A-106D and the mirror 108 are arranged to form an optical path 112 between the common port 102 and each of the four channel ports 104A-104D. In particular, each of the WDM filters 106A-106D has a unique passband to allow a portion of the optical signal to pass through the WDM filter 106A-106D and to reflect the remaining portion of the optical signal towards the mirror 108, which in turn reflects the remaining portion of the optical signal towards another one of the remaining WDM filters 106B-106D.

FIG. 1B is a perspective view of a WDM optical assembly 114. The WDM optical assembly 114 includes a WDM optical core subassembly 116 with a common collimator 118 and four channel collimators 120A-120D. The WDM optical core subassembly 116 includes a plurality of WDM filters 106A-106D positioned on opposing sides of a substrate 122 (WDM filter 106B is located on a bottom side of the substrate 122 and is not visible in FIG. 1B). The WDM optical core subassembly 116 further includes a trapezoidal-shaped prism 124 for routing an optical signal between upper and lower sides of the substrate 122 as the optical signal is directed between the plurality of WDM filters 106A-106D (WDM filter 106B is located on a bottom side of the substrate 122 and is not visible in FIG. 1B). However, in each of the WDM optical core assemblies 100, 114 of FIGS. 1A-1B, the WDM filters 106A-106D are in optical communication with a single WDM common port (e.g., a single common collimator 118).

One of the components in an optical network that utilizes a WDM assembly is a transceiver (e.g., pluggable transceiver), such as a quad small form-factor pluggable (QSFP) transceiver for example. In particular, a QSFP transceiver interfaces networking hardware to a network connection (e.g., fiber optic cable or electrical copper connection). The QSFP has a form factor and electrical interface specified by a multi-source agreement. Accordingly, a QSFP transceiver must meet certain dimension requirements in order to properly interface with other components.

No admission is made that any reference cited herein constitutes prior art. Applicant expressly reserves the right to challenge the accuracy and pertinency of any cited documents.

SUMMARY

The disclosure relates generally to wavelength-division multiplexing and demultiplexing, and more particularly, to a wavelength-division multiplexing (WDM) optical core subassembly with increased lane density using a WDM filter having a passband in optical communication with two different common ports. In exemplary aspects disclosed herein, the WDM optical core subassembly, and corresponding WDM optical assembly, includes an optical signal router for routing an optical signal between a first side and a second side of a substrate. The WDM optical core subassembly further includes a first WDM filter having a first passband and a second WDM filter having a second passband. The WDM optical core subassembly forms a first optical path between a first common port, the first WDM filter, and a first channel port, and to form a second optical path between the second WDM filter, a second common port, and a second channel port. The WDM optical core subassembly increases lane density while decreasing size and complexity by including a plurality of common ports in optical communication with the same plurality of WDM filters (e.g., same passbands). In particular, in certain embodiments, the WDM optical core subassembly includes four WDM common ports, each in optical communication with four WDM channel ports (e.g., sixteen channel collimators) and four WDM filters.

One embodiment of the disclosure relates to a wavelength-division multiplexing (WDM) optical assembly, comprising an optical signal router, a first WDM filter having a first passband, a first common port, a first channel port, a first optical path, a second common port, a second channel port, and a second optical path. The first common port is configured for optical communication of a first multiplexed signal. The first channel port is configured for optical communication of a first demultiplexed signal. The first multiplexed signal comprises the first demultiplexed signal. The first optical path comprises the optical signal router, the first WDM filter, the first common port, and the first channel port. The second common port is configured for optical communication of a second multiplexed signal. The second channel port is configured for optical communication of a second demultiplexed signal. The second multiplexed signal comprises the second demultiplexed signal. The second optical path comprises the optical signal router, the first WDM filter, the second common port, and the second channel port.

An additional embodiment of the disclosure relates to a wavelength-division multiplexing (WDM) optical assembly, comprising a first WDM filter having a first passband, a second WDM filter having a second passband, a first common port, a second common port, a first optical path, and a second optical path. The first common port is configured for optical communication of a first multiplexed signal. The second common port is configured for optical communication of a second multiplexed signal. The first optical path comprises the optical signal router, the first WDM filter, the second WDM filter, and the first common port. The second optical path comprises the optical signal router, the first WDM filter, the second WDM filter, and the second common port.

An additional embodiment of the disclosure relates to a method of manufacturing a wavelength-division multiplexing (WDM) optical assembly. The method comprises positioning a first set common port relative to the optical signal router, the first set common port configured for optical communication of a first multiplexed signal. The method further comprises positioning a first set first channel port relative to the optical signal router, the first set first channel port configured for optical communication of a first demultiplexed signal, the first multiplexed signal comprising the first demultiplexed signal. The method further comprises forming a first optical path comprising the optical signal router, the first WDM filter, the first set common port, and the first set first channel port. The method further comprises positioning a second set common port relative to the optical signal router, the second set common port configured for optical communication of a second multiplexed signal. The method further comprises positioning a second set first channel port relative to the optical signal router, the second set first channel port configured for optical communication of a second demultiplexed signal, the second multiplexed signal comprising the second demultiplexed signal. The method further comprises forming a second optical path comprising the optical signal router, the first WDM filter, the second set common port, and the second set first channel port.

An additional embodiment of the disclosure relates to a method of manufacturing a wavelength-division multiplexing (WDM) optical assembly. The method comprises positioning a first WDM filter having a first passband relative to an optical signal router. The method further comprises positioning a second WDM filter having a second passband relative to the optical signal router. The method further comprises positioning a first common port relative to the optical signal router, the first common port configured for optical communication of a first multiplexed signal. The method further comprises positioning a second common port relative to the optical signal router, the second common port configured for optical communication of a second multiplexed signal. The method further comprises forming a first optical path comprising the optical signal router, the first WDM filter, the second WDM filter, and the first common port. The method further comprises forming a second optical path comprising the optical signal router, the first WDM filter, the second WDM filter, and the second common port.

An additional embodiment of the disclosure relates to a wavelength-division multiplexing (WDM) device, comprising a housing, a first common collimator, a first common fiber optic pigtail, a second common collimator, a second common fiber optic pigtail, a first channel collimator, a first channel fiber optic pigtail, a second channel collimator, a second channel fiber optic pigtail, and a wavelength-division multiplexing (WDM) optical assembly. The first common collimator is positioned within the housing and is configured for optical communication of a first multiplexed signal. The first common fiber optic pigtail is operatively coupled to the first common collimator and extends from the housing. The second common collimator is positioned within the housing and is configured for optical communication of a second multiplexed signal. The second common fiber optic pigtail is operatively coupled to the second common collimator and extends from the housing. The first channel collimator is positioned within the housing and is configured for optical communication of a first demultiplexed signal. The first channel fiber optic pigtail is operatively coupled to the first channel collimator and extends from the housing. The second channel collimator is positioned within the housing and is configured for optical communication of a second demultiplexed signal. The second channel fiber optic pigtail is operatively coupled to the second channel collimator and extends from the housing. The WDM optical assembly is positioned within the housing. The WDM optical assembly comprises an optical signal router, a first WDM filter having a first passband, a first optical path, and a second optical path. The first optical path comprises the optical signal router, the first WDM filter, the first common collimator, and the first channel collimator. The second optical path comprises the optical signal router, the first WDM filter, the second common collimator, and the second channel collimator.

An additional embodiment of the disclosure relates to a transceiver, comprising a housing, a first common collimator, a second common collimator, a first channel collimator, a second channel collimator, and a wavelength-division multiplexing (WDM) optical assembly. The first common collimator is positioned within the housing and is configured for optical communication of a first multiplexed signal. The second common collimator is positioned within the housing and is configured for optical communication of a second multiplexed signal. The first channel collimator is positioned within the housing and is configured for optical communication of a first demultiplexed signal. The second channel collimator is positioned within the housing and is configured for optical communication of a second demultiplexed signal. The WDM optical assembly is positioned within the housing. The WDM optical assembly comprises an optical signal router, and a first WDM filter having a first passband. The first WDM filter is optically positioned relative to the optical signal router to form a first optical path between the first common collimator and the first channel collimator, and a second optical path between the second common collimator and the second channel collimator.

An additional embodiment of the disclosure relates to a wavelength-division multiplexing (WDM) optical assembly comprising an optical signal router and a first WDM filter having a first passband. The first WDM filter is optically positioned relative to the optical signal router to form a first optical path and a second optical path. The first optical path is between a first common port configured for optical communication of a first multiplexed signal and a first channel port configured for optical communication of a first demultiplexed signal. The first multiplexed signal comprises the first demultiplexed signal. The second optical path is between a second common port configured for optical communication of a second multiplexed signal and a second channel port configured for optical communication of a second demultiplexed signal. The second multiplexed signal comprises the second demultiplexed signal.

An additional embodiment of the disclosure relates to a wavelength-division multiplexing (WDM) optical assembly comprising an optical signal router, a first WDM filter having a first passband, and a second WDM filter having a second passband. The first WDM filter is optically positioned relative to the optical signal router. The second WDM filter is optically positioned relative to the optical signal router. Each of the first and second WDM filters are configured to cooperate with the optical signal router to form (i) a first optical path routed between the first WDM filter, the second WDM filter, and a first common port configured for optical communication of a first multiplexed signal, and (ii) a second optical path routed between the first WDM filter, the second WDM filter, and a second common port configured for optical communication of a second multiplexed signal, wherein the second common port differs from the first common port.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
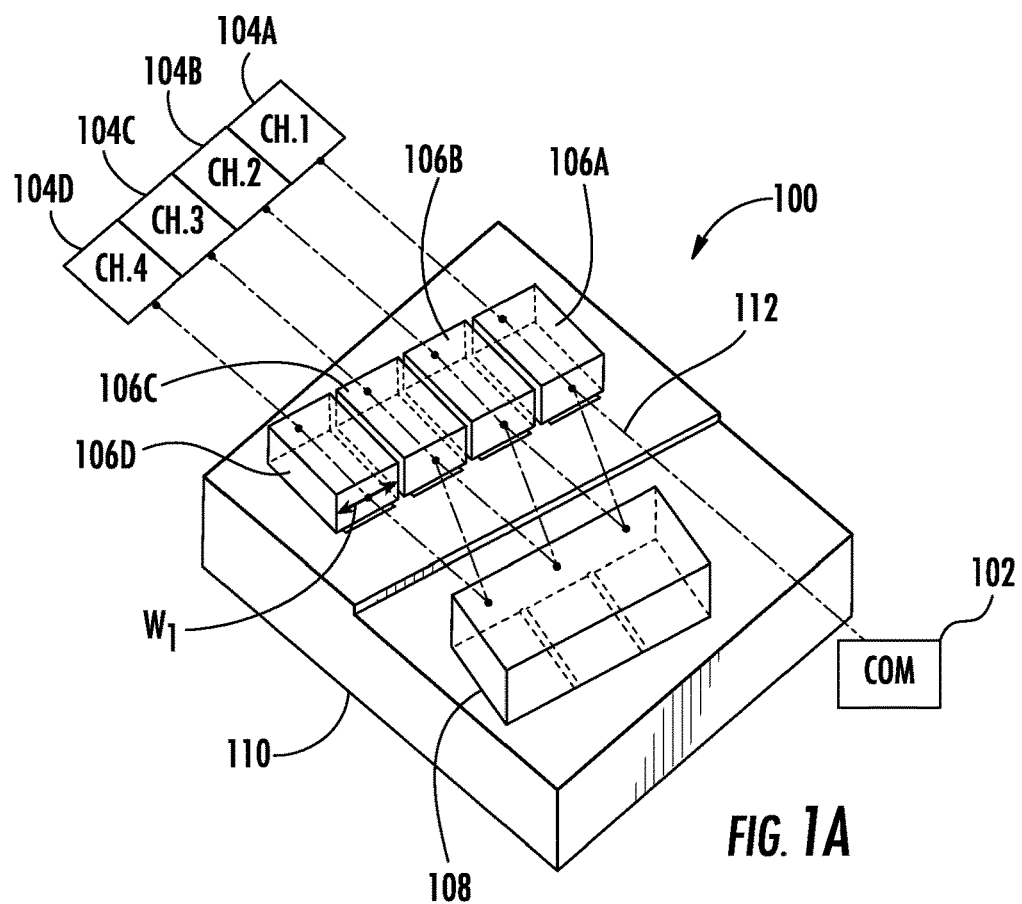
FIG. 1A is an exemplary perspective view of a typical WDM optical core subassembly.

Reference will now be made in detail to the present preferred embodiments, examples of which are illustrated in the accompanying drawings. Whenever possible, the same reference numerals will be used throughout the drawings to refer to the same or like parts.

The disclosure relates generally to wavelength-division multiplexing and demultiplexing, and more particularly, to a wavelength-division multiplexing (WDM) optical core subassembly with increased lane density using a WDM filter having a passband in optical communication with two different common ports. In exemplary aspects disclosed herein, the WDM optical core subassembly, and corresponding WDM optical assembly, includes an optical signal router for routing an optical signal between a first side and a second side of a substrate. The WDM optical core subassembly further includes a first WDM filter having a first passband and a second WDM filter having a second passband. The WDM optical core subassembly forms a first optical path between a first common port, the first WDM filter, and a first channel port, and to form a second optical path between the second WDM filter, a second common port, and a second channel port. The WDM optical core subassembly increases lane density while decreasing size and complexity by including a plurality of common ports in optical communication with the same plurality of WDM filters (e.g., same passbands). In particular, in certain embodiments, the WDM optical core subassembly includes four WDM common ports, each in optical communication with four WDM channel ports (e.g., sixteen channel collimators) and four WDM filters.

It will be apparent to those skilled in the art that various modifications and variations can be made without departing from the spirit or scope of the invention.

There is increasing demand for greater bandwidth, driving the telecommunications industry toward increasing the number of wavelength channels. Adding to this trend, the dimensions of the optical transceivers are decreasing, requiring increasingly smaller WDM assemblies to keep the size of the WDM device as small as possible. For example, there is a desire to increase the number of channels of a WDM device within a quad small form-factor pluggable (QSFP) transceiver while maintaining the same form factor of the QSFP transceiver. In other words, there is a desire to increase the lane density of WDM devices.

Figure 2A:
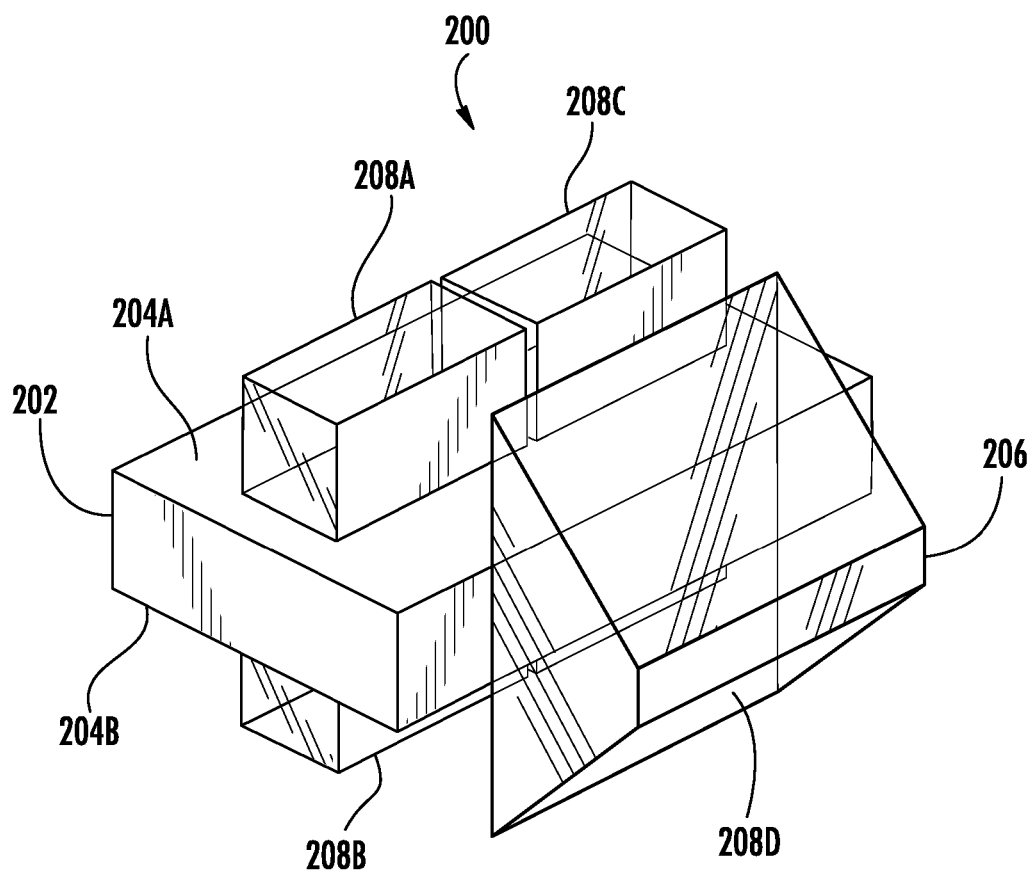
FIG. 2A is a perspective view of an exemplary WDM optical core subassembly with increased lane density, according to an embodiment of the present disclosure.

FIG. 2A is a perspective view of an exemplary WDM optical core subassembly 200 for bidirectional multiplexing and/or demultiplexing of optical signals. The WDM optical core subassembly 200 (also referred to as a WDM optical core assembly, optical core subassembly, optical core assembly, etc.) includes a substrate 202 having a first, upper side 204A and a second, lower side 204B. Directional terms, such as "top," "bottom," "upper," "lower," "left," "right," "medial," "distal," etc. are used for non-limiting illustrative purposes only. The WDM optical core subassembly 200 further includes an optical signal router 206 for routing an optical signal between the upper side 204A and the lower side 204B of the substrate 202. The WDM optical core subassembly 200 further includes a first WDM filter 208A having a first passband positioned on the upper side 204A of the substrate 202 towards a first side (also referred to as a left side) of the substrate 202 and/or optical signal router 206, a second WDM filter 208B having a second passband positioned on a lower side 204B of the substrate 202 towards the left side of the substrate 202 and/or optical signal router 206, a third WDM filter 208C having a third passband positioned on the upper side 204A of the substrate 202 towards a second side (also referred to as a right side) of the substrate 202 and/or optical signal router 206, and a fourth WDM filter 208D having a fourth passband positioned on a lower side 204B of the substrate 202 towards the right side of the substrate 202 and/or optical signal router 206. As explained in more detail below, the WDM filters 208A-208D are positioned relative to the optical signal router 206 to increase lane density while decreasing size and minimizing complexity (e.g., fewer components) by forming multiple optical paths with multiple common ports as explained in more detail below. Lane density is directed to the number of ports in a multiplexer (e.g., demultiplexed ports). Increased lane density pertains to increasing the number of ports in a specified area, maintaining the number of ports in a smaller area, or increasing the number of ports and decreasing the area for the ports. As used herein, reference number ranges with the same ending letter include only those other numbers with the same ending letter. For example, 10A-14A would include 10A, 11A, 12A, 13A, 14A. However, reference number ranges with different ending letters include all numbers in that range with the same or different ending letter. For example, 10A-14B would include 10A, 10B, 11A, 11B, 12A, 12B, 13A, 13B, 14A, 14B. As explained in more detail below, the four WDM filters 208A-208D provide four common ports and sixteen channels for a total of twenty ports by interleaving (e.g., overlapping) a plurality of optical paths from a plurality of common ports.

Figure 2B:
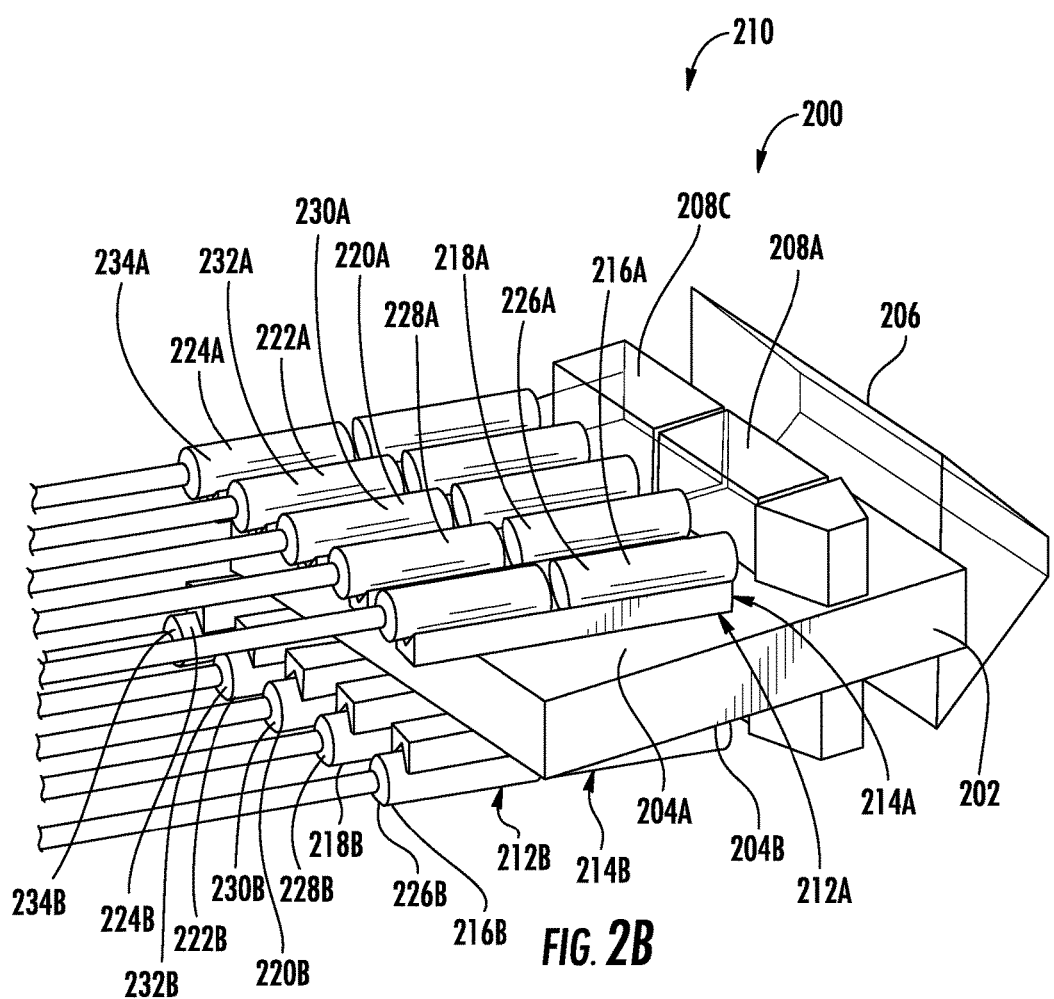
FIG. 2B is a perspective view of an exemplary WDM optical assembly with increased lane density, and wherein the WDM optical assembly includes the WDM optical core subassembly of FIG. 2A.

FIG. 2B is a perspective view of an exemplary WDM optical assembly 210 including the WDM optical core subassembly 200 of FIG. 2A and a plurality of WDM port sets 212A-212B (embodied as WDM collimator sets 214A-214B) to transmit and receive multiplexed and/or demultiplexed optical signals. In particular, the first WDM port set 212A (embodied as a first WDM collimator set 214A) includes a first set WDM common port 216A (embodied as a first set WDM common collimator 226A), a first set first WDM channel port 218A (embodied as a first set first WDM channel collimator 228A), a first set second WDM channel port 220A (embodied as a first set second WDM channel collimator 230A), a first set third WDM channel port 222A (embodied as a first set third WDM channel collimator 232A), and a first set fourth WDM channel port 224A (embodied as a first set fourth WDM channel collimator 234A). The second WDM port set 212B (embodied as a second WDM collimator set 214B) includes a second set WDM common port 216B (embodied as a second set WDM common collimator 226B), a second set first WDM channel port 218B (embodied as a second set first WDM channel collimator 228B), a second set second WDM channel port 220B (embodied as a second set second WDM channel collimator 230B), a second set third WDM channel port 222B (embodied as a second set third WDM channel collimator 232B), and a second set fourth WDM channel port 224B (embodied as a second set fourth WDM channel collimator 234B). Each of the ports may include a light receiving element and/or light emitting element, such as a collimator, lens, fiber optic pigtail, fiber array unit, photodiode, laser diode, etc.

Accordingly, the WDM optical core subassembly 200 and/or WDM optical assembly 210 increases lane density while decreasing size and minimizing complexity by using a plurality of common ports 216A-216B (embodied as a plurality of common collimators 226A-226B), such as in optical communication with the same plurality of WDM filters 208A-208D and accordingly, the same passbands.

Figure 3A:
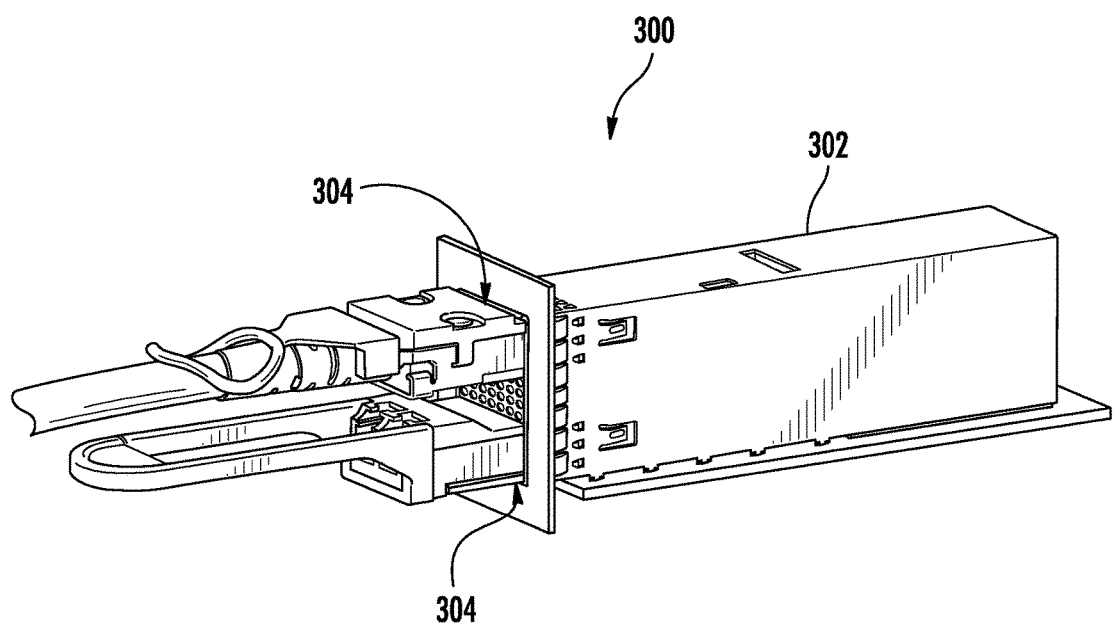
FIG. 3A is a perspective view of an exemplary transceiver that includes the WDM optical core subassembly and/or WDM optical assembly of FIGS. 2A-2B.

FIG. 3A is a perspective view of an exemplary transceiver 300 that includes the WDM optical core subassembly and/or WDM optical assembly of FIGS. 2A-2B. The transceiver 300 is a device that can both transmit and receive signals (e.g., optical signals). The transceiver 300 could be any of a variety of sizes, forms, and/or configurations, such as a quad small form-factor pluggable (QSFP) transceiver (e.g., backward compatible). In certain embodiments, the transceiver 300 supports up to 400 Gb/s in aggregate over an 8×50 GB/s electrical interface. However, the transceiver 300 provides double density (e.g., eight lanes) and/or quadra density (e.g., sixteen lanes). Such a transceiver 300 may be hot-pluggable (where the transceiver 300 may be added or removed while the computer system is running) and may be used to interface networking hardware to a fiber optic cable or electrical connection, such as for transmitting and/or receiving multiplexed/demultiplexed signals between network components. The transceiver 300 includes both a transmitter and a receiver within a housing 302 (e.g., cage) with a plurality of ports 304 (e.g., electronic ports, optical ports, etc.) to interface with other network components. The housing 302 and/or ports 304 may provide backwards compatibility with other transceivers 300, such as a QSFP28 module (e.g., which may be inserted into four of eight electrical lanes) or a CFP2/4/8 module. Further, the transceiver 300 may include a multiplexer (e.g., mux) and/or demultiplexer (e.g., demux) to multiplex and/or demultiplex communication signals (e.g., optical signals), such as by wavelength. The transceiver 300 may be backwards compatible. In particular, the transceiver 300 may include a transmitter optical sub-assembly (TOSA), a receiver optical sub-assembly (ROSA), and/or a bidirectional optical sub-assembly (BOSA).

Figure 3B:
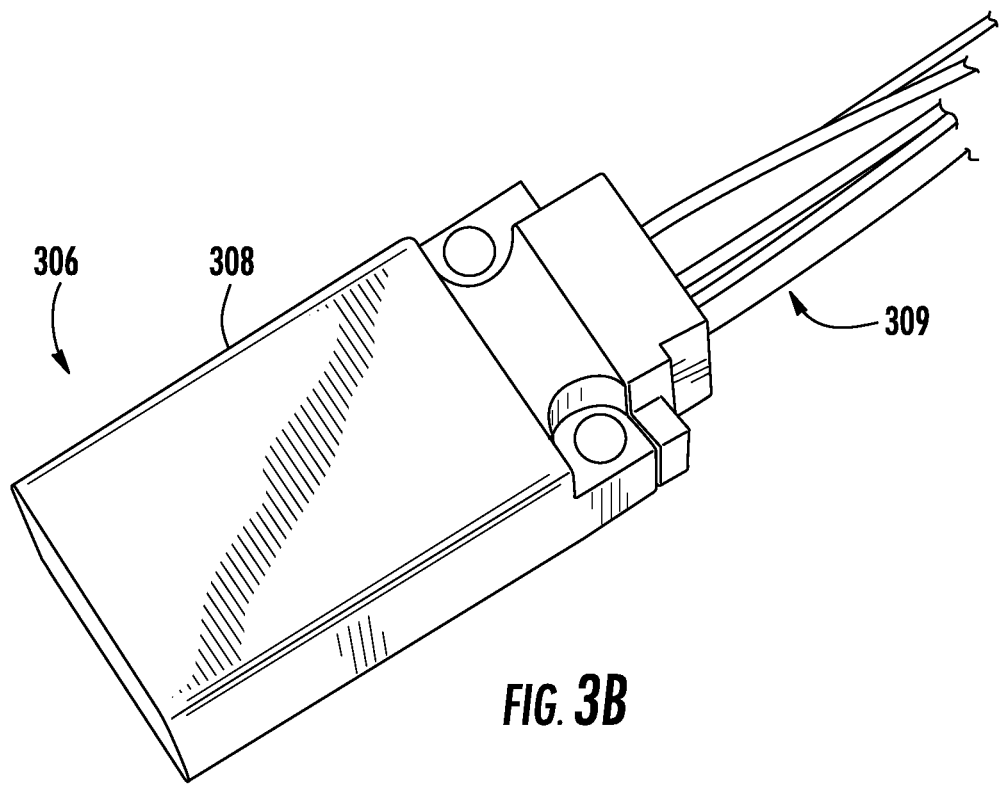
FIG. 3B is a perspective view of an exemplary WDM device that includes the WDM optical core subassembly and/or WDM optical assembly of FIGS. 2A-2B.
Figure 3C:
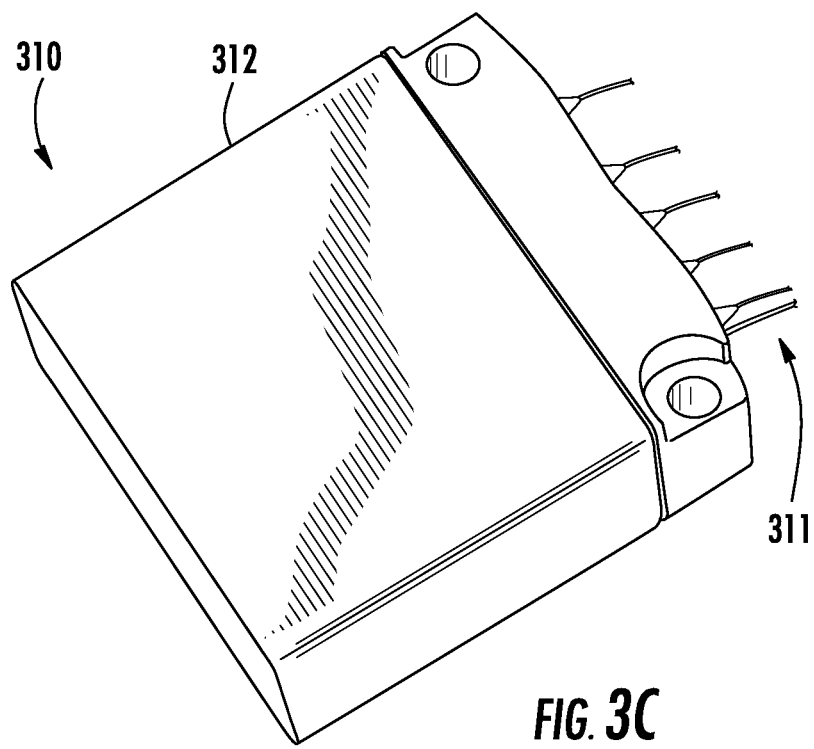
FIG. 3C is a perspective view of another exemplary WDM device that includes the WDM optical core subassembly and/or WDM optical assembly of FIGS. 2A-2B.

FIG. 3B is a perspective view of an exemplary WDM device 306 with a housing 308 containing the WDM optical core subassembly and/or WDM optical assembly of FIGS. 2A-2B. Further, the WDM device 306 comprises a plurality of fiber optic pigtails 309 (e.g., first common fiber optic pigtail, second common fiber optic pigtail, first channel fiber optic pigtail, second channel fiber optic pigtail, etc.) operatively coupled to WDM ports and/or WDM collimators within the WDM device 306. FIG. 3C is a perspective view of another exemplary WDM device 310 with a housing 312 containing the WDM optical core subassembly and/or WDM optical assembly of FIGS. 2A-2B. Further, the WDM device 306 comprises a plurality of fiber optic pigtails 311 (e.g., first common fiber optic pigtail, second common fiber optic pigtail, first channel fiber optic pigtail, second channel fiber optic pigtail, etc.) operatively coupled to WDM ports and/or WDM collimators within the WDM device 306. The housing 312 of the WDM device 310 may be narrower than the housing 308 of the WDM device 306. The WDM devices 306, 310 are designed for multiwavelength network applications, and may be designed for uni-directional and/or bi-directional transmissions. The WDM devices 306, 310 may have a center wavelength ($\lambda_c$) between 1200 nm and 1700 nm (e.g., 1291 nm, 1311 nm, 1331 nm, 1351 nm, 1471 nm, 1491 nm, 1511 nm, 1531 nm, 1511 nm, 1531 nm, 1551 nm, 1571 nm, 1551 nm, 1571 nm, 1591 nm, 1611 nm, and/or combinations thereof). Further, the WDM devices 306, 310 may utilize any of a variety of connectors, such as LC/PC (Lucent connector/physical contact), FC/PC (fiber-optic connector/physical contact), FC/APC (fiber-optic connector/angled physical contact), SC/PC (standard connector/physical contact), SC/APC (standard connector/angled physical contact), MU/PC (miniature unit/physical contact), etc. The WDM devices 306, 310 could be any of a variety of sizes, forms, and/or configurations (e.g., bidirectional, epoxy-free optical path), and for a variety of applications (e.g., 40 G transceiver, 100 G transceiver, etc.).

Figure 3D:
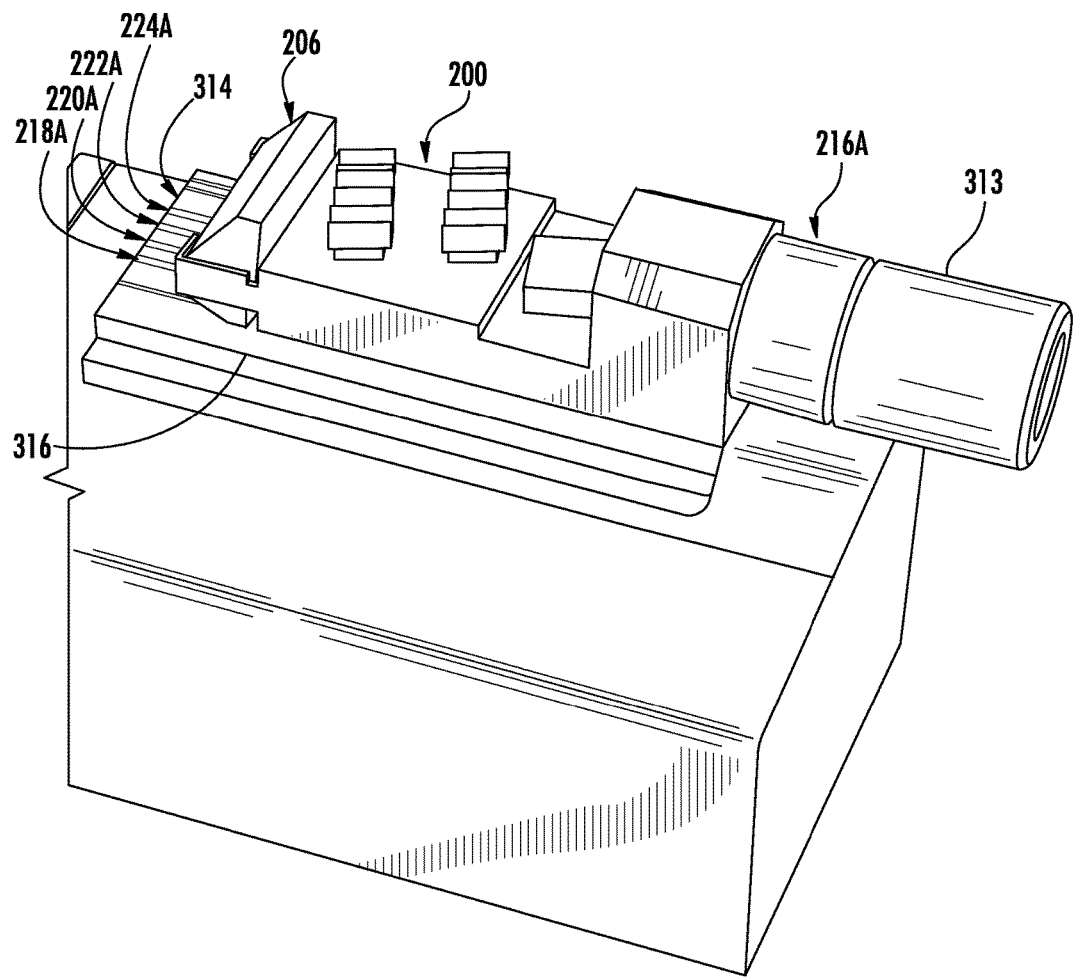
FIG. 3D is a perspective view of exemplary components of WDM devices of FIGS. 3B-3C.

FIG. 3D is a perspective view of exemplary components of WDM devices of FIGS. 3B-3C. More specifically, the components include a first set WDM common port 216A (embodied as a receptacle interface 313), a plurality of channel ports 218A-224A (embodied as a photodiode/laser diode (PD/LD) array 314), a unibody substrate 316 for mounting the components thereto, and an optical core subassembly 200, including an optical signal router 206 for directing and routing multiplexed and demultiplexed optical signals, as discussed in more detail below. These components, as used herein, cooperate to form multiple optical paths between a plurality of common ports and a plurality of channel ports.

FIGS. 4A-4E are views of the optical core subassembly 200 of FIG. 2A illustrating multiple optical paths 414A-414D formed between the optical signal router 206 and the WDM filters 208A-208D. As discussed above, the optical core subassembly 200 includes a substrate 202 with a first side 204A (also referred to as an upper side, first surface, upper surface, etc.) and a second side 204B (also referred to as a lower side, second side, second surface, lower surface, etc.) opposite the upper side 204A.

In this exemplary embodiment, the optical signal router 206 includes a trapezoidal-shaped prism 400 horizontally positioned relative to the substrate 202 for routing optical signals between the upper side 204A and the lower side 204B of the substrate 202. In particular, the trapezoidal-shaped prism 400 (also referred to as a trapezoidal-shaped prism) includes a first base 402A (also referred to as a left base, etc.), and a second base 402B (also referred to as a right base, etc.) opposite the first base 402A. The first and second bases 402A, 402B are trapezoidal-shaped. The trapezoidal-shaped prism 400 further includes a plurality of faces 404-408B (also referred to as surfaces) extending between the first base 402A and the second base 402B. At least a portion of the plurality of faces 404-408B provide surfaces for entry and/or exit of an optical signal therein, and/or reflective surfaces for routing (e.g., redirecting, rerouting) an optical signal therein. In particular, the trapezoidal-shaped prism 400 further includes a narrow face 404 (also referred to as a front face), a broad face 406 (also referred to as a back face) opposite the narrow face 404, an upper oblique face 408A positioned between upper edges of the narrow face 404 and the broad face 406, and a lower oblique face 408B positioned between lower edges of the narrow face 404 and the broad face 406.

The narrow face 404 acts as a chamfer and minimizes stress points, reducing damage (e.g., chipping) to the trapezoidal-shaped prism 400. In this way, in this exemplary embodiment, a chamfer may be provided between the broad face 406 and the upper oblique face 408A and/or between the broad face 406 and the lower oblique face 408B. Further, the distance between the narrow face 404 and the broad face 406 (e.g., the height of the trapezoid) may be reduced as long as the optical path intersects the upper oblique face 408A and/or the lower oblique face 408B, such as to avoid the narrow face 404.

In this exemplary embodiment, the broad face 406 is positioned approximately perpendicular to the substrate 202 with at least an upper portion 410A of the broad face 406 extending above the upper side 204A of the substrate 202 and at least a lower portion 410B of the broad face 406 extending below the lower side 204B of the substrate 202. The upper portion 410A and/or lower portions 410B provides exit and/or entry points for an optical signal as explained in more detail below. The upper oblique face 408A redirects signals between an upper portion 410A of the broad face 406 and the lower oblique face 408B, and similarly, the lower oblique face 408B redirects signals between the lower portion 410B of the broad face 406 and the upper oblique face 408A. In this way, the optical signal is routed between upper and lower sides 204A, 204B of the substrate 202.

As discussed above, the WDM optical core subassembly 200 includes WDM filters 208A-208D. In particular, the first WDM filter 208A includes a first WDM filter 208A having a first passband positioned on the upper side 204A of the substrate 202 towards a first side (also referred to as a left side), a second WDM filter 208B having a second passband positioned on a lower side 204B of the substrate 202 towards the left side, a third WDM filter 208C having a third passband positioned on the upper side 204A of the substrate 202 towards a second side (also referred to as a right side), and a fourth WDM filter 208D having a fourth passband positioned on a lower side 204B of the substrate 202 towards the right side. In this way, the first WDM filter 208A is vertically aligned (e.g., along a common vertical axis A-A) with the second WDM filter 208B, and the third WDM filter 208C is vertically aligned (e.g., along a common vertical axis B-B) with the fourth WDM filter 208D. In other words, the first WDM filter 208A is aligned left to right and front to back with the second WDM filter 208B, and the third WDM filter 208C is aligned left to right and front to back with the fourth WDM filter 208D. Further, the first WDM filter 208A is horizontally aligned (e.g., along a common horizontal axis C-C) with the third WDM filter 208C (along the upper side 204A of the substrate 202), and the second WDM filter 208B is horizontally aligned (e.g., along a common horizontal axis D-D) with the fourth WDM filter 208D (along the lower side 204B of the substrate 202). In other words, the first WDM filter 208A is aligned front to back and/or upper to lower with the third WDM filter 208C, and the second WDM filter 208B is aligned front to back and/or upper to lower with the fourth WDM filter 208D. Each WDM filter 208A-208D may have a coating on at least one of the faces to form the passbands. Each passband is configured to allow a different wavelength to pass through. In particular, the first passband is configured for a first wavelength ($\lambda_1$), the second passband is configured for a second wavelength ($\lambda_2$), the third passband is configured for a third wavelength ($\lambda_3$), the fourth passband is configured for a fourth wavelength ($\lambda_4$), etc.

Figure 1B:
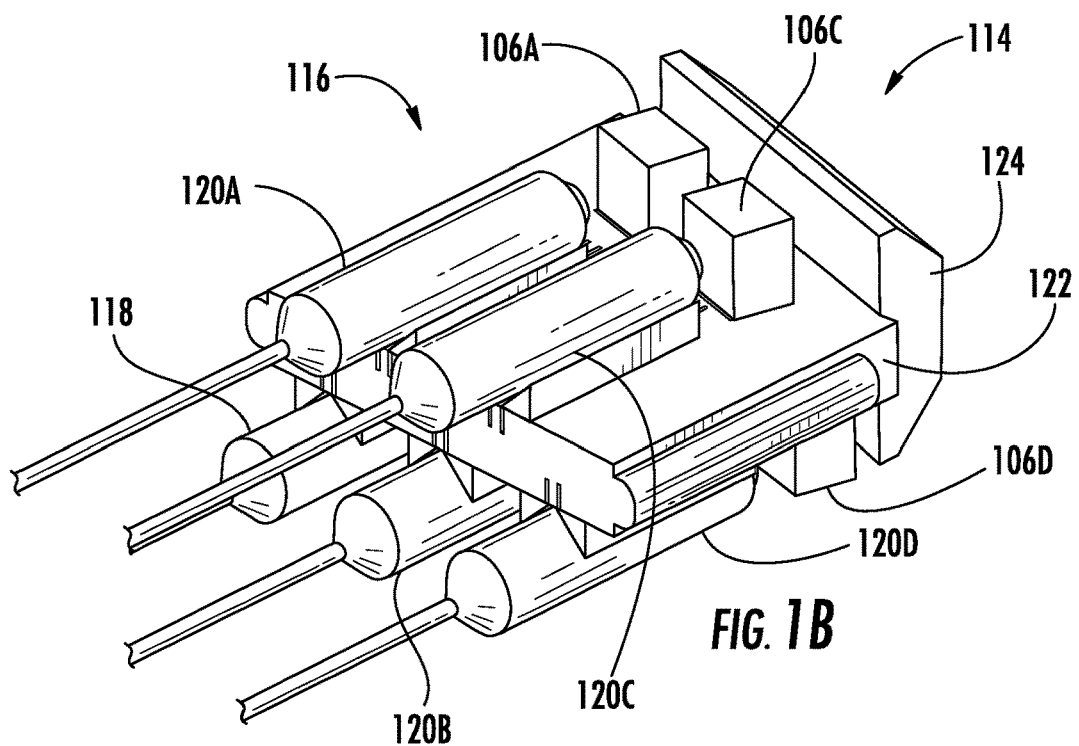
FIG. 1B is an exemplary perspective view of a typical WDM optical assembly.

Each of the first, second, third, and fourth WDM filters 208A-208D are offset from and generally parallel with the broad face 406 of the trapezoidal-shaped prism 400, such as to receive an optical signal directly from one of the first, second, third, and/or fourth common ports 216A-216D. The WDM filters 208A-208D are each a rectangular prism with a left portion 412A (also called a first area) disposed towards one end of the face and a right portion 412B (also called a second area) disposed towards a second end of the face for interleaving multiple optical paths from multiple common ports as explained in more detail below. Each of the WDM filters 208A-208D is configured and sized to receive at least a first optical signal from one of the common ports 216A-216D at the left portion 412A and to receive at least a second optical signal from a different one of the common ports 216A-216D at the right portion 412B. Accordingly, the WDM filters 208A-208D may be twice the width ($W_2$) as the filters shown in FIGS. 1A-1B. This increases the ease of manufacturing and assembly as the sizes of the WDM filters 208A-208D are larger and also allows a decrease in pitch between lanes of the optical path as explained in more detail below. However, in certain embodiments, each of the WDM filters 208A-208D may be split into two separate WDM filters, as opposed to, for example, one WDM filter with a left and right portions 412A-412B.

Although the optical signal router 206 is shown in FIGS. 4A-4E as a trapezoidal-shaped prism 400, other shapes may be used as explained in more detail below. In particular, in certain embodiments, the optical signal router 206 may be generally shaped as a prism (e.g., triangular prism, quadrilateral prism, trapezoidal-shaped prism, pentagonal prism, etc.), pyramid (e.g., frustopyramidal, triangular pyramid, rectangular pyramid, etc.), and/or any other polyhedron (e.g., prism, pyramid, etc.), as long as the optical signal router 206 includes an optical signal entry surface, an optical signal exit surface, a first optical signal redirecting surface, and/or a second optical signal redirecting surface.

Figure 4A:
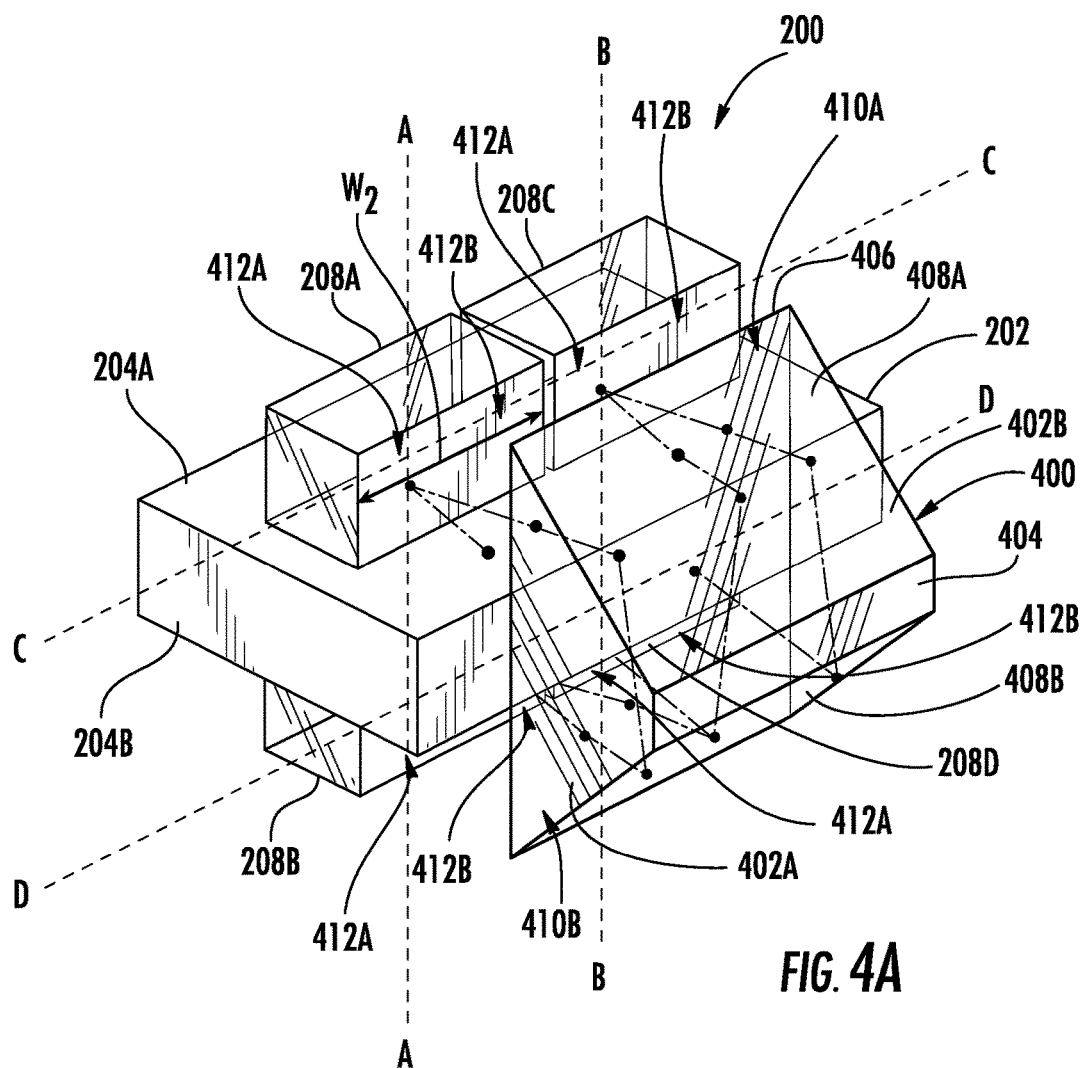
FIG. 4A is a front perspective view of the optical core subassembly of FIG. 2A.

FIGS. 4B-4E are views of the optical core subassembly of FIG. 4A illustrating optical paths between a plurality of WDM port sets 212A-212D. In particular, the optical core subassembly 200 provides four common ports 216A-216D and sixteen channel ports 216A-224D using four WDM filters 208A (and four respective passbands). It is noted that the portions of optical paths 414A-414D that are solid are on the upper side 204A of the substrate 202, and the portions of the optical paths 414A-414D that are dashed are on the lower side 204B of the substrate 202.

Figure 4B:
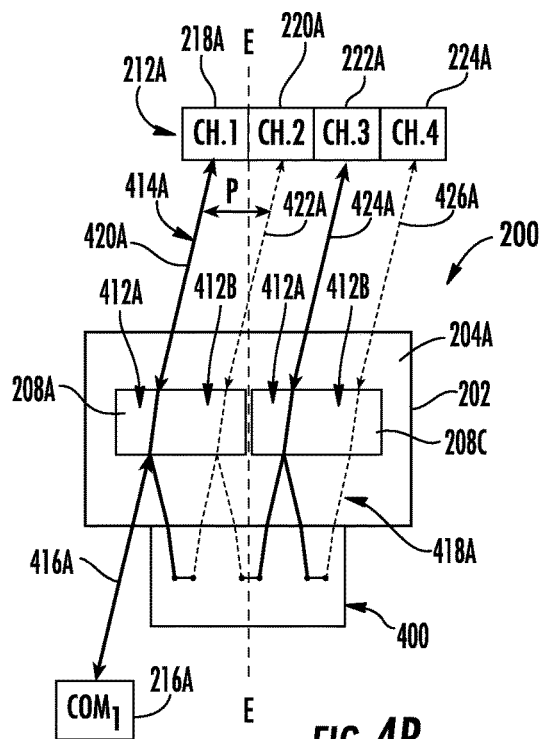
FIG. 4B is a top view of the optical core subassembly of FIG. 4A illustrating a first optical path between a first common port of a first WDM port set and four channel ports of the first WDM port set.

FIG. 4B is a top view of the optical core subassembly of FIG. 4A illustrating a first optical path between the first set WDM common port 216A (also referred to as a first WDM common port, first common port, etc.) of the first WDM port set 212A and the four channel ports 218A-224A. The first set WDM common port 216A forms a first optical path 414A with each of the four channel ports 218A-224A. The first optical path 414A is also illustrated in FIG. 4A. The first WDM port set 212A includes the first set WDM common port 216A positioned on an upper side 204A of the substrate 202 towards a left side and towards a front side of the trapezoidal-shaped prism 400. The first WDM port set 212A further includes the first set first WDM channel port 218A at an upper side 204A of the substrate 202 towards the left side of the trapezoidal-shaped prism 400, the first set second WDM channel port 220A at a lower side 204B of the substrate 202 towards the left side of the trapezoidal-shaped prism 400, the first set third WDM channel port 222A at an upper side 204A of the substrate 202 towards the right side of the trapezoidal-shaped prism 400, and the first set fourth WDM channel port 224A at a lower side 204B of the substrate 202 towards the right side of the trapezoidal-shaped prism 400. The first set WDM common port 216A is angled (or configured to direct an optical signal at an angle) relative to a center plane E-E of the trapezoidal-shaped prism (and/or substrate 202). The channel ports 218A-224A are similarly angled and/or configured as that of the first set WDM common port 216A. Further, the trapezoidal-shaped prism 400 is positioned between the first set WDM common port 216A and the channel ports 218A-224A.

The WDM optical core subassembly 200 defines a first optical path 414A including a first common lane 416A, a lateral path 418A, and a plurality of channel lanes 420A-426A. The lateral path 418A extends between an upper side 204A of the substrate 202 and a lower side 204B of the substrate 202 (and between an upper portion 410A of the trapezoidal-shaped prism 400 and a lower portion 410B of the trapezoidal-shaped prism 400) and from a left side to a right side of the substrate 202. In particular, a first optical signal (wavelengths $\lambda_1$-$\lambda_4$) extends along the first common lane 416A of the first optical path 414A from the first set WDM common port 216A to the left portion 412A of the first WDM filter 208A. A portion of the first optical signal (wavelengths $\lambda_1$) may pass through the first passband of the first WDM filter 208A to the first channel lane 420A to the first set first WDM channel port 218A. Any remaining portion of the first optical signal (wavelengths $\lambda_2$-$\lambda_4$) is reflected off the left portion 412A of the first WDM filter 208A to the upper oblique face 408A to the lower oblique face 408B to the right portion 412B of the second WDM filter 208B. A portion of the remaining first optical signal (wavelengths $\lambda_2$) may pass through the second passband of the second WDM filter 208B to the second channel lane 422A to the first set second WDM channel port 220A. Any remaining portion of the first optical signal (wavelengths $\lambda_3$-$\lambda_4$) is reflected off the right portion 412B of second WDM filter 208B to the lower oblique face 408B to the upper oblique face 408A to the left portion 412A of the third WDM filter 208C. A portion of the remaining optical signal (wavelengths $\lambda_3$) may pass through the third passband of the third WDM filter 208C to the third channel lane 424A to the first set third WDM channel port 222A. Any remaining portion of the first optical signal (wavelengths $\lambda_4$) is reflected off the left portion 412A of the third WDM filter 208C to the upper oblique face 408A to the lower oblique face 408B to the right portion 412B of the fourth WDM filter 208D. A portion of the remaining optical signal (wavelengths $\lambda_4$) may pass through the fourth passband of the fourth WDM filter 208D to the fourth channel lane 426A to the first set fourth WDM channel port 224A. Any remaining portion of the first optical signal is reflected off the right portion 412B of the fourth WDM filter 208D.

Figure 4C:
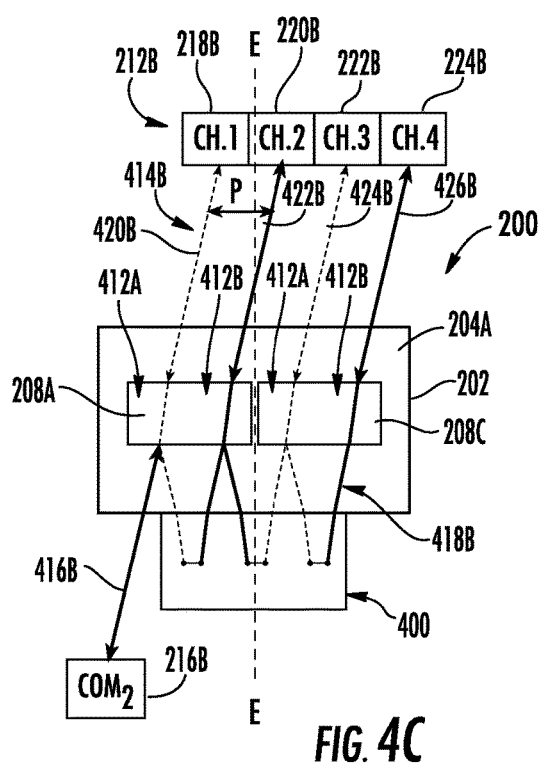
FIG. 4C is a top view of the optical core subassembly of FIG. 4A illustrating a second optical path between a second common port of a second WDM port set and four channel ports of the second WDM port set.

FIG. 4C is a top view of the optical core subassembly of FIG. 4A illustrating a second optical path between a second common port and four channel ports. The second set WDM common port 216B (also referred to as a second WDM common port, second common port, etc.) forms a second optical path 414B with each of the four channel ports 218B-224B. The second WDM port set 212B includes the second set WDM common port 216B positioned on a lower side 204B of the substrate 202 towards a left side and towards a front side of the trapezoidal-shaped prism 400. The second WDM port set 212B further includes a second set first WDM channel port 218B at a lower side 204B of the substrate 202 towards the left side of the trapezoidal-shaped prism 400, a second set second WDM channel port 220B at an upper side 204A of the substrate 202 towards the left side of the trapezoidal-shaped prism 400, a second set third WDM channel port 222B at a lower side 204B of the substrate 202 towards the right side of the trapezoidal-shaped prism 400, and a second set fourth WDM channel port 224B at an upper side 204A of the substrate 202 towards the right side of the trapezoidal-shaped prism 400. The second set WDM common port 216B is angled (or configured to direct an optical signal at an angle) relative to a center plane E-E of the trapezoidal-shaped prism (and/or substrate 202), the same (or similar) angle as the first set WDM common port 216A. Accordingly, the first set WDM common port 216A may be vertically aligned with the second set WDM common port 216B. The channel ports 218B-224B are similarly angled and/or configured as that of the second set WDM common port 216B, the first set WDM common port 216A, and/or the channel ports 218A-224A. The channel ports on the upper side 204A may be vertically aligned with the channel ports on the lower side 204B. Further, the trapezoidal-shaped prism 400 is positioned between the second set WDM common port 216B and the channel ports 218B-224B.

Accordingly, the upper side 204A of the substrate 202 includes (from left to right) the first set first WDM channel port 218A of the first WDM port set 212A (and corresponding first channel lane 420A), the second set second WDM channel port 220B of the second WDM port set 212B (and corresponding second channel lane 422B), the first set third WDM channel port 222A of the first WDM port set 212A (and corresponding third channel lane 424A), and the first set fourth WDM channel port 224A of the first WDM port set 212A (and corresponding fourth channel lane 426B). Similarly, the lower side 204B of the substrate 202 includes (from left to right) the second set first WDM channel port 218B of the second WDM port set 212B (and corresponding first channel lane 420B), the first set second WDM channel port 220A of the first WDM port set 212A (and corresponding second channel lane 422A), the second set third WDM channel port 222B of the second WDM port set 212B (and corresponding third channel lane 424B), and the first set fourth WDM channel port 224A of the first WDM port set 212A (and corresponding fourth channel lane 426A). Accordingly, the upper side 204A and lower side 204B of the substrate include alternating common ports of the first WDM port set 212A and the second WDM port set 212B.

The WDM optical core subassembly 200 defines a second optical path 414B including a second common lane 416B, a lateral path 418B, and a plurality of channel lanes 420B-426B. The lateral path 418B extends between an upper side 204A of the substrate 202 and a lower side 204B of the substrate 202 (and between an upper portion 410A of the trapezoidal-shaped prism 400 and a lower portion 410B of the trapezoidal-shaped prism 400) and from a left side to a right side of the substrate 202. In particular, a second optical signal (wavelengths $\lambda_1$-$\lambda_4$) extends along the second common lane 416B of the second optical path 414B from the second set WDM common port 216B to the left portion 412A of the second WDM filter 208B. A portion of the second optical signal (wavelengths $\lambda_2$) may pass through the second passband of the second WDM filter 208B to the first channel lane 420B to the second set first WDM channel port 218B. Any remaining portion of the second optical signal (wavelengths $\lambda_1$ and $\lambda_3$-$\lambda_4$) is reflected off the left portion 412A of the second WDM filter 208B to the lower oblique face 408B to the upper oblique face 408A to the right portion 412B of the first WDM filter 208A. A portion of the remaining first optical signal (wavelengths $\lambda_1$) may pass through the first passband of the first WDM filter 208A to the second channel lane 422B to the second set second WDM channel port 220B. Any remaining portion of the first optical signal (wavelengths $\lambda_3$-$\lambda_4$) is reflected off the right portion 412B of first WDM filter 208A to the upper oblique face 408A to the lower oblique face 408B to the left portion 412A of the fourth WDM filter 208D. A portion of the remaining optical signal (wavelengths $\lambda_4$) may pass through the fourth passband of the fourth WDM filter 208D to the third channel lane 424B to the second set third WDM channel port 222B. Any remaining portion of the first optical signal (wavelengths $\lambda_3$) is reflected off the left portion 412A of the fourth WDM filter 208D to the lower oblique face 408B to the upper oblique face 408A to the right portion 412B of the third WDM filter 208C. A portion of the remaining optical signal (wavelengths $\lambda_3$) may pass through the third passband of the third WDM filter 208C to the fourth channel lane 426B to the second set fourth WDM channel port 224B. Any remaining portion of the first optical signal is reflected off the right portion 412B of the third WDM filter 208C.

Figure 4D:
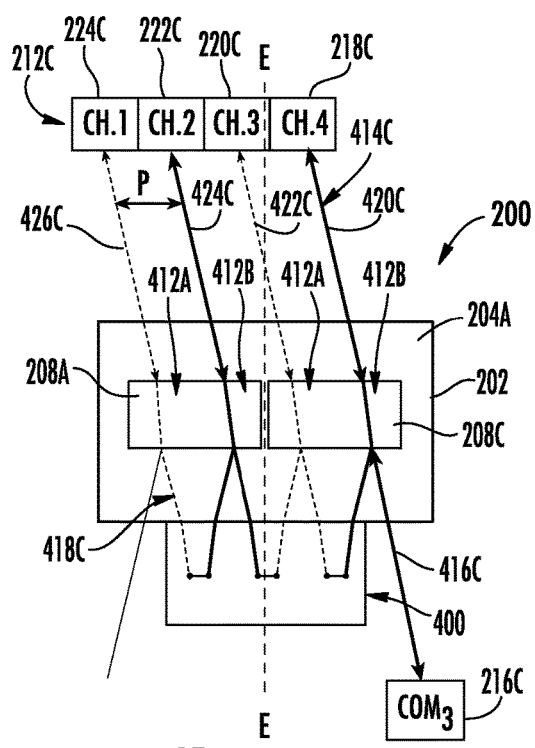
FIG. 4D is a top view of the optical core subassembly of FIG. 4A illustrating a third optical path between a third common port of a third WDM port set and four channel ports of the third WDM port set.

FIG. 4D is a top view of the optical core subassembly of FIG. 4A illustrating a third optical path between a third common port and four channel ports. The third common port 216C (also referred to as a third WDM common port, third common port, etc.) forms a third optical path 414C with each of the four channel ports 218C-224C. The third WDM port set 212C includes the third common port 216C positioned on an upper side 204A of the substrate 202 towards a right side and towards a front side of the trapezoidal-shaped prism 400. The third WDM port set 212C further includes a third set first channel port 218C at an upper side 204A of the substrate 202 towards the right side of the trapezoidal-shaped prism 400, a third set second channel port 220C at a lower side 204B of the substrate 202 towards the right side of the trapezoidal-shaped prism 400, a third set third channel port 222C at an upper side 204A of the substrate 202 towards the left side of the trapezoidal-shaped prism 400, and a third set fourth channel port 224C at a lower side 204B of the substrate 202 towards the left side of the trapezoidal-shaped prism 400. The third common port 216C is angled (or configured to direct an optical signal at an angle) relative to a center plane E-E of the trapezoidal-shaped prism (and/or substrate 202). The channel ports 218C-224C are similarly angled and/or configured as that of the third common port 216C (and opposite to the first set WDM common port 216A, second set WDM common port 216B, channel ports 218A-224A, and/or channel ports 218B-224B). Further, the trapezoidal-shaped prism 400 is positioned between the third common port 216C and the channel ports 218C-224C.

The WDM optical core subassembly 200 defines a third optical path 414C including a first common lane 416C, a lateral path 418C, and a plurality of channel lanes 420C-426C. The lateral path 418C extends between an upper side 204A of the substrate 202 and a lower side 204B of the substrate 202 (and between an upper portion 410A of the trapezoidal-shaped prism 400 and a lower portion 410B of the trapezoidal-shaped prism 400) and from a right side to a left side of the substrate 202. In particular, a third optical signal (wavelengths $\lambda_1$-$\lambda_4$) extends along the first common lane 416C of the third optical path 414C from the third common port 216C to the right portion 412B of the third WDM filter 208C. A portion of the first optical signal (wavelengths $\lambda_3$) may pass through the third passband of the third WDM filter 208C to the first channel lane 420C to the first channel port 218C. Any remaining portion of the first optical signal (wavelengths $\lambda_1$-$\lambda_2$ and $\lambda_4$) is reflected off the right portion 412B of the third WDM filter 208C to the upper oblique face 408A to the lower oblique face 408B to the left portion 412A of the fourth WDM filter 208D. A portion of the remaining first optical signal (wavelengths $\lambda_4$) may pass through the fourth passband of the fourth WDM filter 208D to the second channel lane 422C to the second channel port 220C. Any remaining portion of the first optical signal (wavelengths $\lambda_1$-$\lambda_2$) is reflected off the left portion 412A of second WDM filter 208B to the lower oblique face 408B to the upper oblique face 408A to the right portion 412B of the first WDM filter 208A. A portion of the remaining optical signal (wavelengths $\lambda_1$) may pass through the first passband of the first WDM filter 208A to the third channel lane 424C to the third channel port 222C. Any remaining portion of the first optical signal (wavelengths $\lambda_2$) is reflected off the right portion 412B of the first WDM filter 208A to the upper oblique face 408A to the lower oblique face 408B to the left portion 412A of the second WDM filter 208B. A portion of the remaining optical signal (wavelengths $\lambda_2$) may pass through the second passband of the second WDM filter 208B to the fourth channel lane 426D to the fourth channel port 224D. Any remaining portion of the third optical signal is reflected off the left portion 412A of the second WDM filter 208B.

Figure 4E:
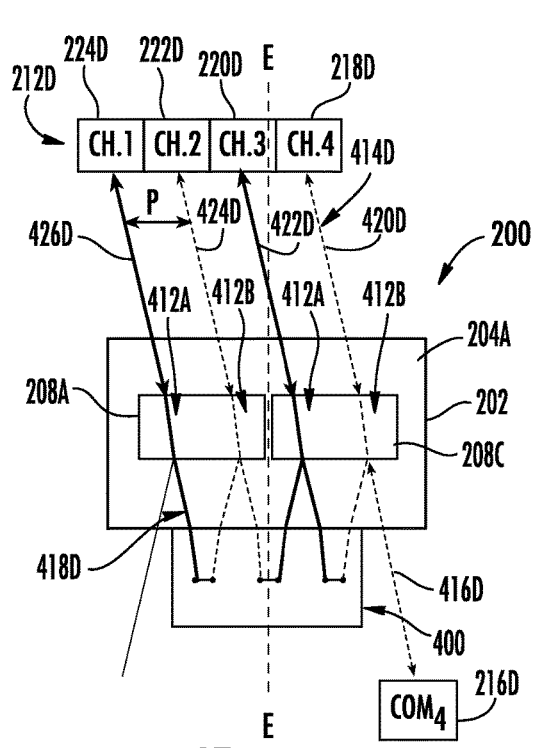
FIG. 4E is a top view of the optical core subassembly of FIG. 4A illustrating a fourth optical path between a fourth common port of a fourth WDM port set and four channel ports of the fourth WDM port set.

FIG. 4E is a top view of the optical core subassembly of FIG. 4A illustrating a fourth optical path between a fourth common port and four channel ports. The fourth common port 216D (also referred to as a fourth WDM common port, fourth common port, etc.) forms a fourth optical path 414D with each of the four channel ports 218D-224D. The fourth WDM port set 212D includes the fourth common port 216D positioned on a lower side 204B of the substrate 202 towards a right side and towards a front side of the trapezoidal-shaped prism 400. The fourth WDM port set 212D further includes a fourth set first channel port 218D at a lower side 204B of the substrate 202 towards the right side of the trapezoidal-shaped prism 400, a fourth set second channel port 220D at an upper side 204A of the substrate 202 towards the right side of the trapezoidal-shaped prism 400, a fourth set third channel port 222D at a lower side 204B of the substrate 202 towards the left side of the trapezoidal-shaped prism 400, and a fourth set fourth channel port 224D at an upper side 204A of the substrate 202 towards the left side of the trapezoidal-shaped prism 400. The fourth common port 216D is angled (or configured to direct an optical signal at an angle) relative to a center plane E-E of the trapezoidal-shaped prism (and/or substrate 202), the same (or similar) angle as the third common port 216C. Accordingly, the fourth common port 216D may be vertically aligned with the third common port 216C. The channel ports 218D-224D are similarly angled and/or configured as that of the fourth common port 216D, the third common port 216C, and/or the channel ports 218C-224C. The channel ports on the upper side 204A may be vertically aligned with the channel ports on the lower side 204B. Further, the trapezoidal-shaped prism 400 is positioned between the fourth common port 216D and the channel ports 218D-224D.

Accordingly, the upper side 204A of the substrate 202 includes (from right to left) the first channel port 218C of the third WDM port set 212C (and corresponding first channel lane 420C), the second channel port 220D of the fourth WDM port set 212D (and corresponding second channel lane 422D), the third channel port 222C of the third WDM port set 212C (and corresponding third channel lane 424C), the fourth channel port 224D of the fourth WDM port set 212D (and corresponding fourth channel lane 426D). Similarly, the lower side the lower side 204B of the substrate 202 includes (from right to left) the first channel port 218D of the fourth WDM port set 212D (and corresponding first channel lane 420D), the second channel port 220C of the third WDM port set 212C (and corresponding second channel lane 422C), the third channel port 222D of the fourth WDM port set 212D (and corresponding third channel lane 424D), the fourth channel port 224C of the third WDM port set 212C (and corresponding fourth channel lane 426C). Accordingly, the upper side 204A and lower side 204B of the substrate including alternating common ports of the third WDM port set 212C and the fourth WDM port set 212D.

The WDM optical core subassembly 200 defines a fourth optical path 414D including a fourth common lane 416D, a lateral path 418D, and a plurality of channel lanes 420D-426D. The lateral path 418D extends between an upper side 204A of the substrate 202 and a lower side 204B of the substrate 202 (and between an upper portion 410A of the trapezoidal-shaped prism 400 and a lower portion 410B of the trapezoidal-shaped prism 400) and from a right side to a left side of the substrate 202. In particular, a fourth optical signal (wavelengths $\lambda_1$-$\lambda_4$) extends along the fourth common lane 416D of the fourth optical path 414D from the fourth common port 216D to the right portion 412B of the fourth WDM filter 208D. A portion of the second optical signal (wavelengths $\lambda_4$) may pass through the fourth passband of the fourth WDM filter 208D to the first channel lane 420D to the first channel port 218D. Any remaining portion of the second optical signal (wavelengths $\lambda_1$-$\lambda_3$) is reflected off the right portion 412B of the fourth WDM filter 208D to the lower oblique face 408B to the upper oblique face 408A to the left portion 412A of the third WDM filter 208C. A portion of the remaining first optical signal (wavelengths $\lambda_3$) may pass through the third passband of the third WDM filter 208C to the second channel lane 422D to the second channel port 220D. Any remaining portion of the fourth optical signal (wavelengths $\lambda_1$-$\lambda_2$) is reflected off the left portion 412A of third WDM filter 208C to the upper oblique face 408A to the lower oblique face 408B to the right portion 412B of the second WDM filter 208B. A portion of the remaining optical signal (wavelengths $\lambda_2$) may pass through the second passband of the second WDM filter 208B to the third channel lane 424D to the third channel port 222D. Any remaining portion of the fourth optical signal is reflected off the right portion 412B of the second WDM filter 208B to the lower oblique face 408B to the upper oblique face 408A to the left portion 412A of the first WDM filter 208A. A portion of the remaining optical signal (wavelengths $\lambda_1$) may pass through the first passband of the first WDM filter 208A to the fourth channel lane 426D to the fourth channel port 224D. Any remaining portion of the first optical signal is reflected off the left portion 412A of the first WDM filter 208A.

Although, the first, second, third, and fourth optical paths 414A-414D are illustrated separately, the first, second, third, and fourth optical signals can be transmitted consecutively or simultaneously. In this way, the lateral paths 418A-418D of the first, second, third, and/or fourth optical paths 414A-414D may overlap with one another. Further, in some embodiments, the first, second, third, and/or fourth optical paths 414A-414D are configured to not interact with each other. Further, the first WDM port set 212A may be vertically even or offset from the third WDM port set 212C (e.g., a portion of the first WDM port set 212A is positioned between the upper side 204A of the substrate 202 and a portion of the third WDM port set 212C), and similarly, the second WDM port set 212B may be vertically even or offset from the fourth WDM port set 212D (e.g., the second WDM port set 212B is positioned between the lower side 204B of the substrate 202 and the fourth WDM port set 212D). The lanes of the optical paths 414A-414D are configured to operate, for example, up to 25 Gbps (e.g., with NRZ (nonreturn-to-zero) modulation), up to 50 Gbps (e.g., with PAM4 (pulse amplitude modulation 4)). These could provide solutions of an optical transmission rate of 200-400 Gbps, or more. Further, the WDM optical core subassembly 200 can enable up to 14.4 Tbps aggregate bandwidth in a single switch slot.

The WDM optical core subassembly 200 is bi-directional and can transmit and receive multiplexed signals. The double width of each of the WDM filters 208A-208D facilitates minimizing pitch distance (P) between adjacent channel lanes, if desired. In particular, the WDM optical core subassembly 200 avoids the necessity of cutting the WDM filters 208A into smaller pieces, which thereby avoids manufacturing difficulties. Further, the larger filter size can relax WDM coating layer surface tension stress, which in turn leads to flatter coating surface curvature, which reduces alignment error during manufacturing. The wider WDM filters 208A-208D discussed in FIGS. 2A-2E are easier to manufacture and provide smaller pitches between lanes of the optical paths. For example, if the pitch requirement is 250 üm, a filter width of 750 üm or more could be used, which is easily manufacturable.

Figure 5A:
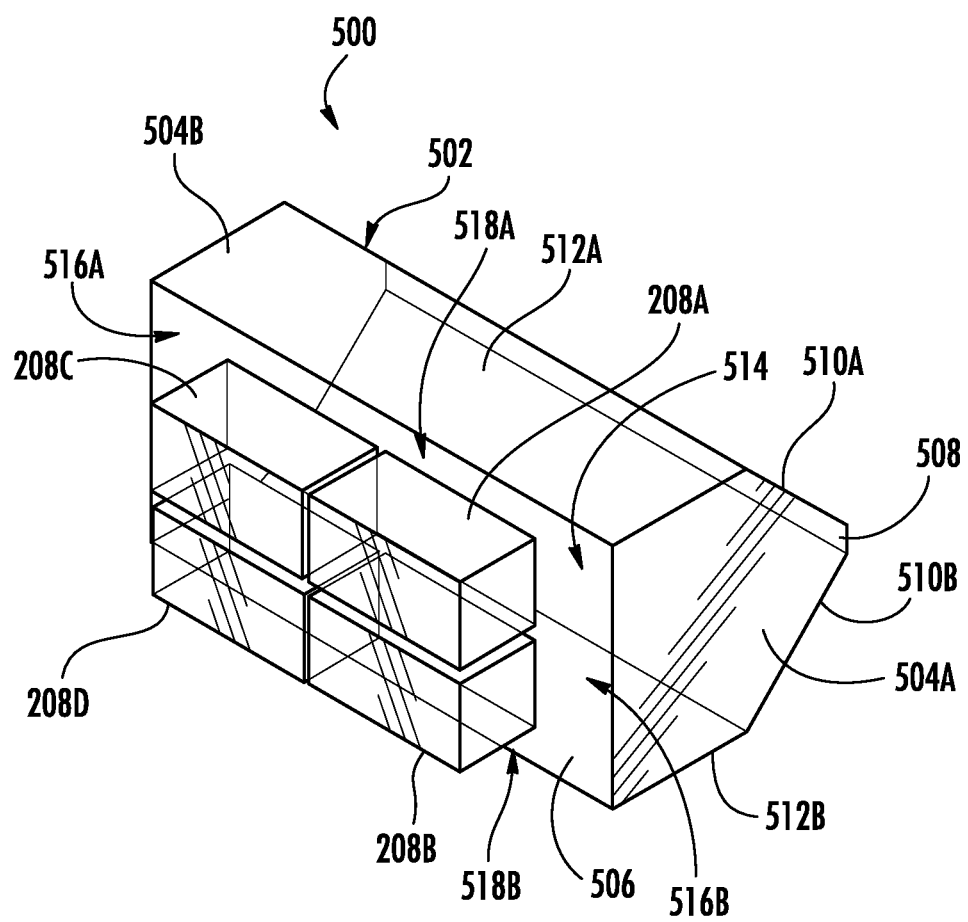
FIG. 5A is a back perspective view of another exemplary embodiment of the optical core subassembly of FIGS. 2A and 4A-4E.

FIGS. 5A-5E are views of another exemplary embodiment of an optical core subassembly 500 similar to the optical core subassembly 200 of FIGS. 2A and 4A-4E. FIG. 5A is a back perspective view of the optical core subassembly 500. The optical core subassembly 500 includes an optical signal router 206 and WDM filters 208A-208D. The optical core subassembly 500 may further comprise a substrate 202 and one or more WDM port sets 212A-212D (not shown). The optical core subassembly 500 is similar to that of FIGS. 4A-4E except where otherwise noted.

In particular, the optical signal router 206 comprises a pentagonal-shaped prism 502 (e.g., horizontally positioned relative to a substrate) for routing optical signals. The pentagonal-shaped prism 502 includes a first base 504A (also referred to as a left base, etc.), a second base 504B (also referred to as a right base, etc.) opposite the first base 504A. The first base 504A and second base 504B are each pentagonal-shaped. The pentagonal-shaped prism 502 further including a plurality of surfaces extending between the first base 504A and the second base 504B. In particular, the pentagonal-shaped prism 502 further includes a narrow face 508 (also referred to as a front face), a broad face 506 (also referred to as a back face) opposite the narrow face 508, an upper oblique face 510A extending upwardly and backwardly from an upper edge of the narrow face 508, and a lower oblique face 510B extending downwardly and backwardly from a lower edge of the narrow face 508 opposite the upper oblique face 510A. The pentagonal-shaped prism 502 further including an upper perpendicular face 512A extending from an upper edge of the broad face 506 to the upper oblique face 510A and a lower perpendicular face 512B extending from a lower edge of the broad face 506 to the lower oblique face 510B. The narrow face 508 acts as a chamfer and minimizes stress points, reducing damage (e.g., chipping) to the pentagonal-shaped prism 502. Thus, the narrow face 508 may be omitted.

The WDM filters 208A-208D are positioned the same as in the optical core subassembly 200 of FIGS. 2A-2E except that the WDM filters 208A-208D are mounted to or otherwise contact the broad face 506 of the pentagonal-shaped prism. When mounted, the broad face 506 and WDM filters 208A define a border frame 514. In particular, the border frame 514 includes a left portion 516A, a right portion 516B, a top portion 518A, and a bottom portion 518B. The top and bottom portions 518A, 518B provide clearance for mounting the WDM filters 208A-208D to the broad face 506 of the pentagonal-shaped prism 502. Accordingly, the top and bottom portions 518A, 518B may be reduced or omitted. The left and right portions 516A, 516B also provide clearance for mounting the WDM filters 208A-208D to the broad face 506 of the pentagonal-shaped prism 502. However, the left and right portions 516A, 516B also provide a point of entry and/or a point of exit for an optical signal from one of the common ports 216A-216D.

FIGS. 5B-5E are views of the optical core subassembly of FIG. 5A illustrating optical paths between a plurality of WDM port sets 212A-212D. In particular, the optical core subassembly 500 provides four common ports 216A-216D and sixteen channel ports 216A-224D using four WDM filters 208A (and four respective passbands). The signal routing and optical paths 414A-414D are the same as in FIGS. 4B-4E unless otherwise noted.

The first set WDM common port 216A of the first WDM port set 212A is positioned approximately horizontally adjacent to the channel ports towards a rear of the pentagonal-shaped prism 502 and to a left thereof. The second set WDM common port 216B of the second WDM port set 212B is positioned approximately horizontally adjacent to the channel ports towards a rear of the pentagonal-shaped prism 502 and to a left thereof. The third common port 216C of the third WDM port set 212C is positioned approximately horizontally adjacent to the channel ports towards a rear of the pentagonal-shaped prism 502 and to a right thereof. The fourth common port 216D of the fourth WDM port set 212D is positioned approximately horizontally adjacent to the channel ports towards a rear of the pentagonal-shaped prism 502 and to a right thereof. Placing the common ports 216A-216D horizontally adjacent to the channel ports 218A-224D decreases the depth ($D_1$) of the WDM optical core subassembly 500.

Figure 5B:
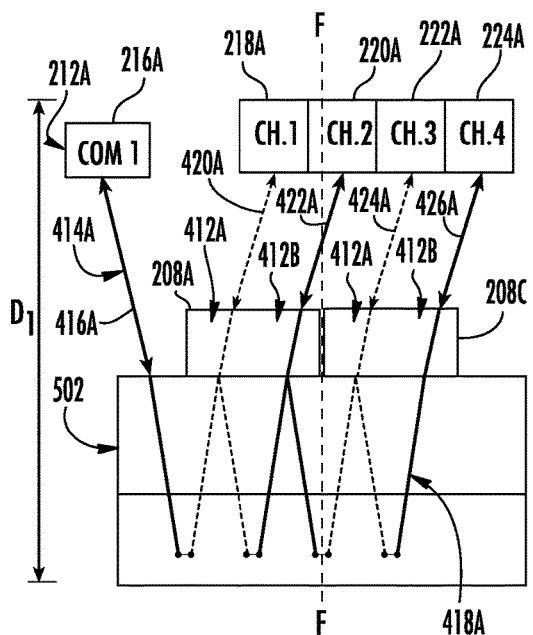
FIG. 5B is a top view of the optical core subassembly of FIG. 5A illustrating a first optical path between a first common port of a first WDM port set and four channel ports of the first WDM port set.

FIG. 5B is a top view of the optical core subassembly 500 of FIG. 5A illustrating a first optical path between the first set WDM common port 216A and the four channel ports 218A-224A. The first set WDM common port 216A forms a first optical path 414A with each of the four channel ports 218A-224A. The first WDM port set 212A includes the first set WDM common port 216A positioned on an upper side 204A of the broad face 406 towards a left side thereof. The first WDM port set 212A further includes a first set first WDM channel port 218A at a lower side of the broad face 406 towards the left side of the pentagonal-shaped prism 502, a first set second WDM channel port 220A at an upper side of the broad face 406 towards the left side of the pentagonal-shaped prism 502, a first set third WDM channel port 222A at a lower side of the broad face 406 towards the right side of the pentagonal-shaped prism 502, and a first set fourth WDM channel port 224A at an upper side of the broad face 406 towards the right side of the trapezoidal-shaped prism 502. The first set WDM common port 216A is angled (or configured to direct an optical signal at an angle) relative to a center plane F-F of the pentagonal-shaped prism (and/or substrate 202). The channel ports 218A-224A are angled opposite to the first set WDM common port 216A.

The WDM optical core subassembly 500 defines a first optical path 414A including a first common lane 416A, a lateral path 418A, and a plurality of channel lanes 420A-426A. The lateral path 418A extends between an upper portion 410A and a lower portion 410B of the broad face 506 and from a left side to a right side of the broad face 506. In particular, a first optical signal (wavelengths $\lambda_1$-$\lambda_4$) extends along the first common lane 416A of the first optical path 414A from the first set WDM common port 216A to the left portion 516A of the frame 514 of the broad face 506 to the upper oblique face 510A to the lower oblique face 510B to the left portion 412A of the second WDM filter 208B. A portion of the first optical signal (wavelengths $\lambda_2$) may pass through the second passband of the second WDM filter 208B to the first channel lane 420A to the first set first WDM channel port 218A. Any remaining portion of the first optical signal (wavelengths $\lambda_1$ and $\lambda_3$-$\lambda_4$) is reflected off the left portion 412A of the second WDM filter 208B to the lower oblique face 510B to the upper oblique face 510A to the right portion 412B of the first WDM filter 208A. A portion of the remaining first optical signal (wavelengths $\lambda_1$) may pass through the first passband of the first WDM filter 208A to the second channel lane 422A to the first set second WDM channel port 220A. Any remaining portion of the first optical signal (wavelengths $\lambda_3$-$\lambda_4$) is reflected off the right portion 412B of first WDM filter 208A to the upper oblique face 510A to the lower oblique face 510B to the left portion 412A of the fourth WDM filter 208D. A portion of the remaining optical signal (wavelengths $\lambda_4$) may pass through the fourth passband of the fourth WDM filter 208D to the third channel lane 424A to the first set third WDM channel port 222A. Any remaining portion of the first optical signal (wavelengths $\lambda_3$) is reflected off the left portion 412A of the fourth WDM filter 208D to the lower oblique face 510B to the upper oblique face 510A to the right portion 412B of the third WDM filter 208C. A portion of the remaining optical signal (wavelengths $\lambda_3$) may pass through the third passband of the third WDM filter 208C to the fourth channel lane 426A to the first set fourth WDM channel port 224A. Any remaining portion of the first optical signal is reflected off the right portion 412B of the third WDM filter 208C.

Figure 5C:
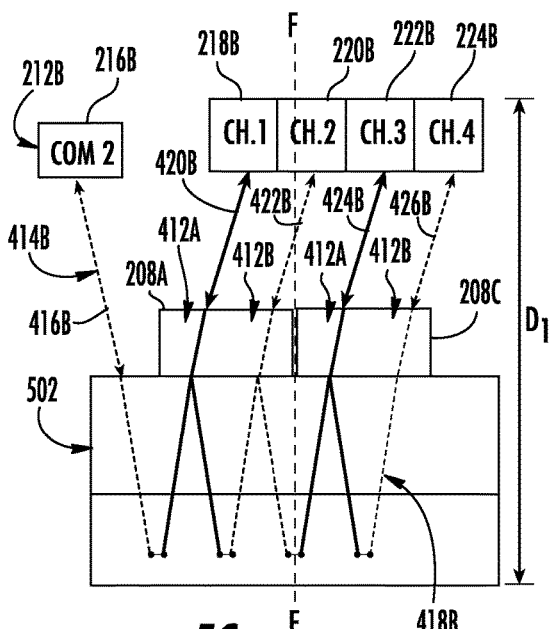
FIG. 5C is a top view of the optical core subassembly of FIG. 5B illustrating a second optical path between a second common port of a second WDM port set and four channel ports of the second WDM port set.

FIG. 5C is a top view of the optical core subassembly of FIG. 5A illustrating a second optical path between a second common port and four channel ports. The second set WDM common port 216B forms a second optical path 414B with each of the four channel ports 218B-224B. The second WDM port set 212B includes the second set WDM common port 216B positioned on a lower side 410B of the broad face 406 towards a left side thereof. The second WDM port set 212B further includes a second set first WDM channel port 218B at an upper side 204B of the substrate 202 towards the left side of the broad face 406, a second set second WDM channel port 220B at a lower side 204A of the substrate 202 towards the left side of the broad face 406, a first set third WDM channel port 222A at an upper side 204B of the substrate 202 towards the right side of the broad face 406, and a second set fourth WDM channel port 224B at a lower side 204A of the substrate 202 towards the right side of the broad face 406. The second set WDM common port 216B is angled (or configured to direct an optical signal at an angle) relative to a center plane F-F of the trapezoidal-shaped prism (and/or substrate 202), the same (or similar) angle as the first set WDM common port 216A. Accordingly, the first set WDM common port 216A may be vertically aligned with the second set WDM common port 216B. The channel ports 218B-224B are oppositely angled as that of the second set WDM common port 216B and/or the first set WDM common port 216A. Further, the channel ports 218B-224B are similarly angled and/or configured as the channel ports 218A-224A. The channel ports on the upper side may be vertically aligned with the channel ports on the lower side.

Accordingly, the upper side of the broad face 406 includes (from left to right) the second set first WDM channel port 218B of the second WDM port set 212B (and corresponding first channel lane 420B), the first set second WDM channel port 220A of the first WDM port set 212A (and corresponding second channel lane 422A), the second set third WDM channel port 222B of the second WDM port set 212B (and corresponding third channel lane 424B), the first set fourth WDM channel port 224A of the first WDM port set 212A (and corresponding fourth channel lane 426A). Similarly, the lower side the lower side 204B of the broad face 506 includes (from left to right) the first set first WDM channel port 218A of the first WDM port set 212A (and corresponding first channel lane 420A), the second set second WDM channel port 220B of the second WDM port set 212B (and corresponding second channel lane 422B), the first set third WDM channel port 222A of the first WDM port set 212A (and corresponding third channel lane 424A), the second set fourth WDM channel port 224B of the second WDM port set 212B (and corresponding fourth channel lane 426B). Accordingly, the upper side 204A and lower side 204B of the substrate including alternating common ports of the first WDM port set 212A and the second WDM port set 212B.

The WDM optical core subassembly 500 defines a second optical path 414B including a second common lane 416B, a lateral path 418B, and a plurality of channel lanes 420B-426B. The lateral path 418B extends between an upper portion 410A and a lower portion 410B of the broad face 506 and from a left side to a right side of the broad face 506. In particular, a second optical signal (wavelengths $\lambda_1$-$\lambda_4$) extends along the second common lane 416B of the second optical path 414B from the second set WDM common port 216B to the left portion 516A of the frame 514 of the broad face 506 to the lower oblique face 510B to the upper oblique face 510A to the left portion 412A of the first WDM filter 208A. A portion of the second optical signal (wavelengths $\lambda_1$) may pass through the first passband of the first WDM filter 208A to the first channel lane 420B to the second set first WDM channel port 218B. Any remaining portion of the second optical signal (wavelengths $\lambda_2$-$\lambda_4$) is reflected off the left portion 412A of the first WDM filter 208A to the upper oblique face 510A to the lower oblique face 510B to the right portion 412B of the second WDM filter 208B. A portion of the remaining first optical signal (wavelengths $\lambda_2$) may pass through the second passband of the second WDM filter 208B to the second channel lane 422B to the second set second WDM channel port 220B. Any remaining portion of the second optical signal (wavelengths $\lambda_3$-$\lambda_4$) is reflected off the right portion 412B of second WDM filter 208B to the lower oblique face 510B to the upper oblique face 510A to the left portion 412A of the third WDM filter 208C. A portion of the remaining optical signal (wavelengths $\lambda_3$) may pass through the third passband of the third WDM filter 208C to the third channel lane 424B to the second set third WDM channel port 222B. Any remaining portion of the second optical signal (wavelengths $\lambda_4$) is reflected off the left portion 412A of the third WDM filter 208C to the upper oblique face 510A to the lower oblique face 510B to the right portion 412B of the fourth WDM filter 208D. A portion of the remaining optical signal (wavelengths $\lambda_4$) may pass through the fourth passband of the fourth WDM filter 208D to the fourth channel lane 426B to the second set fourth WDM channel port 224B. Any remaining portion of the first optical signal is reflected off the right portion 412B of the fourth WDM filter 208D.

Figure 5D:
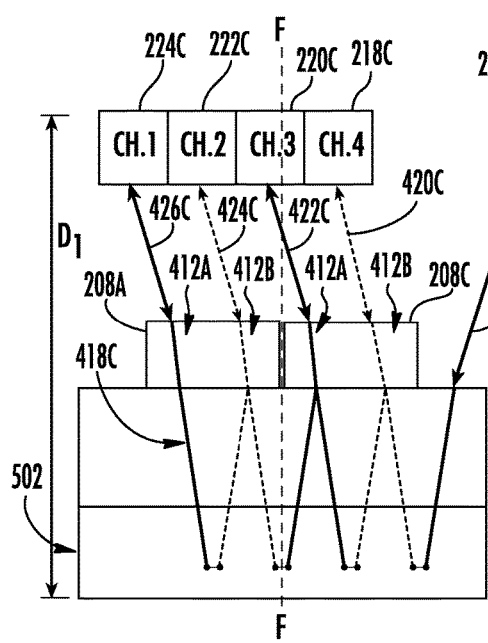
FIG. 5D is a top view of the optical core subassembly of FIG. 5C illustrating a third optical path between a third common port of a third WDM port set and four channel ports of the third WDM port set.

FIG. 5D is a top view of the optical core subassembly of FIG. 5A illustrating a third optical path between a third common port and four channel ports. The third common port 216C forms a third optical path 414C with each of the four channel ports 218C-224C. The third WDM port set 212C includes the third common port 216C positioned on an upper side 204A of the broad face 506 towards a right side thereof. The third WDM port set 212C further includes a first channel port 218C at a lower side 204A of the substrate 202 towards the right side of the broad face 506, a second channel port 220C at an upper side of the broad face 506 towards the right side thereof, a first set third WDM channel port 222A at a lower side of the broad face 506 towards the left side thereof, and a first set fourth WDM channel port 224A at an upper side of the broad face 506 towards the left side thereof. The third common port 216C is angled (or configured to direct an optical signal at an angle) relative to a center plane F-F of the pentagonal-shaped prism 502 (and/or substrate 202). The channel ports 218C-224C are oppositely angled as that of the third common port 216C (and similar to the first set WDM common port 216A, second set WDM common port 216B, channel ports 218A-224A, and/or channel ports 218B-224B).

The WDM optical core subassembly 500 defines a third optical path 414C including a first common lane 416C, a lateral path 418C, and a plurality of channel lanes 420C-426C. The lateral path 418C extends between an upper portion 410A and a lower portion 410B of the broad face 506 and from a left side to a right side of the broad face 506. In particular, a third optical signal (wavelengths $\lambda_1$-$\lambda_4$) extends along the first common lane 416C of the third optical path 414C from the third common port 216C to the right portion 516B of the frame 514 of the broad face 506 to the upper oblique face 510A to the lower oblique face 10B to the right portion 412B of the fourth WDM filter 208D. A portion of the first optical signal (wavelengths $\lambda_4$) may pass through the fourth passband of the fourth WDM filter 208D to the first channel lane 420C to the first channel port 218C. Any remaining portion of the first optical signal (wavelengths $\lambda_1$-$\lambda_3$) is reflected off the right portion 412B of the fourth WDM filter 208D to the lower oblique face 510B to the upper oblique face 510A to the left portion 412A of the third WDM filter 208C. A portion of the remaining first optical signal (wavelengths $\lambda_3$) may pass through the third passband of the third WDM filter 208C to the second channel lane 422C to the second channel port 220C. Any remaining portion of the third optical signal (wavelengths $\lambda_1$-$\lambda_2$) is reflected off the left portion 412A of third WDM filter 208C to the upper oblique face 510A to the lower oblique face 510B to the right portion 412B of the second WDM filter 208B. A portion of the remaining optical signal (wavelengths $\lambda_2$) may pass through the second passband of the second WDM filter 208B to the third channel lane 424C to the third channel port 222C. Any remaining portion of the third optical signal (wavelengths $\lambda_1$) is reflected off the right portion 412B of the second WDM filter 208B to the lower oblique face 510B to the upper oblique face 510A to the left portion 412A of the first WDM filter 208A. A portion of the remaining optical signal (wavelengths $\lambda_1$) may pass through the first passband of the first WDM filter 208A to the fourth channel lane 426D to the fourth channel port 224D. Any remaining portion of the third optical signal is reflected off the left portion 412A of the first WDM filter 208A.

Figure 5E:
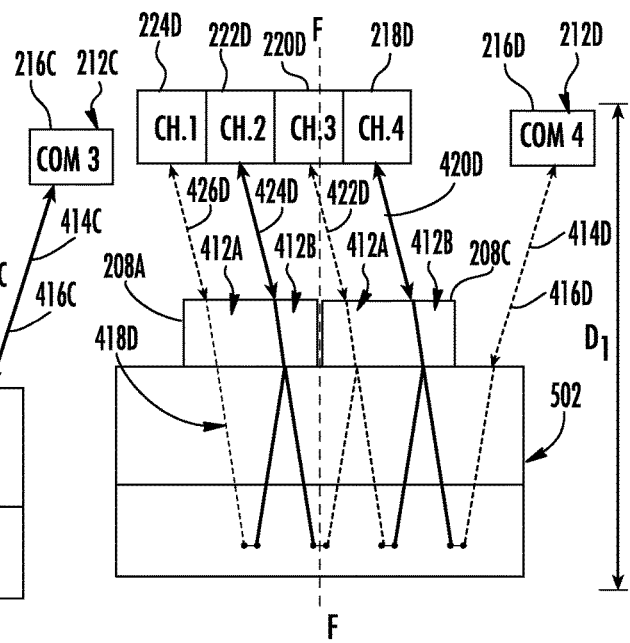
FIG. 5E is a top view of the optical core subassembly of FIG. 5D illustrating a fourth optical path between a fourth common port of a fourth WDM port set and four channel ports of the fourth WDM port set.

FIG. 5E is a top view of the optical core subassembly of FIG. 5A illustrating a fourth optical path between a fourth common port and four channel ports. The fourth common port 216D forms a fourth optical path 414D with each of the four channel ports 218D-224D. The fourth WDM port set 212D includes the fourth common port 216D positioned on a lower side 204B of the broad face 506 towards a right side thereof. The fourth WDM port set 212D further includes a first channel port 218D at an upper side of the broad face 506 towards the right side thereof, a second set second WDM channel port 220B at a lower side of the broad face 506 towards the right side thereof, a third channel port 222D at an upper side of the broad face 506 towards the left side thereof, and a fourth channel port 224D at a lower side of the broad face 506 towards the left side thereof. The fourth common port 216D is angled (or configured to direct an optical signal at an angle) relative to a center plane F-F of the pentagonal-shaped prism 502 (and/or substrate), the same (or similar) angle as the third common port 216C. Accordingly, the fourth common port 216D may be vertically aligned with the third common port 216C. The channel ports 218D-224D are oppositely angled as that of the fourth common port 216D and/or the third common port 216C. Further, the channel ports 218D-224D are similarly angled and/or configured as the channel ports 218C-224C. The channel ports on the upper side may be vertically aligned with the channel ports on the lower side.

Accordingly, the upper side of the broad face 506 includes (from right to left) the first channel port 218D of the fourth WDM port set 212D (and corresponding first channel lane 420D), the second channel port 220C of the third WDM port set 212C (and corresponding second channel lane 422C), the third channel port 222D of the fourth WDM port set 212D (and corresponding third channel lane 424D), the third channel port 224C of the third WDM port set 212C (and corresponding fourth channel lane 426C). Similarly, the lower side of the substrate includes (from right to left) the first channel port 218C of the third WDM port set 212C (and corresponding first channel lane 420C), the second channel port 220D of the fourth WDM port set 212D (and corresponding second channel lane 422D), the third channel port 222C of the third WDM port set 212C (and corresponding third channel lane 424C), the fourth channel port 224D of the fourth WDM port set 212D (and corresponding fourth channel lane 426D). Accordingly, the upper side and lower side of the substrate include alternating common ports of the third WDM port set 212C and the fourth WDM port set 212D.

The WDM optical core subassembly 200 defines a fourth optical path 414D including a fourth common lane 416D, a lateral path 418D, and a plurality of channel lanes 420D-426D. The lateral path 418D extends between an upper portion 410A and a lower portion 410B of the broad face 506 and from a left side to a right side of the broad face 506. In particular, a fourth optical signal (wavelengths $\lambda_1$-$\lambda_4$) extends along the fourth common lane 416D of the fourth optical path 414D from the fourth common port 216D to the right portion 516B of the frame 514 of the broad face 506 to the lower oblique face 510B to the upper oblique face 510A to the right portion 412B of the third WDM filter 208C. A portion of the fourth optical signal (wavelengths $\lambda_3$) may pass through the third passband of the third WDM filter 208C to the first channel lane 420D to the first channel port 218D. Any remaining portion of the second optical signal (wavelengths $\lambda_1$-$\lambda_2$ and $\lambda_4$) is reflected off the right portion 412B of the third WDM filter 208C to the upper oblique face 510A to the lower oblique face 510B to the left portion 412A of the fourth WDM filter 208D. A portion of the remaining fourth optical signal (wavelengths $\lambda_4$) may pass through the fourth passband of the fourth WDM filter 208D to the second channel lane 422D to the second channel port 220D. Any remaining portion of the fourth optical signal (wavelengths $\lambda_1$-$\lambda_2$) is reflected off the left portion 412A of fourth WDM filter 208D to the lower oblique face 510B to the upper oblique face 510A to the right portion 412B of the first WDM filter 208A. A portion of the remaining optical signal (wavelengths $\lambda_1$) may pass through the first passband of the first WDM filter 208A to the third channel lane 424D to the third channel port 222D. Any remaining portion of the fourth optical signal (wavelengths $\lambda_2$) is reflected off the right portion 412B of the first WDM filter 208A to the upper oblique face 510A to the lower oblique face 510B to the left portion 412A of the second WDM filter 208B. A portion of the remaining optical signal (wavelengths $\lambda_2$) may pass through the second passband of the second WDM filter 208B to the fourth channel lane 426D to the fourth channel port 224D. Any remaining portion of the first optical signal is reflected off the left portion 412A of the second WDM filter 208B.

Although, the first, second, third, and fourth optical paths 414A-414D are illustrated separately, the first, second, third, and fourth optical signals can be transmitted consecutively or simultaneously. In this way, the lateral paths 418A-418D of the first, second, third, and fourth optical paths 414A-414D may overlap with one another. Further, the first WDM port set 212A may be vertically even or offset from the third WDM port set 212C (e.g., the first WDM port set 212A is positioned between the upper side 204A of the substrate 202 and the third WDM port set 212C), and similarly the second WDM port set 212B may be vertically even or offset from the fourth WDM port set 212D (e.g., the second WDM port set 212B is positioned between the lower side 204B of the substrate 202 and the fourth WDM port set 212D).

Figure 6A:
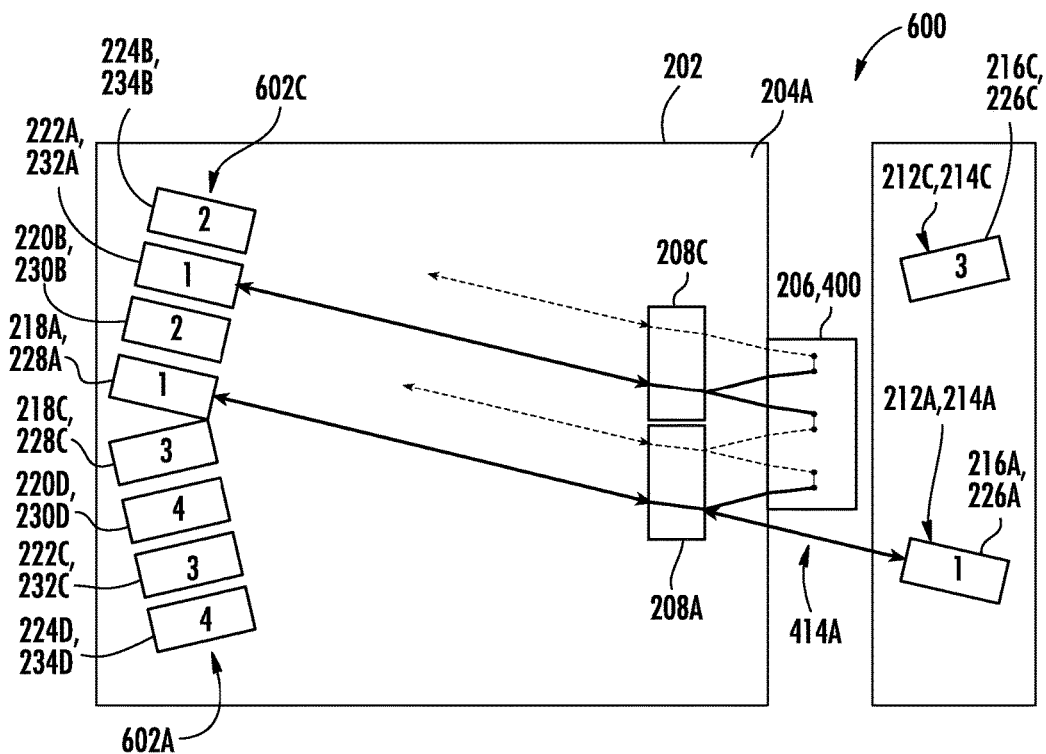
FIG. 6A is a top view of another exemplary embodiment of the WDM optical assembly of FIG. 2B incorporating the WDM optical core subassembly of FIGS. 4A-4E and illustrating a first optical path between a first common optical collimator of a first WDM collimator set and four channel collimators of the first WDM collimator set.
Figure 6B:
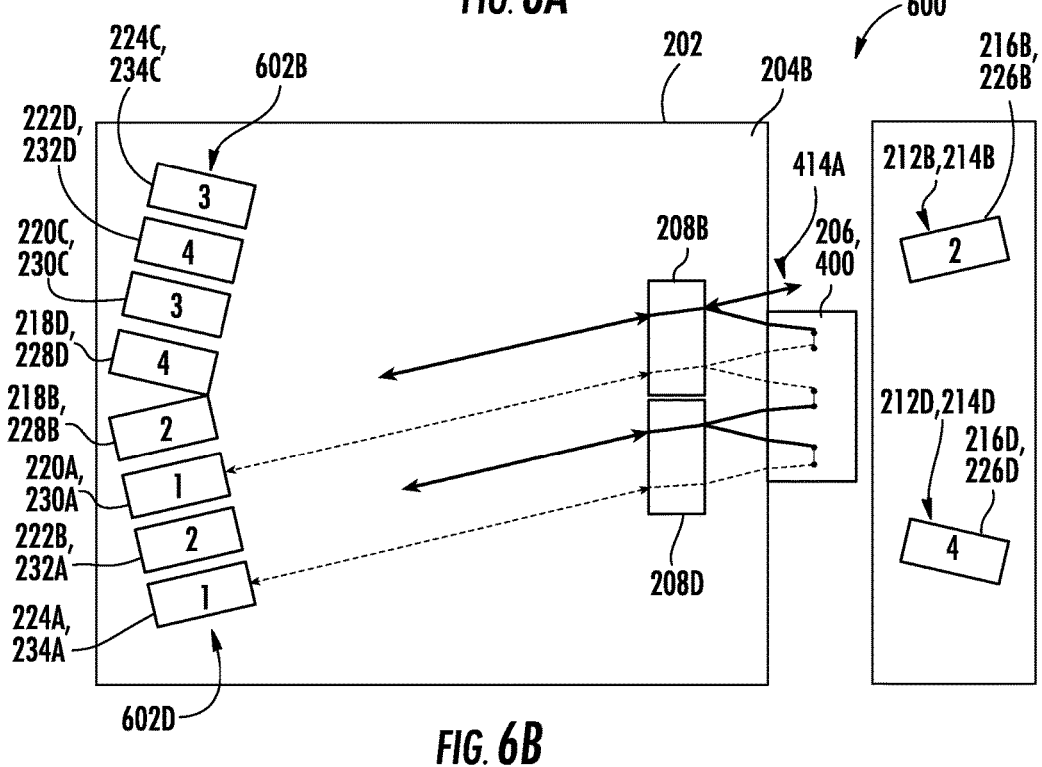
FIG. 6B is a bottom view of the WDM optical assembly of FIG. 6A.

FIGS. 6A-6B are views of another exemplary embodiment of the WDM optical assembly of FIG. 2B and illustrating a first optical path between a first common collimator and four channel collimators. A WDM optical assembly 600 provides four WDM port sets 212A-212D embodied as four WDM collimator sets 214A-214D which includes four common ports 216A-216D embodied as four common collimators 226A-226D and sixteen channel ports 218A-224D embodied as sixteen channel collimators 228A-234D using four WDM filters 208A-208D (and four respective passbands). In particular, the WDM optical assembly 600 includes a first WDM collimator set 214A (including a first set WDM common collimator 226A (also referred to as a first WDM common collimator, first common collimator, etc.), first set first WDM channel collimator 228A, first set second WDM channel collimator 230A, first set third channel WDM collimator 232A, and first set fourth WDM channel collimator 234A), a second WDM collimator set 214B (including a second set WDM common collimator 226B (also referred to as a second WDM common collimator, second common collimator, etc.), second set first WDM channel collimator 228B, second set second WDM channel collimator 230B, second set third WDM channel collimator 232B, and second set fourth WDM channel collimator 234B), a third WDM collimator set 214C (including a third set WDM common collimator 226C (also referred to as a third WDM common collimator, third common collimator, etc.), third set first WDM channel collimator 228C, third set second WDM channel collimator 230C, third set third WDM channel collimator 232C, and third set fourth WDM channel collimator 234C), and a fourth WDM collimator set 214D (including a fourth set WDM common collimator 226D (also referred to as a fourth WDM common collimator, fourth common collimator, etc.), fourth set first WDM channel collimator 228D, fourth set second WDM channel collimator 230D, fourth set third WDM channel collimator 232D, and fourth set fourth WDM channel collimator 234D). The collimators of the first, second, third, and fourth sets of collimators 214A, 214B, 214C, 214D form a first array 602A on an upper side 204A of the substrate 202 towards a left side thereof, a second array 602B on a lower side 204B of the substrate 202 towards a left side thereof, a third array 602C on the upper side 204A of the substrate 202 towards a right side thereof, and a fourth array 602D on the lower side 204B of the substrate 202 towards a right side thereof. The first array 602A and the second array 602B include alternating channel collimators from the third WDM collimator set 214C and the fourth WDM collimator set 214D, and the third array 602C and the fourth array 602D include alternating channel collimators from the first WDM collimator set 214A and the second WDM collimator set 214B. In particular, the setup is similar to that discussed in FIGS. 4A-5E.

The first array 602A and third array 602C are positioned on the upper side 204A of the substrate 202. In the WDM optical assembly 600, the first array 602A and the third array 602C must be positioned at a specific angle to be in line with their respective first, second, third, and fourth optical paths 414A-414D (second through fourth optical paths 414A-414D are shown in FIGS. 4A-4E). Further, if the first array 602A and the third array 602C are vertically aligned with one another (e.g., no relative vertical offset), then there is a minimum horizontal distance the first array 602A and third array 602C can be to one another (e.g., until one of the collimators of the first array 602A contacts one of the collimators of the third array 602C). Accordingly, there is a minimum distance the first array 602A and the third array 602C must be from the WDM filters 208A-208D and/or the optical signal router 206 (embodied as trapezoidal-shaped prism 400) in order to maintain the appropriate angle to receive the optical signal.

Similarly, the second array 602B and fourth array 602D are positioned on the lower side 204B of the substrate 202. In the WDM optical assembly 600, the second array 602B and the fourth array 602D must be positioned at a specific angle to be in line with their respective first, second, third, and fourth optical paths 414A-414D. Further, if the second array 602B and the fourth array 602D are vertically aligned with one another (e.g., no relative vertical offset), then there is a minimum horizontal distance the second array 602B and fourth array 602D can be to one another (e.g., until one of the collimators of the second array 602B contacts one of the collimators of the fourth array 602D). Accordingly, there is a minimum distance the second array 602B and the fourth array 602D must be from the WDM filters 208A-208D and/or the optical signal router 206 (in order to maintain the appropriate angle to receive the optical signal).

FIGS. 7A-8D are views of exemplary embodiments of the WDM optical assembly including a channel port router to decrease the depth of the WDM optical assembly. It is noted that for illustrative purposes, only the collimators in direct contact with the first optical path 414A receive that portion of the first optical path 414A. Some portions of the first optical path 414A are shortened between the figures to indicate direction, but the shortened portion of the optical path 414A is not received by the collimator in line with the shortened portion (because it is on the opposite side of the substrate 202).

In particular, FIGS. 7A-7E illustrate a WDM optical assembly 700 with a channel port router 702. In particular, the channel port router 702 includes an upper set 704A of pentagonal-shaped prisms 706 positioned on an upper side 204A of the substrate 202 and a lower set 704B of pentagonal-shaped prisms 706 positioned on a lower side 204B of the substrate 202.

Figure 7A:
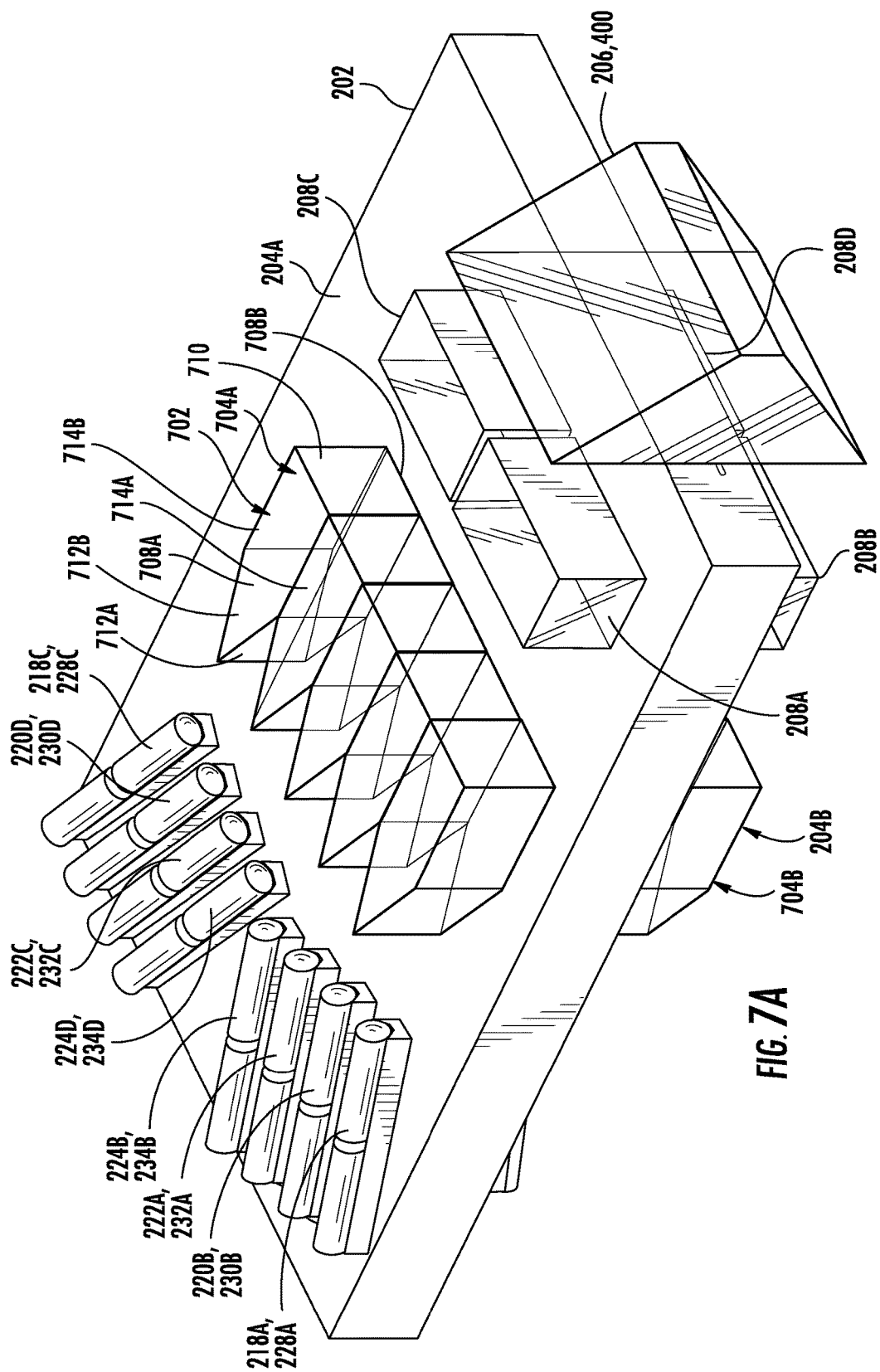
FIG. 7A is a front perspective view of another exemplary embodiment of the WDM optical assembly of FIGS. 6A-6B including a channel port router to decrease depth of the WDM optical assembly, the channel port router including a plurality of pentagonal-shaped prisms.
Figure 7B:
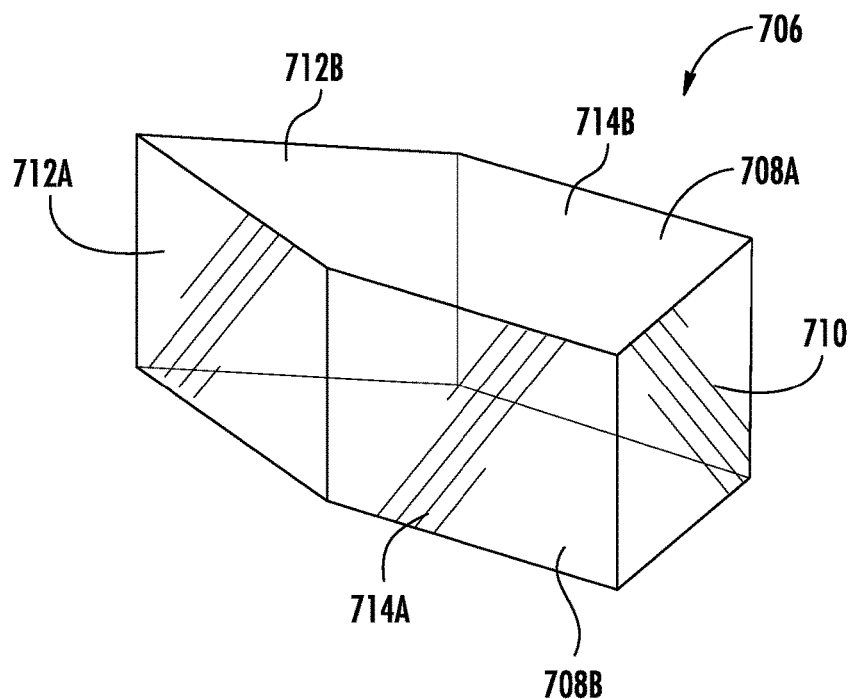
FIG. 7B is a front perspective view of the pentagonal-shaped prism of FIG. 7A.
Figure 7C:
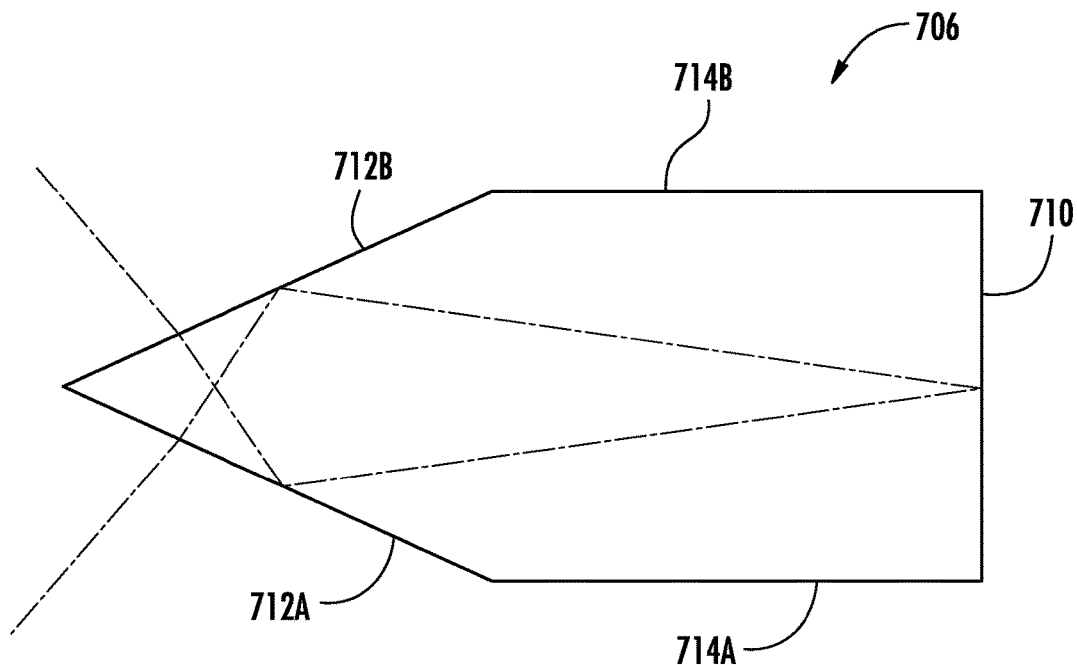
FIG. 7C is a top view of the pentagonal-shaped prism of FIG. 7A.

Referring specifically to FIG. 7B, each pentagonal-shaped prism 706 includes a first base 708A (also referred to as a distal base, etc.), and a second base 708B (also referred to as a medial base, etc.) opposite thereto. The first base 708A and second base 708B are each pentagonal-shaped (and vertically oriented). The pentagonal-shaped prism 706 further includes a plurality of faces 710-714B (also referred to as surfaces) extending between the first base 708A and the second base 708B. Specifically, each pentagonal-shaped prism 706 includes a front face 710 (e.g., anti-reflective (AR) coated) positioned to face a front of the WDM optical assembly 700, a first oblique face 712A (e.g., AR coated) and a second oblique face 712B (e.g., AR coated) positioned opposite the front face 710, a first perpendicular face 714A positioned between the front face 710 and the first oblique face 712A, and a second perpendicular face 714B positioned between the front face 710 and the second oblique face 712B. The pentagonal-shaped prism 706 is designed so that the angle of incident is greater than Brewster angle, such that total internal reflection occurs.

The front face 710 of each pentagonal-shaped prism 706 provides an optical signal entry surface and/or an optical signal exit surface. The first and second oblique faces 712A, 712B provides an optical signal entry surface, an optical signal exit surface, a first optical signal redirecting surface, and/or a second optical signal redirecting surface. For example, an optical signal which enters the front face 710 is reflected by the second oblique face 712B (e.g., by total internal reflection) and exits the first oblique face 712A, and similarly an optical signal may enter the first oblique face 712A, is reflected by the second oblique face 712B and exits through the front face 710.

Figure 7D:
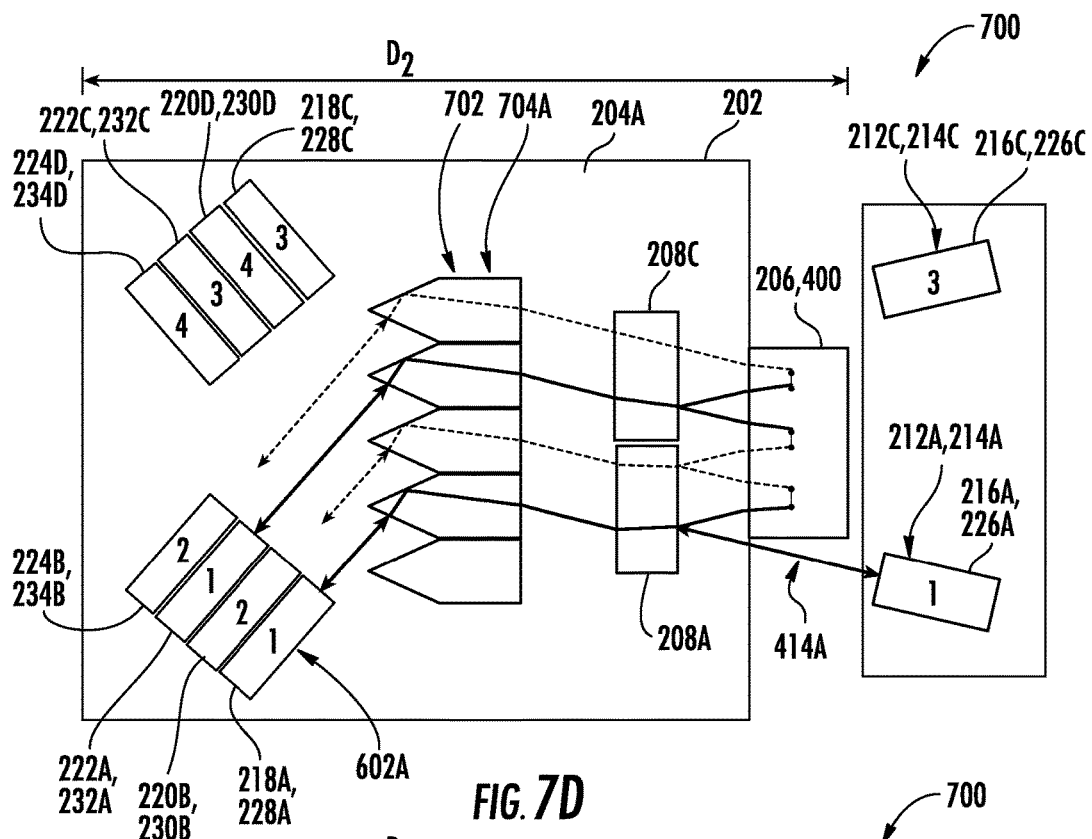
FIG. 7D is a top view of the WDM optical assembly of FIG. 7A illustrating a first optical path between a first common optical collimator of the first WDM collimator set and four channel collimators of the first WDM collimator set.
Figure 7E:
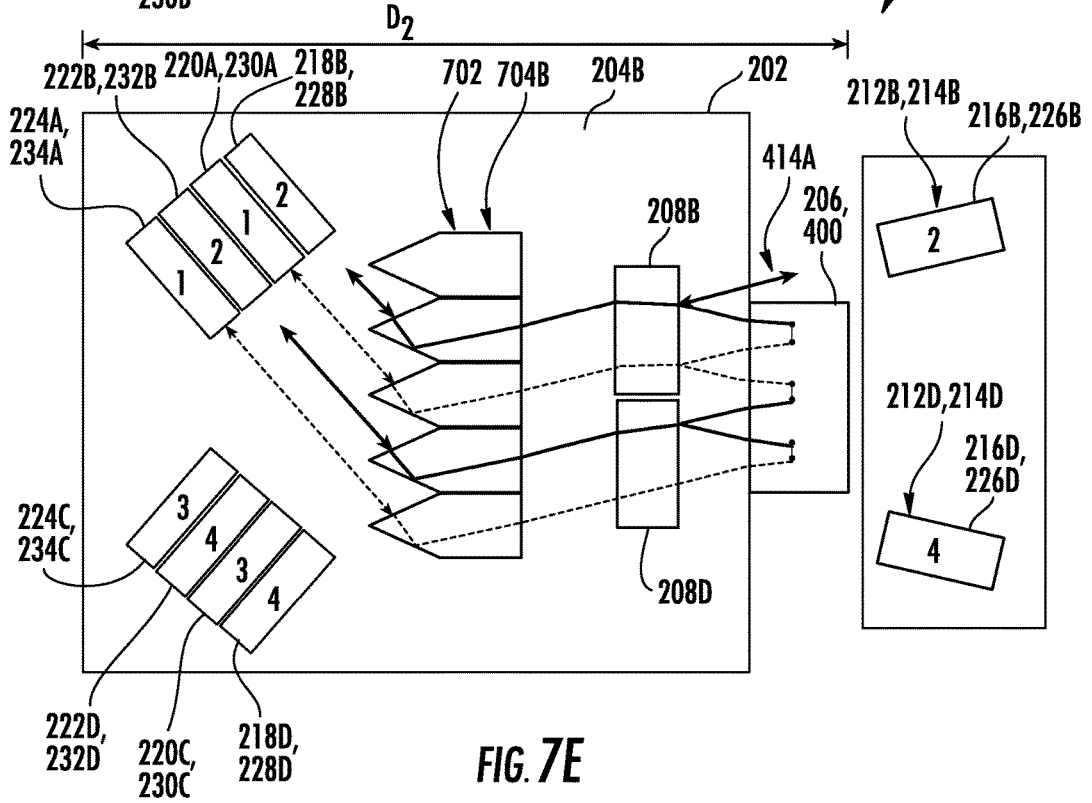
FIG. 7E is a bottom view of the WDM optical assembly of FIG. 7B.
Figure 8A:
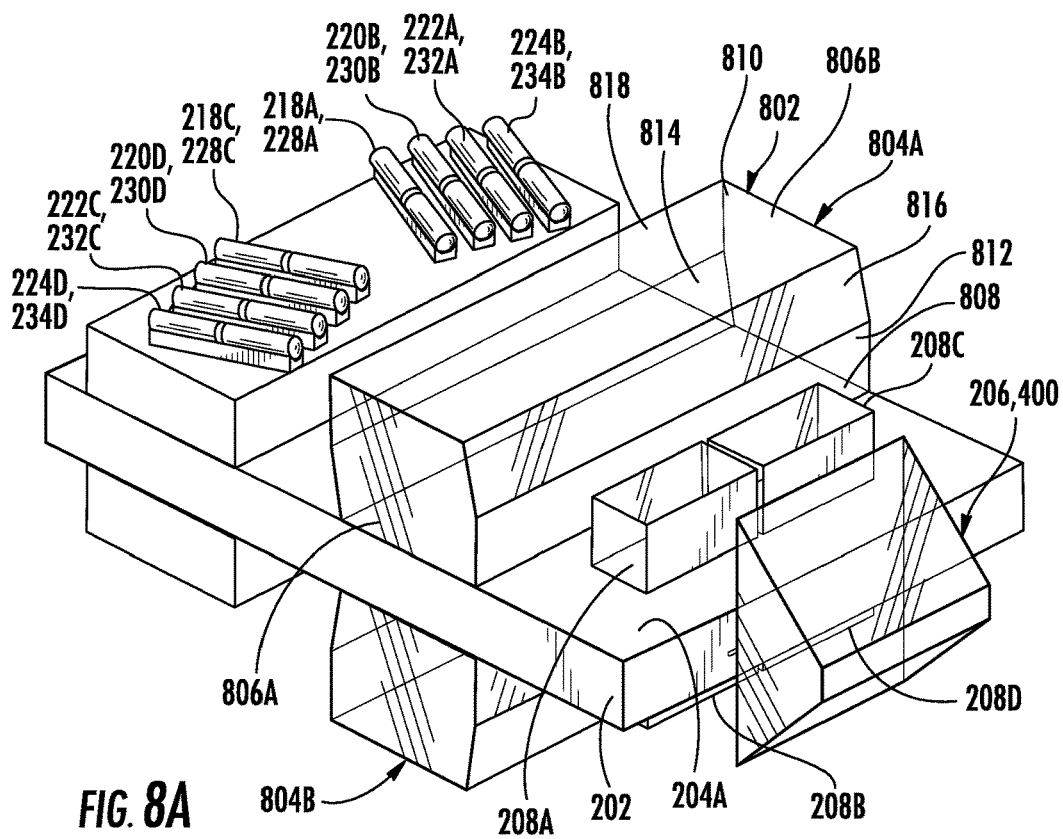
FIG. 8A is a front perspective view of another embodiment of the optical assembly of FIGS. 6A-7C including another exemplary embodiment of the channel port router of FIGS. 7A-7C, the channel port router including a plurality of octagonal-shaped prisms.
Figure 8B:
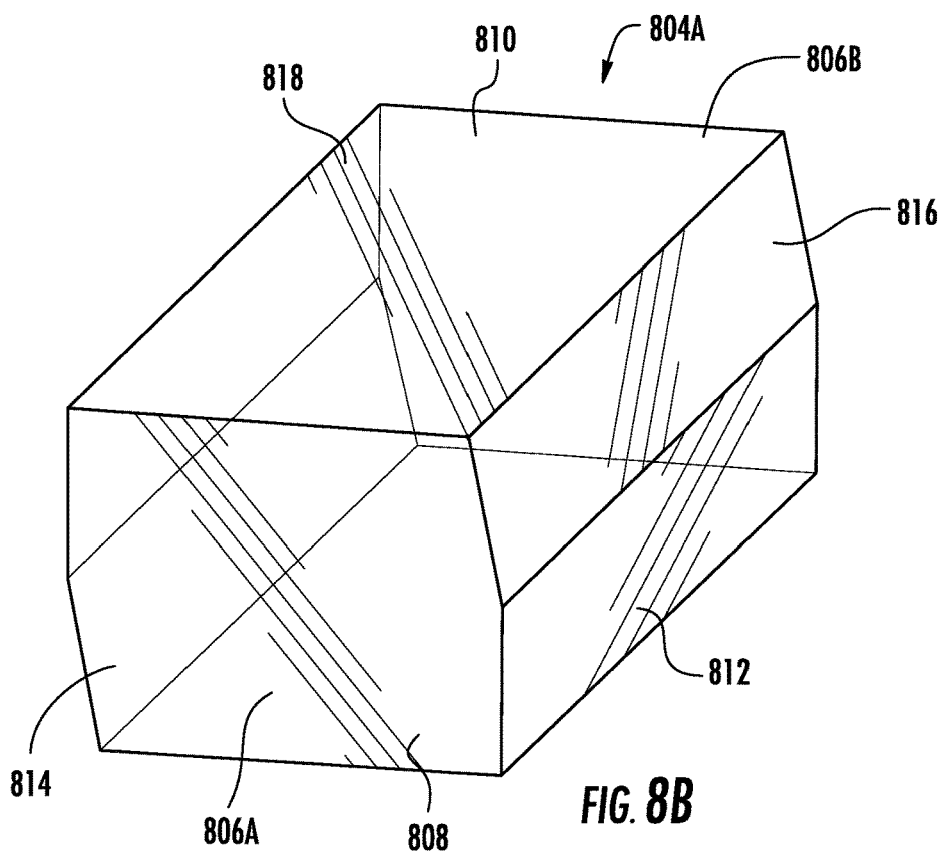
FIG. 8B is a front perspective view of the upper octagonal-shaped prism of the optical assembly of FIG. 8A.
Figure 8C:
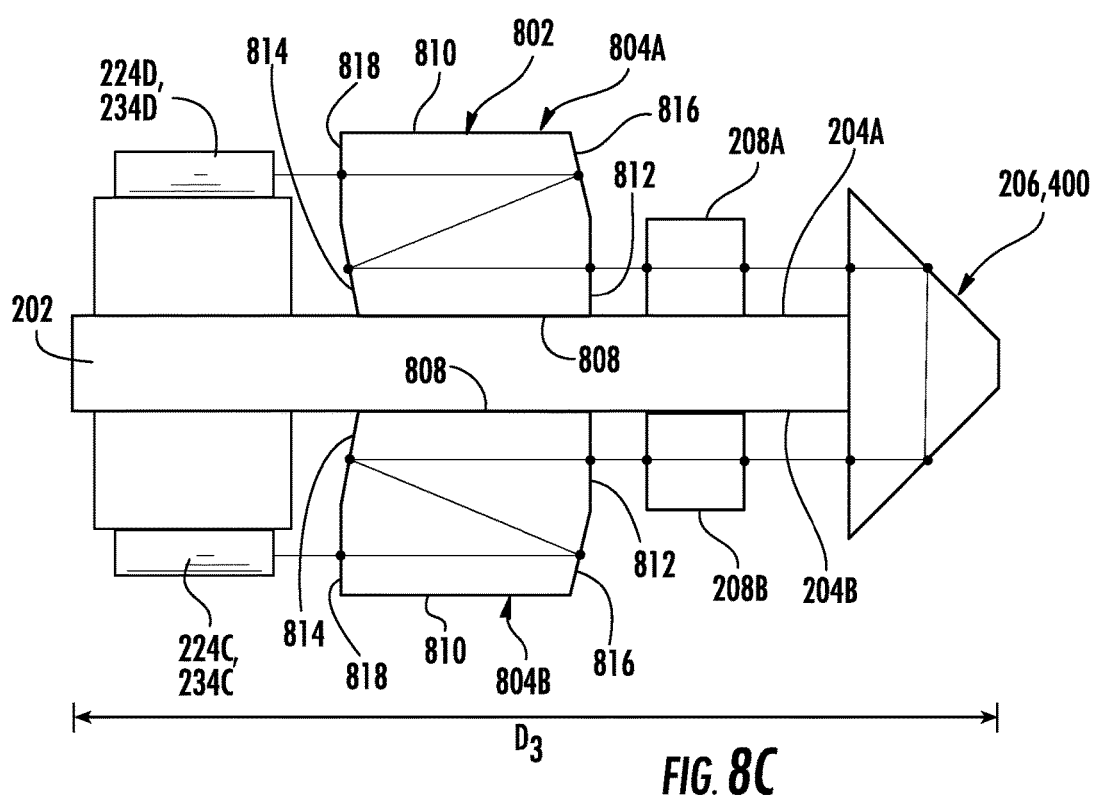
FIG. 8C is a side view of the WDM optical assembly of FIG. 8A.
Figure 8D:
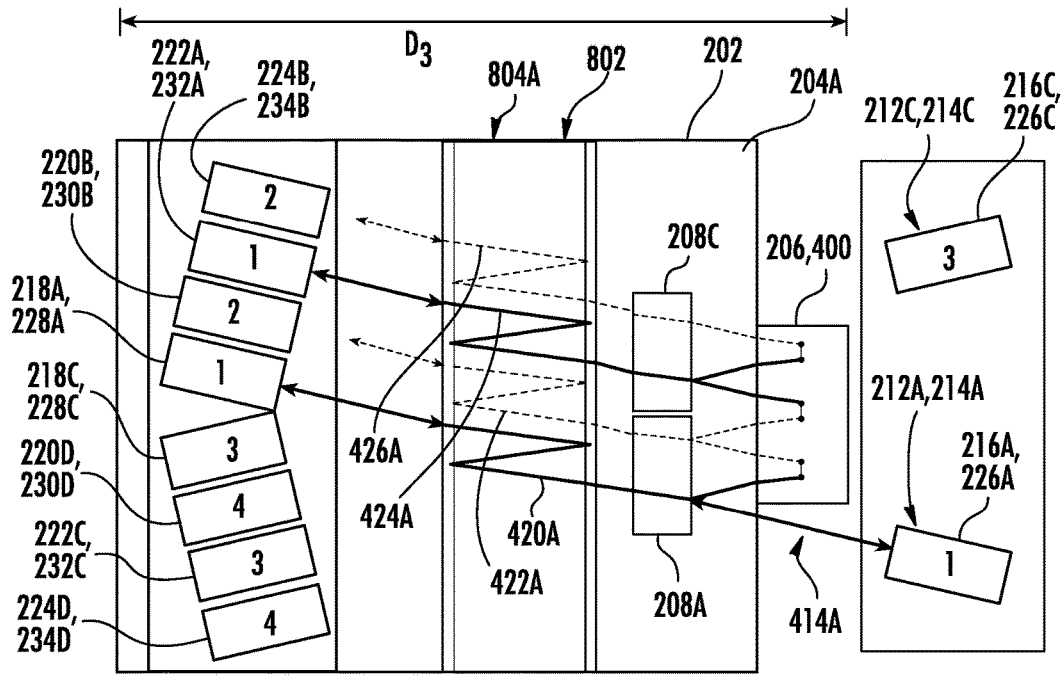
FIG. 8D is a top view of the WDM optical assembly of FIG. 8A illustrating a first optical path between a first common optical collimator of the first WDM collimator set and four channel collimators of the first WDM collimator set.
Figure 8E:
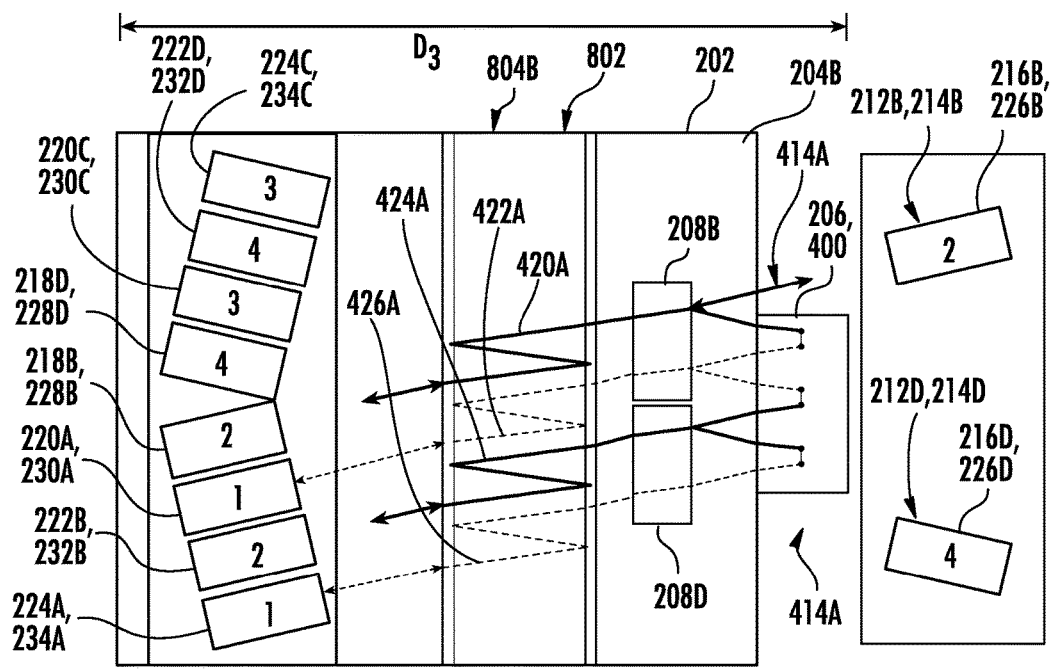
FIG. 8E is a bottom view of the WDM optical assembly of FIG. 8A.
Figure 9A:
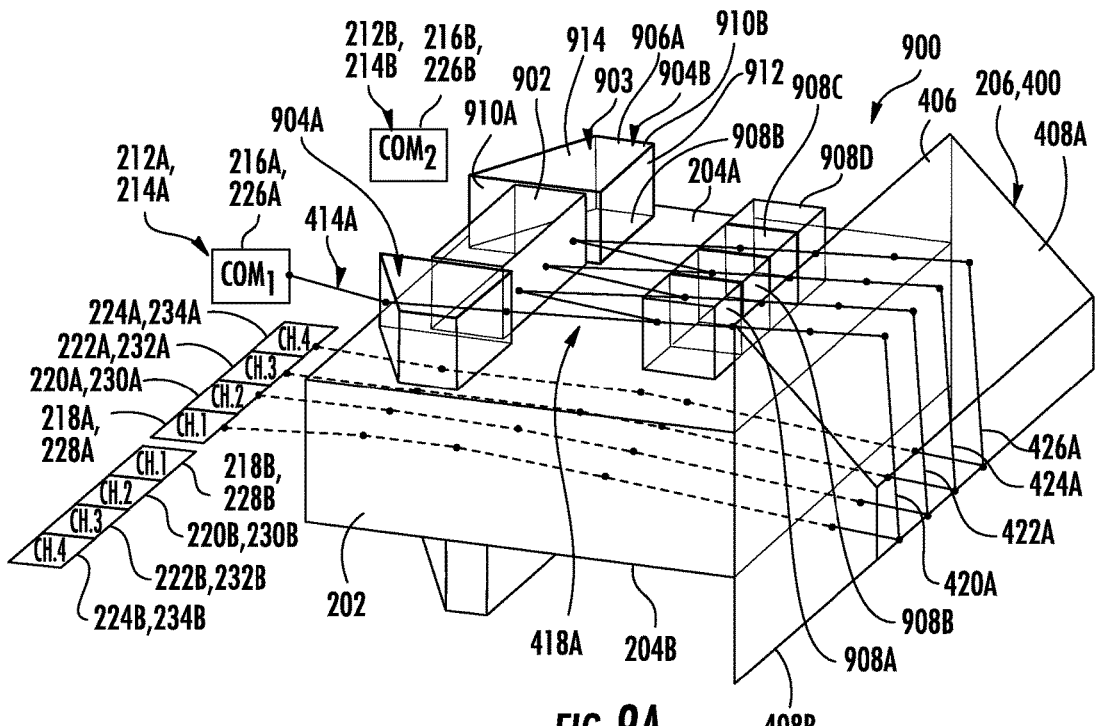
FIG. 9A is a top perspective view of another exemplary embodiment of the optical assembly of FIGS. 6A-6B including a mirror positioned between a first common optical collimator and a second common optical collimator on an upper side of a substrate, and illustrating a first optical path between the first common optical collimator of the first WDM collimator set and four channel collimators of the first WDM collimator set.
Figure 9B:
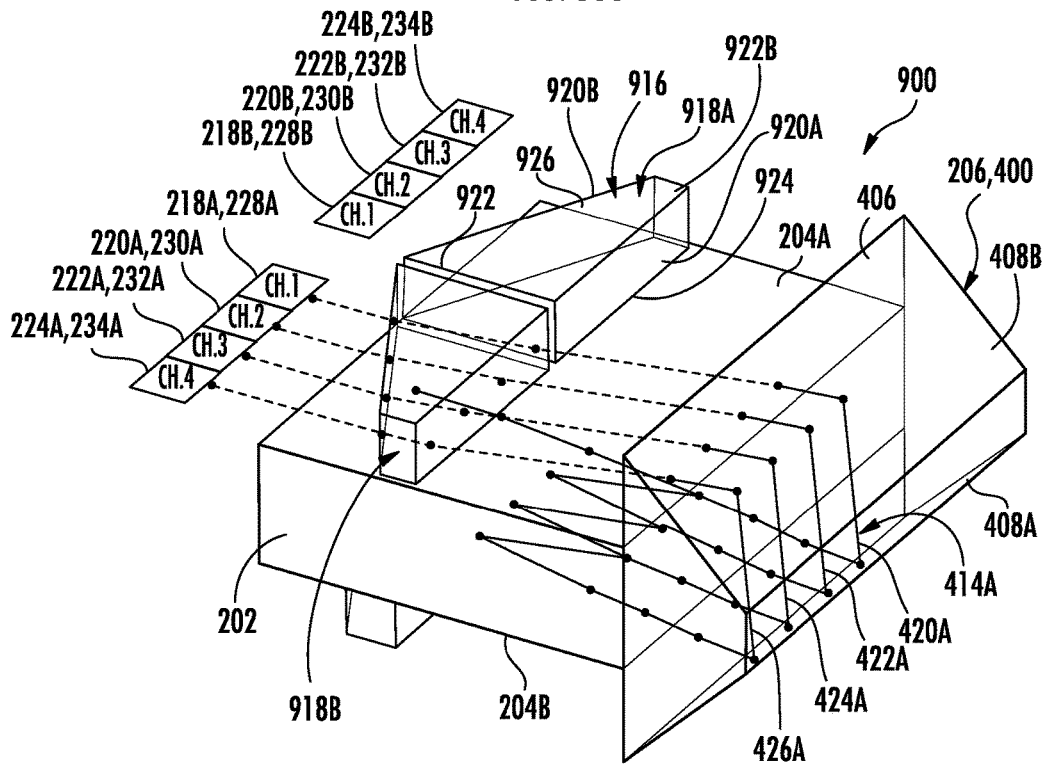
FIG. 9B is a bottom perspective view of the optical assembly of FIG. 9A.
Figure 9C:
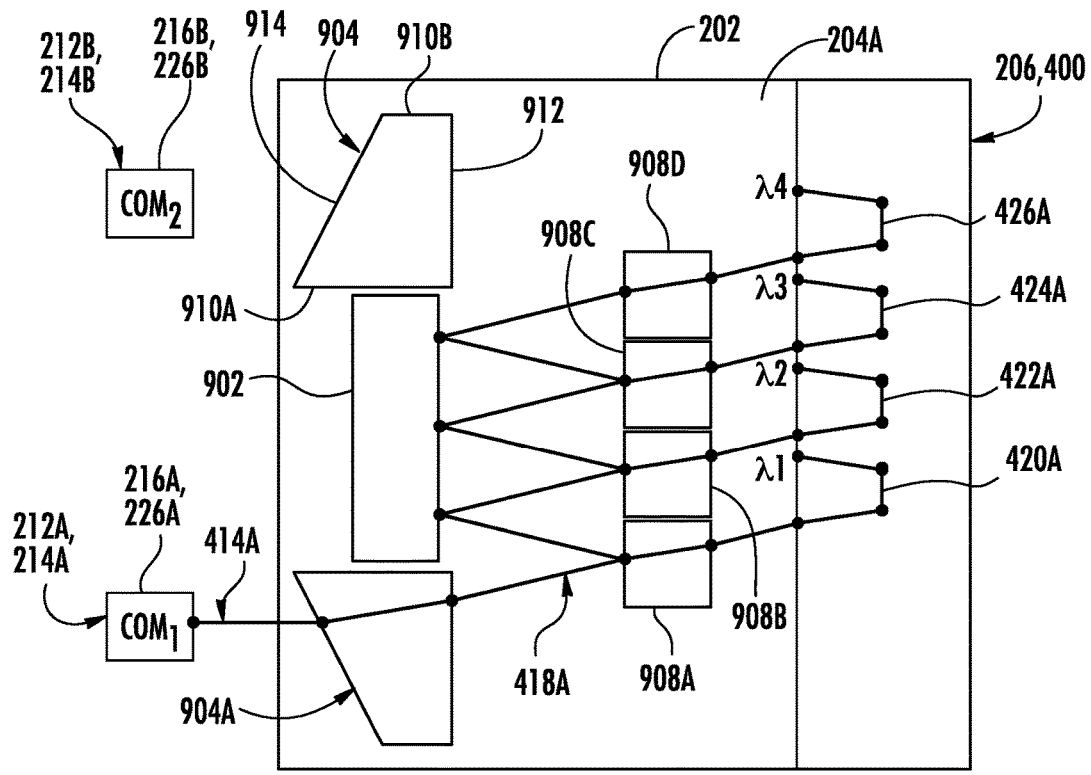
FIG. 9C is a top view of the optical assembly of FIG. 9A.
Figure 9D:
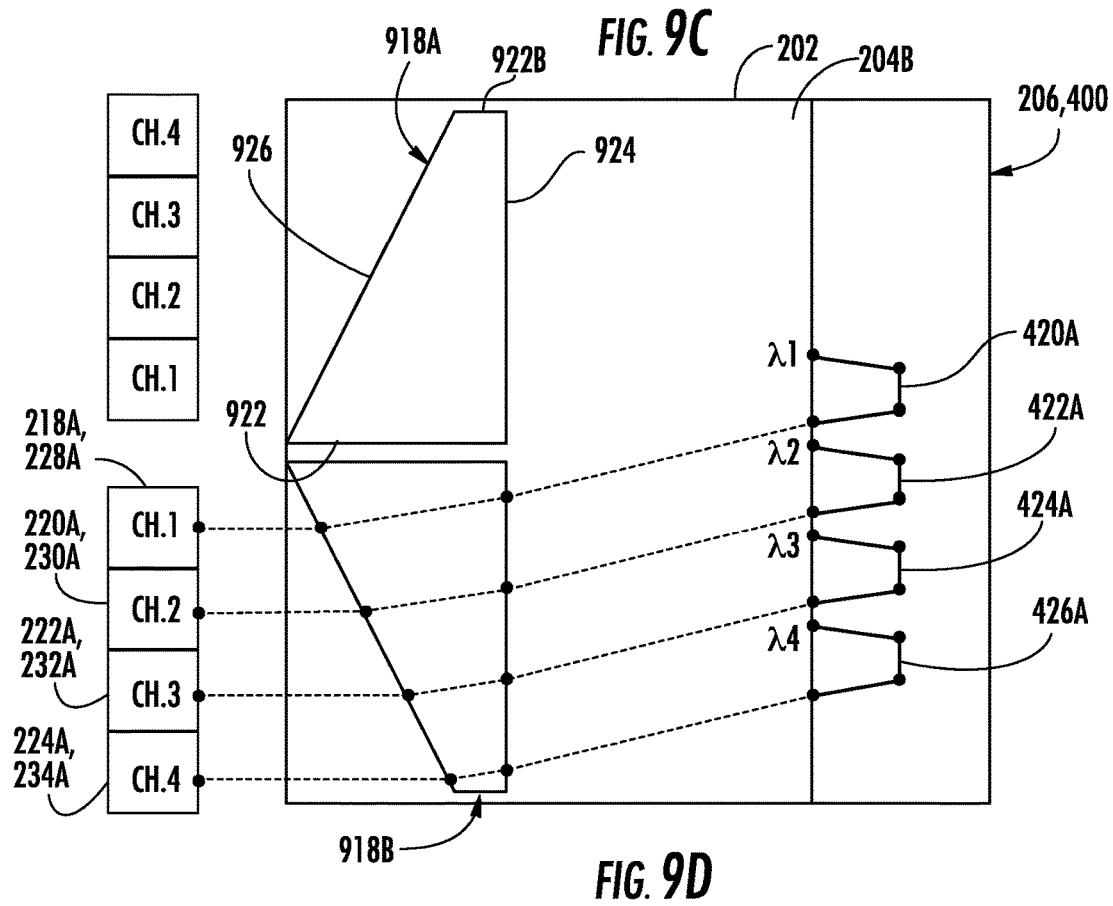
FIG. 9D is a bottom view of the optical assembly of FIG. 9A.
Figure 9E:
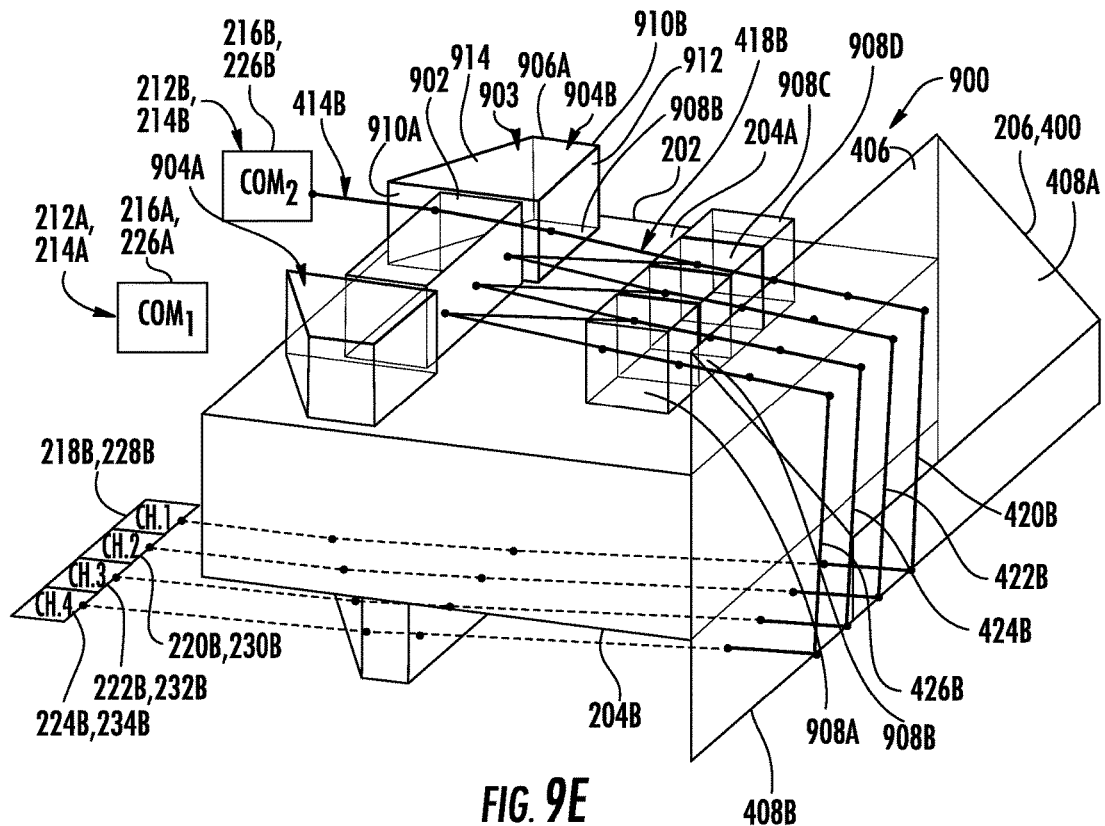
FIG. 9E is a top perspective view of the optical assembly of FIG. 9A illustrating a second optical path between a second common optical collimator of the second WDM collimator set and four channel collimators of the second WDM collimator set.
Figure 9F:
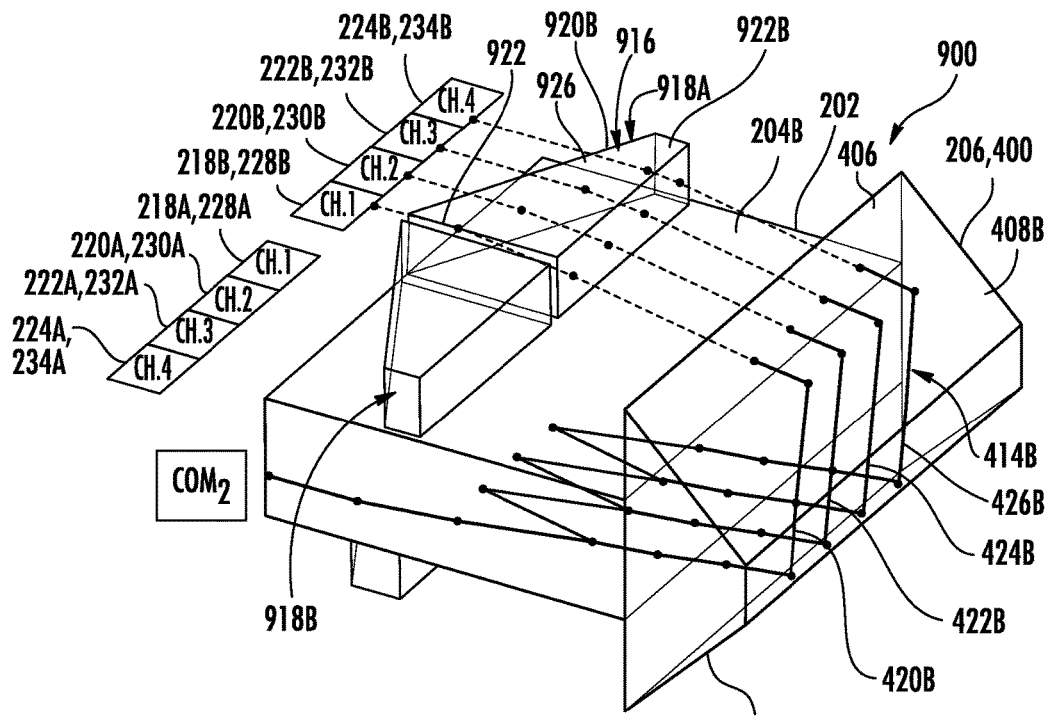
FIG. 9F is a bottom perspective view of the optical assembly of FIG. 9E.
Figure 9G:
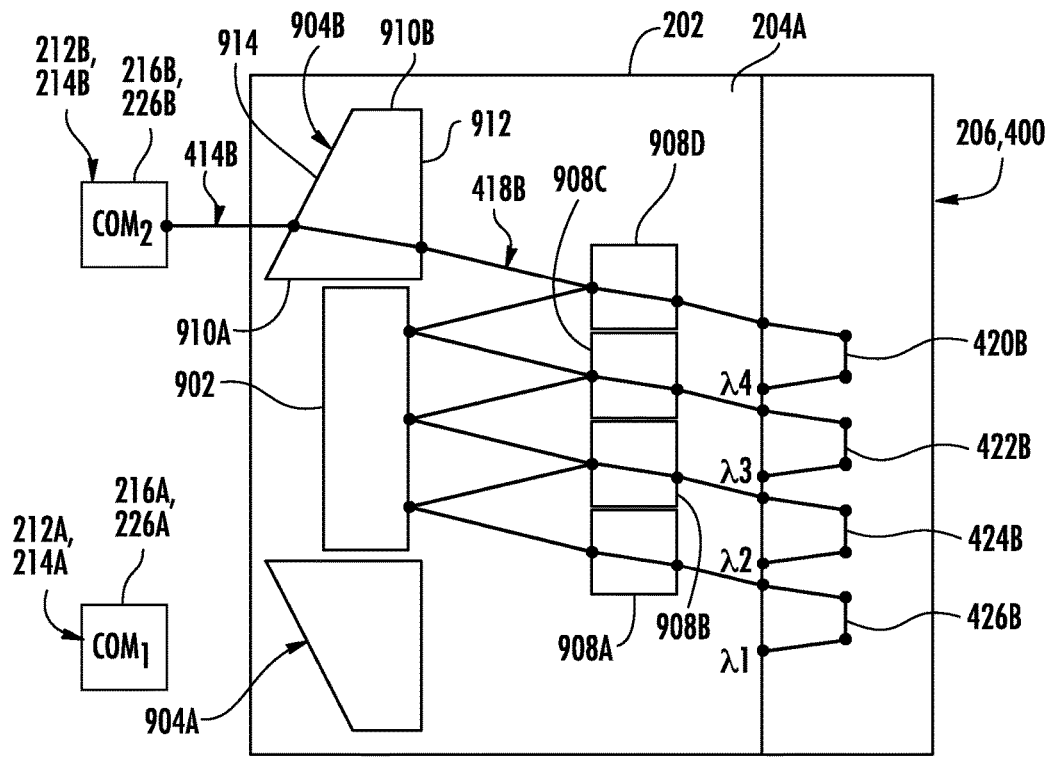
FIG. 9G is a top view of the optical assembly of FIG. 9E.
Figure 9H:
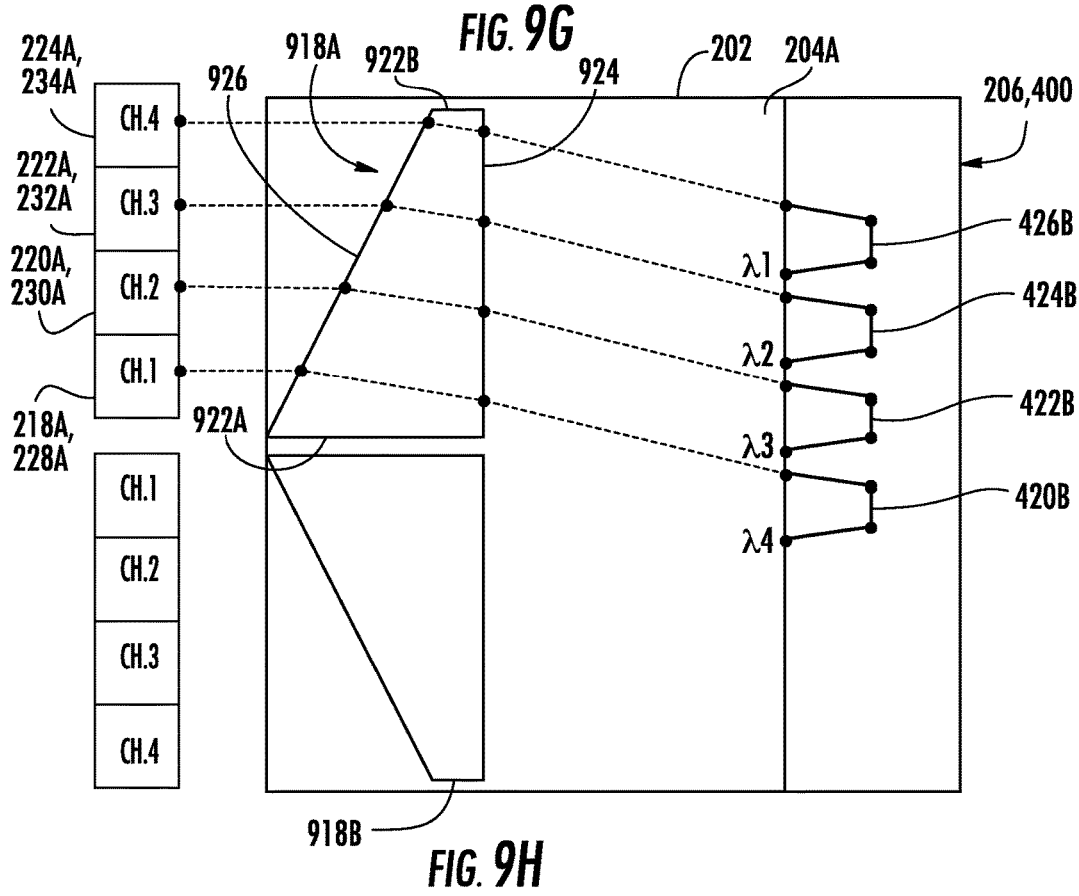
FIG. 9H is a bottom view of the optical assembly of FIG. 9E.

Referring again to FIGS. 7A-7E, the pentagonal-shaped prism 706 redirects the first, second, third, and fourth channel lanes of the first, second, third, and fourth optical paths 414A, 414B, 414C, 414D (shown in FIGS. 4A-4E) to alter the angle of entry into the channel collimators of the first, second, third, and fourth sets of collimators 214A-214D (shown in FIGS. 4A-4E). For example, FIGS. 7D and 7E illustrate the first optical path 414A of the first WDM collimator set 214A (and omit the second, third, and fourth optical paths 414B-414D for purposes of illustrative clarity only). The pentagonal-shaped prism 706 minimizes the minimum depth ($D_2$) required for the WDM optical assembly 700 (e.g., minimizes the distance between the channel collimators and the optical signal router 206 and/or WDM filters 208A-208D).

FIGS. 8A-8E are views of another exemplary embodiment of the WDM optical assembly including a channel port router to decrease the depth ($D_3$) of the WDM optical assembly. In particular, FIGS. 8A-8E illustrate a WDM optical assembly 800 with a channel port router 802. The channel port router 802 includes an upper octagonal-shaped prism 804A and a lower octagonal-shaped prism 804B. Each of the upper and lower octagonal-shaped prisms 804A, 804B includes a first base 806A (also referred to as a left base, etc.) and a second base 806B (also referred to as a right base, etc.) opposite the first base 806A. The first base 806A and second base 806B are each octagonal shaped and horizontally oriented. The octagonal-shaped prism 804A, 804B further includes a plurality of faces 808-818 (also referred to as surfaces) extending between the first base 806A and the second base 806B. Each of the octagonal-shaped prism 804A, 804B includes a medial horizontal face 808 and a distal horizontal face 810 opposite thereto. Further, each of the octagonal-shaped prisms 804A, 804B includes a medial front face 812 (e.g., AR coated) perpendicular to the medial horizontal face 808 and distal horizontal face 810, a medial back face 814 (e.g., high reflective (HR) coated) oblique to the medial horizontal face 808 and distal horizontal face 810, a distal front face 816 (e.g., HR coated) oblique to the medial horizontal face and/or distal horizontal face 810, a distal back face 818 (e.g., AR coated) perpendicular to the medial horizontal face 808 and/or distal horizontal face 810.

In this way, the medial front face 812 and distal back face 818 are perpendicular to provide an exit and/or entry of the optical signal into and out of the octagonal-shaped prism 804A, 804B. The medial back face 814 and distal front face 816 are oblique to provide internal reflection and routing of the optical signal through the octagonal-shaped prism 804A, 804B. For example, the optical signal enters the medial front face 812, is reflected off the medial back face 814, and then reflected off the distal front face 816, and then exits through the distal back face 818.

Accordingly, for example, the start of the first channel lane 420A of the first optical path 414A is horizontally offset from the end of the first channel lane 420A (e.g., such that the end of the first channel lane 420A is further from a center of the substrate 202 than the start of the first channel lane 420A). This is also applicable for the second, third, and fourth channel lanes 422A-426A, and for each of the second, third, and fourth optical paths 414B-414D (shown in FIGS. 4A-4E and omitted for purposes of illustrative clarity only). Offsetting the channel lanes 420A-426A minimizes the minimum depth required for the WDM optical assembly 800 (e.g., minimizes the distance between the channel collimators and the optical signal router 206 and/or WDM filters 208A-208D).

FIGS. 9A-9H are views of another exemplary embodiment of a WDM optical assembly 900. In particular, the WDM optical assembly 900 includes a first WDM port set 212A and a second WDM port set 212B. The first WDM port set 212A includes a first set WDM common port 216A on the upper side 204A of the substrate 202, and the second WDM port set 212B includes a second set WDM common port 216B on the lower side 204B of the substrate 202. Further, the first WDM port set 212A includes channel ports 218A-224A on the lower side 204B of the substrate 202, and the second WDM port set 212B includes channel ports 218B-224B on the lower side 204B of the substrate 202.

The WDM optical assembly 900 includes WDM filters 908A-908D on the upper side 204A of the substrate 202. The WDM filters 908A-908D are half as wide as the WDM filters 208A-208D of FIGS. 2A-2B and 4A-8D. Further, unlike the WDM optical assemblies of FIGS. 2A-2B and 4A-8D, the WDM filters 908A-908D are all positioned on the same side of the substrate 202. Further, the WDM optical assembly 900 includes a mirror 902 (e.g., a plurality of mirrors) on the upper side 204A of the substrate 202 positioned towards a back off the WDM optical assembly 900 such that the WDM filters 908A-908D are positioned between the mirror 902 and the optical signal router 206 (embodied as a trapezoidal-shaped prism 400). Further, the first and second set WDM common ports 216A, 216B are positioned at a back of the WDM optical assembly 900 such that the mirror 902 is positioned between the trapezoidal-shaped prism 400 and the first and second set WDM common ports 216A, 216B.

Accordingly, the lateral paths 418A, 418B of the first and second optical paths 414A, 414B are formed between the mirror and the WDM filters 908A, 908B. The channel lanes 420A-426B extend from the WDM filters 908A-908D to the upper oblique face 408A of the trapezoidal-shaped prism 400 to the lower oblique face 408B of the trapezoidal-shaped prism 400 to the channel ports 218A-224B. In this way, for example, a signal from the first set WDM common port 216A is demultiplexed on the upper side 204A of the substrate 202 before contacting the optical signal router 206.

Further, the WDM optical assembly 900 includes a common port router 903, the common port router 903 including a first quadrilateral prism 904A (also referred to as a left quadrilateral prism) and a second quadrilateral prism 904B (also referred to as a right quadrilateral prism). Each of the quadrilateral prisms 904A, 904B including a first base 906A and a second base 906B opposite the first base. Each quadrilateral prism 904A, 904B includes a medial surface 910A and a distal surface 910B opposite to the medial surface 910A. The medial surfaces 910A of the first and second quadrilateral prisms 904A, 904B proximate the mirror 902. Each of the quadrilateral prisms 904A, 904B including a perpendicular front face 912 (e.g., perpendicular to the medial and distal surfaces 910A, 910B), and an oblique back face 914 (e.g., oblique to the medial and distal surfaces 910A, 910B). Accordingly, the first and second set WDM common ports 216A, 216B can be aligned perpendicular to the broad face 406 of the trapezoidal-shaped prism 400, and the left and right quadrilateral prisms 904A, 904B redirect the optical signal to provide an angle (e.g., to form lateral paths 418A, 418B). For example, an optical signal from the first set WDM common port 216A enters the oblique back face 914 and exits the perpendicular front face 912 to the first WDM filter 908A.

Further, the WDM optical assembly 900 includes a channel port router 916, the common port router 916 including a left quadrilateral prism 918A and a right quadrilateral prism 918B. Each of the quadrilateral prisms 918A, 918B including a first base 920A and a second base 920B opposite the first base. Each quadrilateral prism 918A, 918B includes a medial surface 922A and a distal surface 922B opposite to the medial surface 922A. The medial surfaces 922A, 922B of the first and second quadrilateral prisms 918A, 918B are proximate each other. Each of the quadrilateral prisms 918A, 918B includes a perpendicular front face 924 (e.g., perpendicular to the medial and distal surfaces 922A, 922B), and an oblique back face 926 (e.g., oblique to the medial and distal surfaces 922A, 922B). Accordingly, the channel ports 218A-224B can be aligned perpendicular to the broad face 406 of the trapezoidal-shaped prism 400, and the left and right quadrilateral prisms 918A, 918B redirect the optical signal to provide an angle. For example, an optical signal redirected from the lower oblique face 408B of the trapezoidal-shaped prism 400 enters the perpendicular front face 924 and exits the oblique back face 926 to one of the channel ports 218A-224B.

Of course, the common port router 903 and the channel port router 916 could be omitted and the corresponding ports angled non-perpendicularly to the broad face 406 of the trapezoidal-shaped prism 400.

Figure 10A:
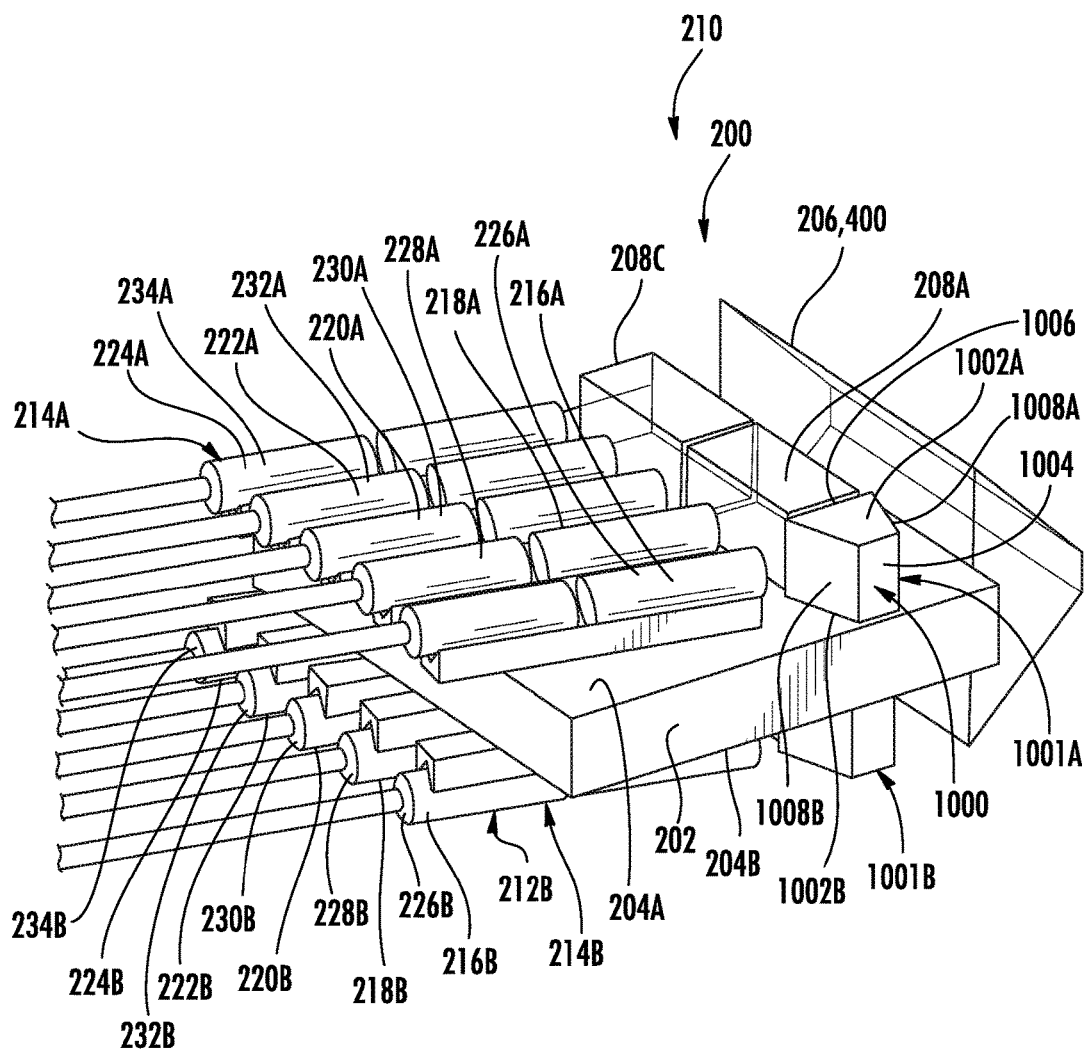
FIG. 10A is a perspective view of the WDM device of FIG. 2B.
Figure 10B:
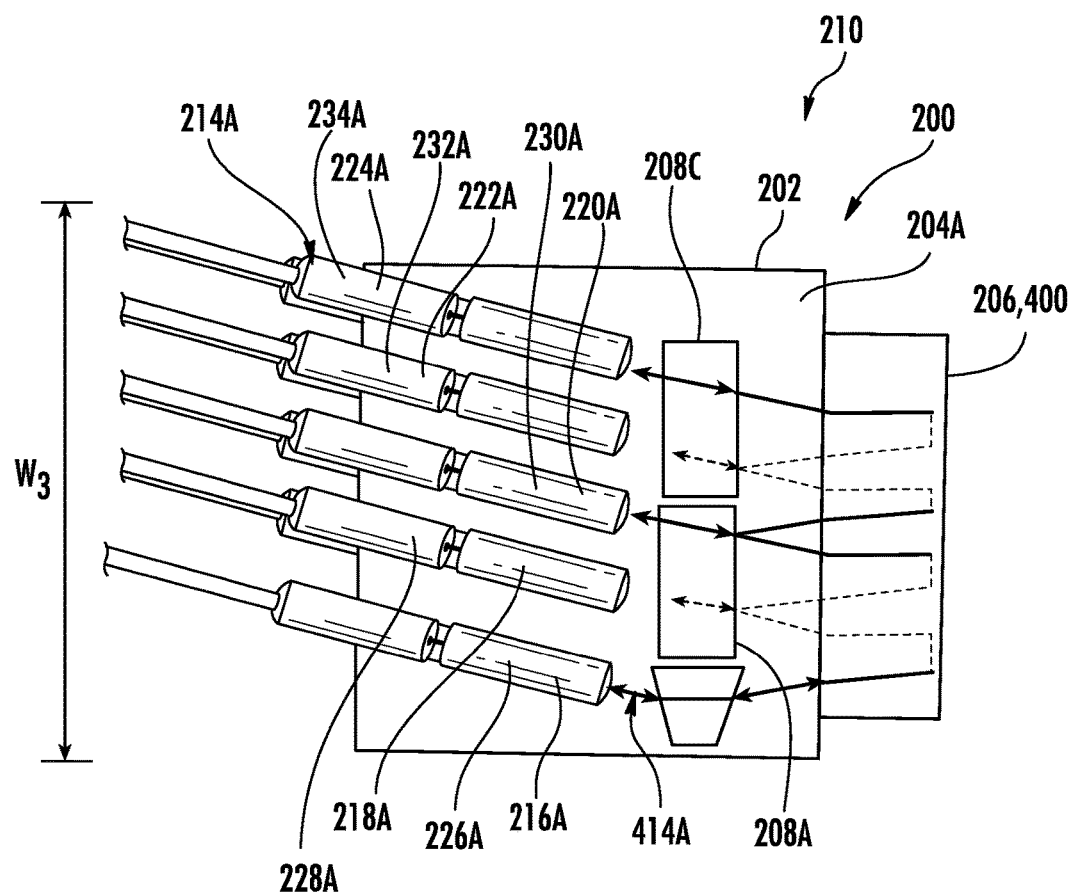
FIG. 10B is a top view of the WDM device of FIG. 10A illustrating a first optical path between a first common optical collimator of the first WDM collimator set and four channel collimators of the first WDM collimator set.

FIGS. 10A-10B are views of the WDM device of FIG. 2B. As discussed above, the WDM optical assembly 210 includes the WDM optical core subassembly 200 and first and second WDM collimator set 214A, 214B. Further, the WDM optical assembly 210 includes an optical signal router 1000, the optical signal router including an upper trapezoidal-shaped prism 1001A and a lower vertical trapezoidal-shaped prism 1001B. The upper trapezoidal-shaped prism 1001A includes a first base 1002A (also referred to as a medial base) and a second base 1002B (also referred to as a distal base) opposite the first base 1002A. Further, the trapezoidal-shaped prism 1001A, 1001B includes a plurality of faces 1004-1008B. In particular, each trapezoidal-shaped prism 1001A, 1001B includes a narrow face 1004, and a broad face 1006 opposite the narrow face 1004. Further, the trapezoidal-shaped prism 1001A, 1001B includes a first oblique face 1008A and second oblique face 1008B opposite the first oblique face 1008A. Accordingly, for example, an optical signal from the first set WDM common collimator 226A enters the first oblique face 1008A to the second oblique face 1008B to the trapezoidal-shaped prism 400. Thus, the trapezoidal-shaped prisms 1001A, 1001B bend the optical path such that the first set WDM common port 216A can be angularly aligned with the channel ports 228A-234B, which decreases the width ($W_3$) of the WDM optical assembly 210. However, the vertical trapezoidal-shaped prisms 1001A, 1001B could be omitted and the first and second set WDM common collimators 226A, 226B oppositely angled relative to the other collimators (e.g., but vertically aligned with each other).

Figure 11:
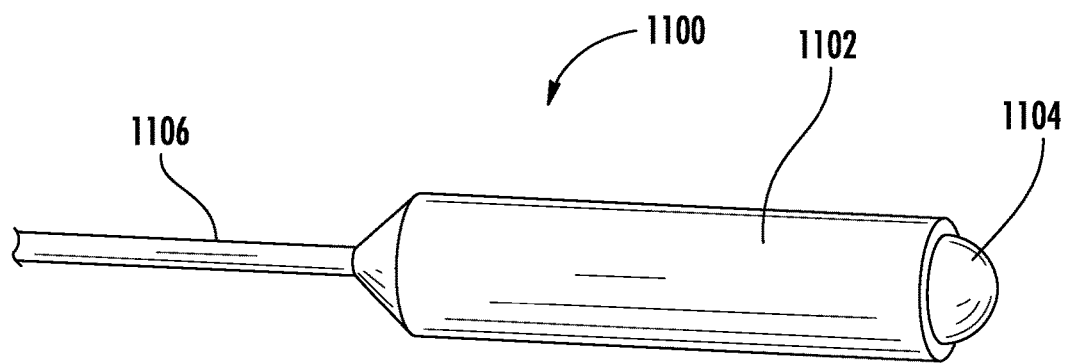
FIG. 11 is a perspective view of a steel-tube collimator for use with the WDM optical core assemblies and/or WDM devices of FIGS. 2A-10B.

FIG. 11 is a perspective view of a steel-tube collimator 1100 for use with the WDM optical core assemblies and/or WDM devices of FIGS. 2A-10B. The collimator narrows a beam of particles or waves. In other words, the collimator causes the directions of motion to become more aligned in a specific direction. The steel-tube collimator 1100 includes a steel-tube body 1102, with a curved lens 1104 at one end of the steel-tube body, and a fiber optic pigtail 1106 at an opposite end of the steel-tube body.

Figure 12A:
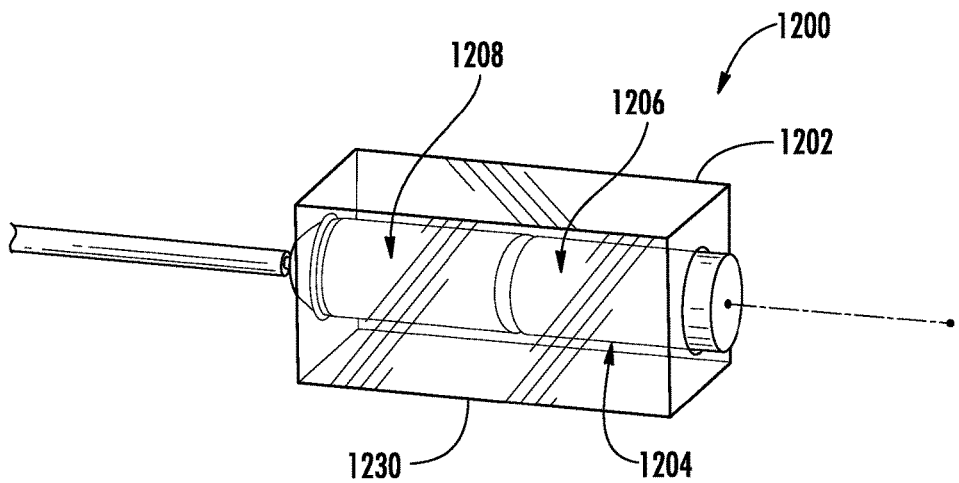
FIG. 12A is a perspective view of a square tube collimator for use with the WDM optical core assemblies and/or WDM devices of FIGS. 2A-10B.
Figure 12B:
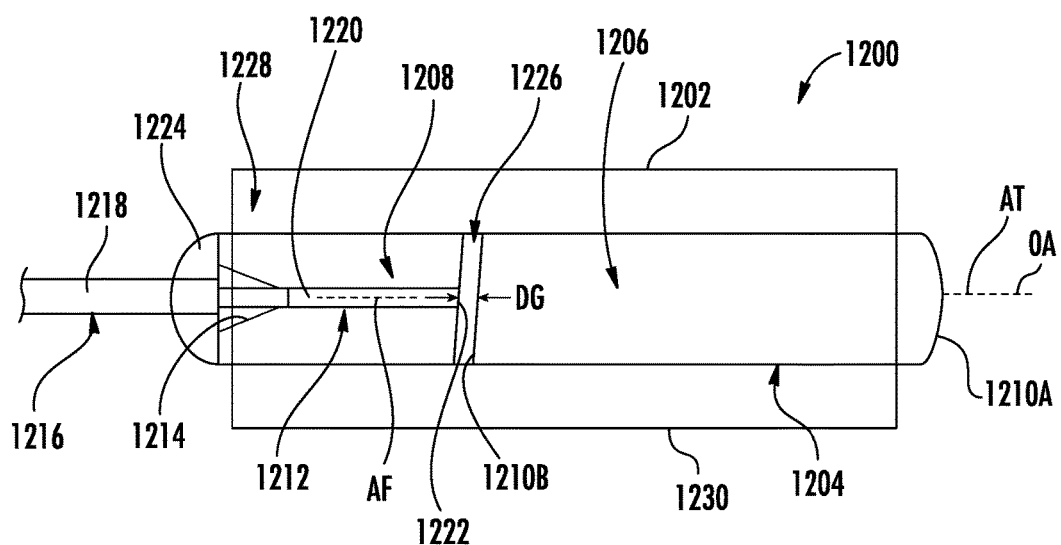
FIG. 12B is a cross-sectional side view of the square tube collimator of FIG. 12A.

FIGS. 12A-12B are perspective views of a square tube collimator for use with the WDM optical core assemblies and/or WDM devices of FIGS. 2A-10B. The square tube collimator 1200 includes a glass tube 1202 (e.g., cylindrical) with a central bore 1204. As used herein, the term "cylindrical" is used in its most general sense and can be defined as a three-dimensional object formed by taking a two-dimensional object and projecting it in a direction perpendicular to its surface. Thus, a cylinder, as the term is used herein, is not limited to having a circular cross-section shape but can have any cross-sectional shape, such as the square cross-sectional shape described below by way of example.

The square tube collimator further includes optical elements, such as a collimating lens 1206, ferrule 1208, etc., which can be secured to the glass tube 1202 using a securing mechanism (e.g., an adhesive). The collimating lens 1206 has a front surface 1210A and a back surface 1210B opposite thereto. In the example shown, the front surface 1210A is convex while the back surface 1210B can be an angled, e.g., in the x-z plane as shown. In an example, the front surface 1210A of collimating lens 1206 can reside outside of the central bore 1204, i.e., the front-end portion of the collimating lens 1206 can extend slightly past the front end of the glass tube 1202. In an example, the collimating lens 1206 can be formed as a gradient-index (GRIN) element that has a planar front surface 1210A. In an example, the collimating lens 1206 can consist of a single lens element while in another example it can consist of multiple lens elements. In the discussion below, the collimating lens 1206 is shown as a single lens element for ease of illustration and discussion.

The optical fiber support member is the form of a ferrule 1208. The ferrule 1208. The ferrule 1208 includes a central bore 1212 that runs between a front end and a back end along a ferrule central axis AF, which in an example is co-axial with the tube central axis AT of the glass tube 1202 and the optical axis OA as defined by the collimating lens 1206. The central bore 1212 can include a flared portion 1214 at the back end of the ferrule 1208.

An optical fiber 1216 has a coated portion 1218 and an end portion 1220 is bare glass (e.g., is stripped of the coated portion) and is thus referred to as the "bare glass portion." The bare glass portion 1220 includes a polished end face 1222 that defines a proximal end of the optical fiber. The bare glass portion 1220 of the optical fiber 1216 extends into the central bore 1212 of the ferrule 1208 at the back end of the ferrule. A securing element 1224 can be disposed around the optical fiber 1216 at the back end of the ferrule 1208 to secure the optical fiber to the ferrule. The front end of the ferrule 1208 is angled in the x-z plane and is axially spaced apart from the angled back end of the collimating lens to define a gap 1226 that has a corresponding axial gap distance DG.

The ferrule 1208, optical fiber 1216 and securing element 1224 constitute a fiber optic pigtail 1228, which can be said to reside at least partially within bore 1204 adjacent the back end of the glass tube 1202. Thus, in an example, the square tube collimator 1200 includes only the glass tube 1202, the collimating lens 1206 and the fiber optic pigtail 1228. The glass tube 1202 serves in one capacity as a small lens barrel that supports and protects the collimating lens 1206 and fiber optic pigtail 1228, particularly the bare glass portion 1220 and its polished end face 1222. The glass tube 1202 also serves in another capacity as a mounting member that allows for the square tube collimator 1200 to be mounted to a support substrate. In this capacity, at least one flat surface 1230 serves as a precision mounting surface.

In an example, the glass tube 1202, the collimating lens 1206 and the ferrule 1208 are all made of a glass material, and further in an example, are all made of the same glass material. Making the glass tube 1202, the collimating lens 1206 and the ferrule 1208 out of a glass material has the benefit that these components will have very close if not identical coefficients of thermal expansion (CTE). This feature is particular advantageous in environments that can experience large swings in temperature.

In an example, the optical elements used in micro-optical systems are sized to be slightly smaller than the diameter of the bore 1204 (e.g., by a few microns or tens of microns) so that the optical elements can be inserted into the bore 1204 and be movable within the bore 1204 to a select location. In an example, the select location is an axial position where optical element resides for the micro-optical system to have optimum or substantially optimum optical performance. Here, substantially optimum performance means performance that may not be optimum but that is within a performance or specification for the micro-optical system.

In another example, the optical elements have a clearance with respect to the bore 1204 in the range of a few microns (e.g., 2 microns or 3 microns) to tens of microns (e.g., 20 microns up to 50 microns). A relatively small value for the clearance allows for the optical elements 110 to be well-aligned with the central bore axis AB, e.g., to within a few microns (e.g., from 2 microns to 5 microns).

The optical elements and the support/positioning elements can be inserted into and moved within bore 1204 to their select locations using micro-positioning devices. The optical elements and the support/positioning elements can be secured within the bore 1204 using a number of securing techniques. One example securing technique uses a securing feature that is an adhesive (e.g., a curable epoxy). Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements can be secured within the bore 1204 using a securing feature and can also be supported and/or positioned using one or more support/positioning elements. The non-adhesive securing techniques described below allow for the micro-optical systems disclosed herein to remain free of adhesives so that, for example, micro-optical systems can consist of glass only.

Figure 13A:
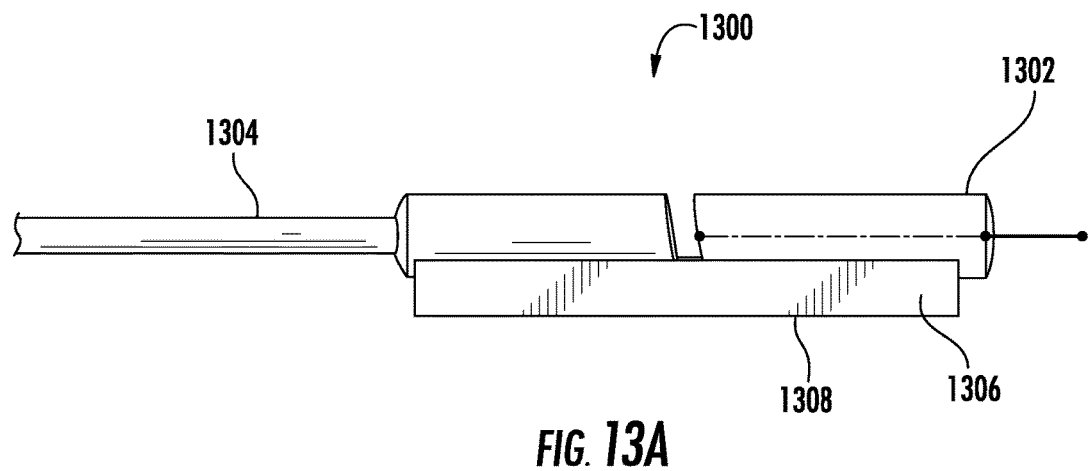
FIG. 13A is a perspective view of a compact collimator for use with the WDM optical core assemblies and/or WDM device of FIGS. 2A-10B.

FIG. 13A is a perspective view of a compact collimator for use with the WDM optical core assemblies and/or WDM device of FIGS. 2A-10B. The collimator 1300 includes a lens 1302 (e.g., a glass or silica collimating lens), a fiber optic pigtail 1304 and a groove (e.g., a generally V-shaped groove) formed in a base 1306. The lens 1302 and the fiber optic pigtail 1304 are disposed in the groove. The lens 1302 is configured to receive a light signal provided to the WDM multiplexer/demultiplexer from an external optical transmission system or provide a light signal multiplexed or demultiplexed by the WDM to an external optical transmission system. The lens 1302, for example, may be configured to receive a light signal from a fiber optic element for multiplexing or demultiplexing and/or to provide a multiplexed or demultiplexed light signal to an external fiber optic element. The fiber optic pigtail 1304 is optically coupled to the lens 1302 and is configured to provide a light signal to the lens 1302 from the external fiber optic element and/or to receive the light signal from the lens 1302 for transmission to the external fiber optic element.

In various embodiments, the lens 1302 and the fiber optic pigtail 1304 may or may not contact each other. The lens 1302 and the fiber optic pigtail 1304 may be securable to the groove independent of each other to allow for precise adjustment of a pointing angle between an optical beam from the collimator 1300 and a side and/or bottom surface of the groove. In addition, the lens 1302 and fiber optic pigtail 1304 may have the same outer diameter.

The base 1306 of the collimator 1300 has a generally flat bottom surface 1308 for mounting on a substrate of a WDM multiplexer/demultiplexer or other optical system. The base 1306 further includes a width that is less than a width of the lens 1302 and a width of the fiber optic pigtail 1304.

Figure 13B:
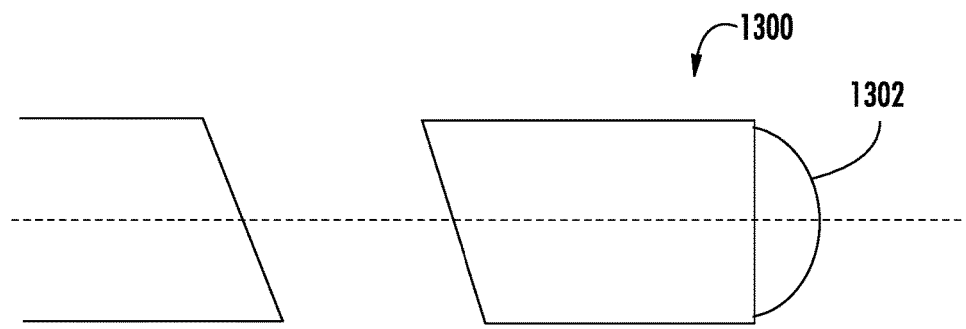
FIG. 13B is a side view of the compact collimator of FIG. 13A.

FIG. 13B is a side view of the compact collimator of FIG. 13A. A pointing angle between an optical beam from a collimator 1300 and the side and bottom surface of the groove can be eliminated (or at least reduced) by controlling the relative position between a lens 1302 and the fiber optic pigtail 1304 of the collimator 1300. By fine tuning the position of fiber optic pigtail 1304 to make an outgoing beam come across a focal point of the lens 1302, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination and more reliable bonding is possible due to the uniform epoxy or bonding agent. It is noted that 13B is a schematic illustration used to illustrate concepts of the description and that the ends of the glass lens and the fiber optic pigtail 1304 may be oriented at other angles, including perpendicular, to the body of the glass lens and the fiber optic pigtail, respectively.

The structures of the collimator 1300 allow for easier modularization and remove redundant degrees of freedom versus designs in which a collimator is coupled and attached to the substrate via external wedges or supports. Thus, the collimator 1300 may reduce the complexity and further increase the assembly efficiency and process reliability of the overall multiplexer/demultiplexer design.

Figure 14A:
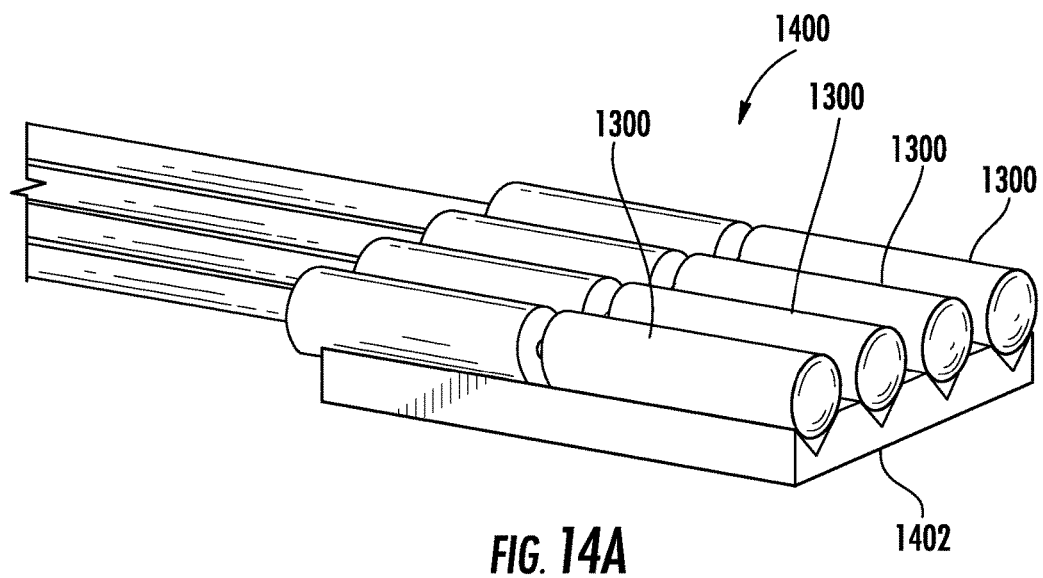
FIG. 14A is a perspective view of an array of the compact collimators of FIGS. 13A-13B.
Figure 14B:
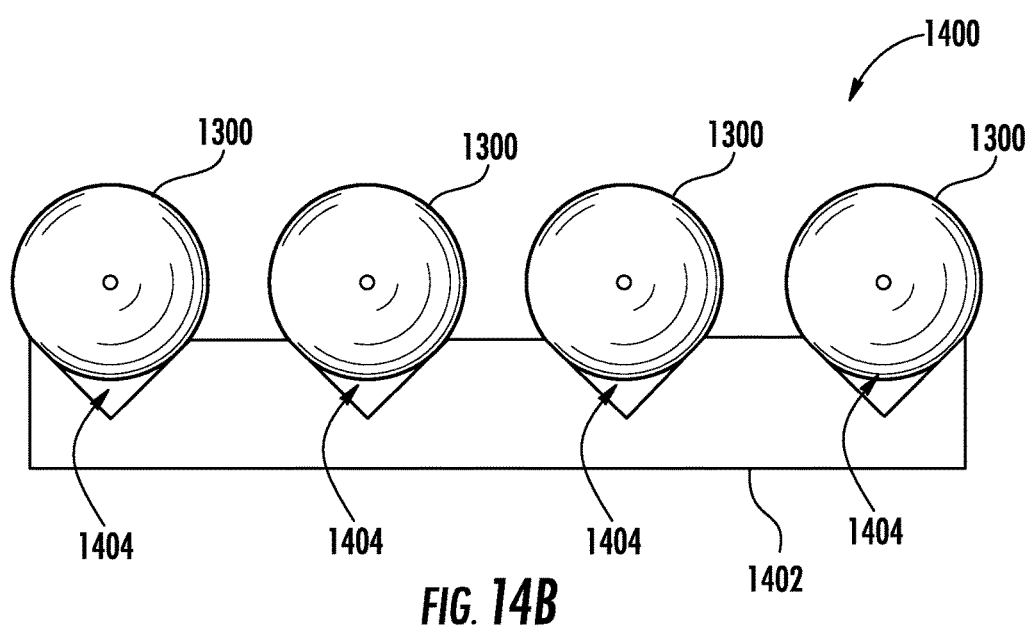
FIG. 14B is a front view of the array of compact collimators of FIG. 14A.

FIGS. 14A-14B are views of an array 1400 of the collimators 1300 of FIGS. 13A-13B. The collimators 1300 are arranged side-by-side on a surface of a substrate 1402, the substrate 1402 including a plurality of grooves 1404 (discussed above). The grooves 1404 could be v-grooves or any other type of groove. A spacing between the base 1306 of the side-by-side collimators 1300 is greater than a spacing between the lenses 1302 and fiber optic pigtails 1304 of the side-by-side collimators 1300.

Figure 15:
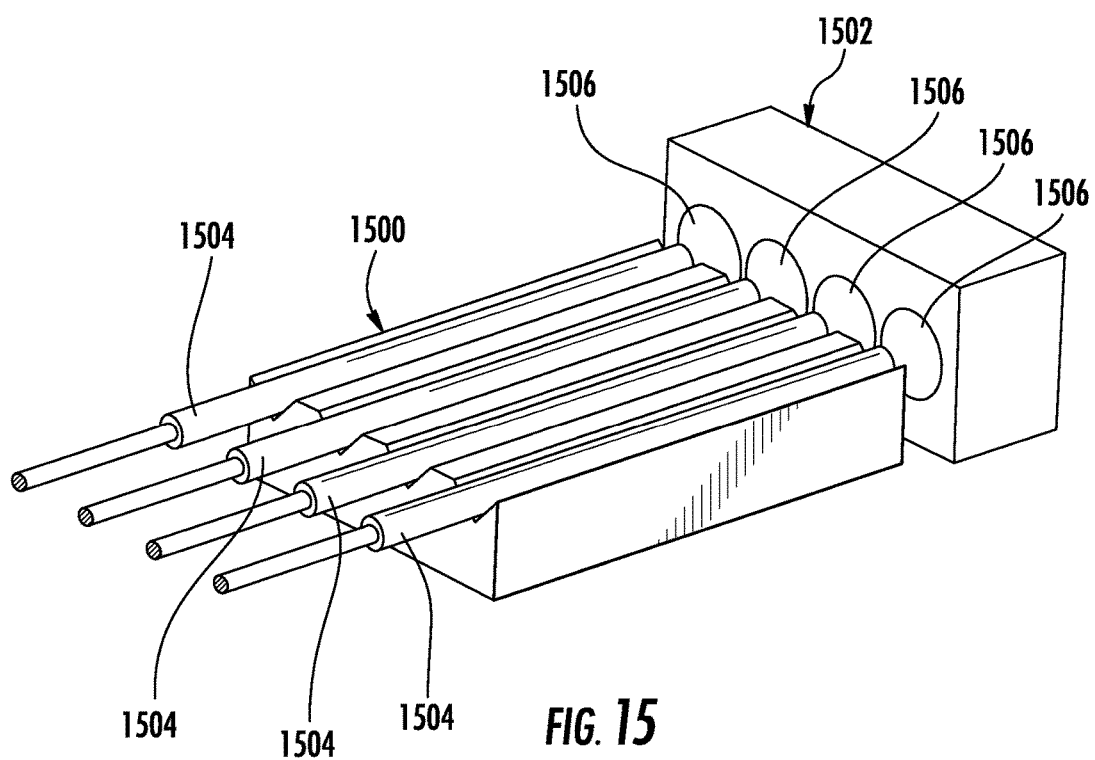
FIG. 15 is a perspective view of another exemplary embodiment of a fiber array unit (FAU) for use with the WDM optical core assemblies and/or WDM devices of FIGS. 2A-10B.

FIG. 15 is a perspective view of another exemplary embodiment of a fiber array unit (FAU) 1500 and multi-lens array (MLA) 1502 for use with the WDM optical core assemblies and/or WDM devices of FIGS. 2A-10B. More specifically, the FAU 1500 includes a plurality of fibers 1504 and the MLA 1502 includes a plurality of lenses 1506. The FAU 1500 and MLA 1502 can be used with any of the embodiments discussed above.

Figure 16:
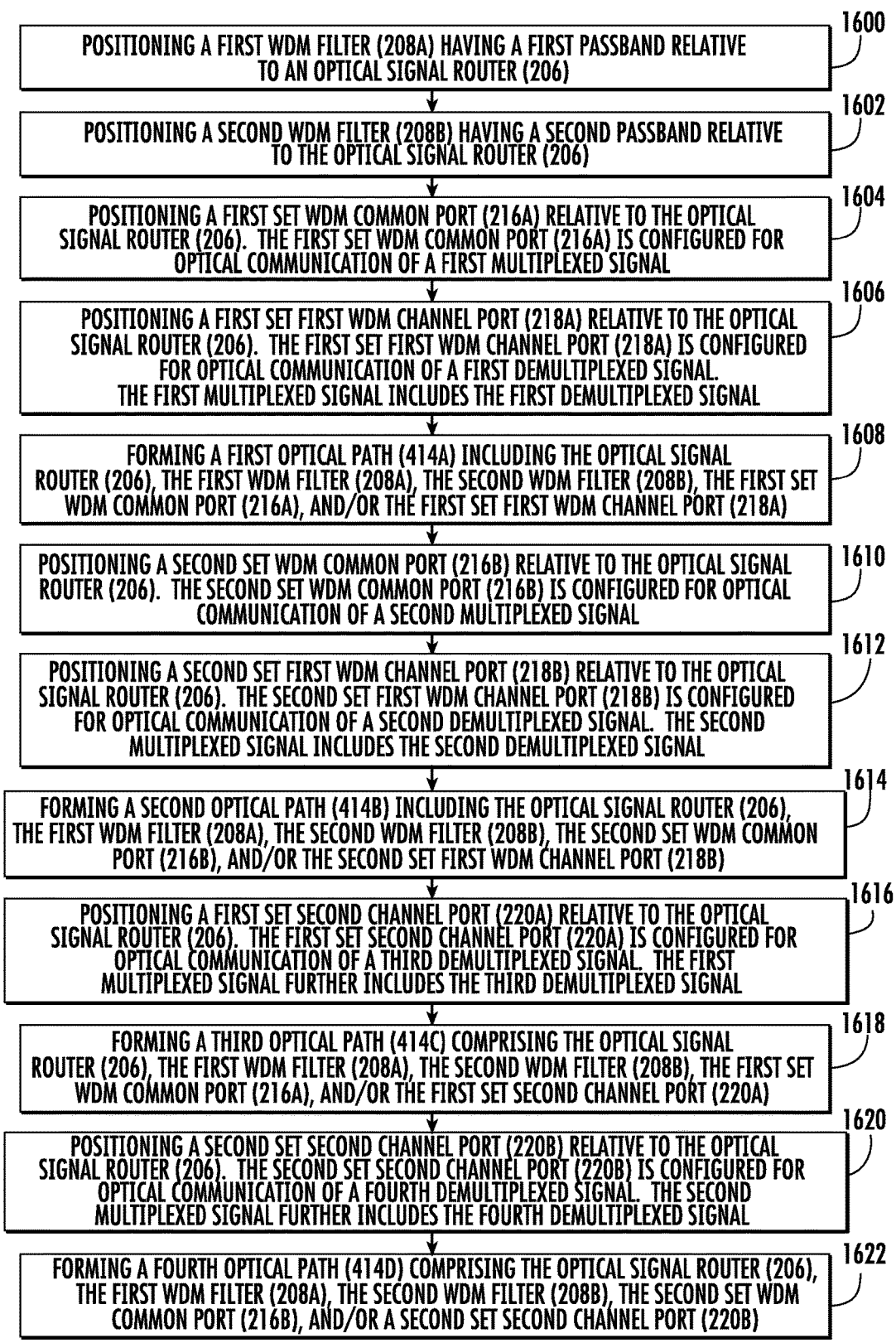
FIG. 16 is a flowchart illustrating an exemplary process that can be employed to manufacture a WDM optical core subassembly of FIGS. 2A-10B.

FIG. 16 is a flowchart illustrating an exemplary process that can be employed to manufacture a WDM optical core subassembly of FIGS. 2A-10B. Step 1600 includes positioning a first WDM filter 208A having a first passband relative to an optical signal router 206. Step 1602 includes positioning a second WDM filter 208B having a second passband relative to the optical signal router 206.

Step 1604 includes positioning a first set WDM common port 216A relative to the optical signal router 206. The first set WDM common port 216A is configured for optical communication of a first multiplexed signal. Step 1606 includes positioning a first set first WDM channel port 218A relative to the optical signal router 206. The first set first WDM channel port 218A is configured for optical communication of a first demultiplexed signal. The first multiplexed signal includes the first demultiplexed signal. Step 1608 includes forming a first optical path 414A including the optical signal router 206, the first WDM filter 208A, the second WDM filter 208B, the first set WDM common port 216A, and/or the first set first WDM channel port 218A.

Step 1610 includes positioning a second set WDM common port 216B relative to the optical signal router 206. The second set WDM common port 216B is configured for optical communication of a second multiplexed signal. Step 1612 includes positioning a second set first WDM channel port 218B relative to the optical signal router 206. The second set first WDM channel port 218B is configured for optical communication of a second demultiplexed signal. The second multiplexed signal includes the second demultiplexed signal. Step 1614 includes forming a second optical path 414B including the optical signal router 206, the first WDM filter 208A, the second WDM filter 208B, the second set WDM common port 216B, and/or the second set first WDM channel port 218B.

Step 1616 includes positioning a first set second channel port 220A relative to the optical signal router 206. The first set second channel port 220A is configured for optical communication of a third demultiplexed signal. The first multiplexed signal further includes the third demultiplexed signal. Step 1618 includes forming a third optical path 414C comprising the optical signal router 206, the first WDM filter 208A, the second WDM filter 208B, the first set WDM common port 216A, and/or the first set second channel port 220A.

Step 1620 includes positioning a second set second channel port 220B relative to the optical signal router 206. The second set second channel port 220B is configured for optical communication of a fourth demultiplexed signal. The second multiplexed signal further includes the fourth demultiplexed signal. Step 1622 includes forming a fourth optical path 414D comprising the optical signal router 206, the first WDM filter 208A, the second WDM filter 208B, the second set WDM common port 216B, and/or a second set second channel port 220B.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wavelength-division multiplexing (WDM) optical assembly, comprising:
   an optical signal router;
   a first WDM filter having a first passband;
   a first common port configured for optical communication of a first multiplexed signal;
   a first channel port configured for optical communication of a first demultiplexed signal, the first multiplexed signal comprising the first demultiplexed signal;
   a first optical path comprising the optical signal router, the first WDM filter, the first common port, and the first channel port;
   a second common port configured for optical communication of a second multiplexed signal;
   a second channel port configured for optical communication of a second demultiplexed signal, the second multiplexed signal comprising the second demultiplexed signal; and
   a second optical path comprising the optical signal router, the first WDM filter, the second common port, and the second channel port;
   wherein:
   the first WDM filter comprises a face having a first area and a second area;
   the first optical path comprises the first area of the first WDM filter; and
   the second optical path comprises the second area of the first WDM filter.

2. The WDM optical assembly of claim 1, wherein:
   the face of the first WDM filter has a width measured between a first end of the face and a second end of the face;
   the first optical path comprises a first lane between the first WDM filter and the first channel port;
   the second optical path comprises a second lane between the first WDM filter and the second channel port; and
   a pitch distance between the first lane and the second lane is less than half the width of the face of the first WDM filter.

3. The WDM optical assembly of claim 1, wherein the optical signal router comprises a trapezoidal-shaped prism, the trapezoidal-shaped prism in optical communication with the first common port and the second common port.

4. The WDM optical assembly of claim 1, further comprising a substrate having a first side and a second side opposite the first side, wherein:
   the first common port is mounted to the first side of the substrate; and
   the second common port is mounted to the second side of the substrate.

5. The WDM optical assembly of claim 1, further comprising a third common port, a third channel port, a fourth common port, a fourth channel port, a third optical path, and a fourth optical path, the third optical path comprising the optical signal router, the first WDM filter, the third common port, and the third channel port, and the fourth optical path comprising the optical signal router, the first WDM filter, the fourth common port, and the fourth channel port.

6. The WDM optical assembly of claim 1, further comprising a second WDM filter having a second passband, a third channel port, a fourth channel port, a third optical path, and a fourth optical path, the third optical path comprising the optical signal router, the second WDM filter, the first common port, and the third channel port, and the fourth optical path comprising the optical signal router, the second WDM filter, the second common port, and the fourth channel port.

7. The WDM optical assembly of claim 6, further comprising a third WDM filter having a third passband and a fourth WDM filter having a fourth passband, wherein the first optical path further comprises the third WDM filter and the fourth WDM filter.

8. A wavelength-division multiplexing (WDM) optical assembly, comprising:
   an optical signal router;
   a first WDM filter having a first passband;
   a second WDM filter having a second passband;
   a first common port configured for optical communication of a first multiplexed signal;

a second common port configured for optical communication of a second multiplexed signal;
a first optical path comprising the optical signal router, the first WDM filter, the second WDM filter, and the first common port; and
a second optical path comprising the optical signal router, the first WDM filter, the second WDM filter, and the second common port; and
a substrate having a first side and a second side opposite the first side, wherein the first common port is mounted to the first side of the substrate and the second common port is mounted to the second side of the substrate.

9. The WDM optical assembly of claim 8, wherein:
the first WDM filter comprises a face having a first area and a second area;
the first optical path comprises the first area of the first WDM filter; and
the second optical path comprises the second area of the first WDM filter.

10. The WDM optical assembly of claim 9, wherein:
the face of the first WDM filter has a width measured between a first end of the face and a second end of the face;
the first optical path comprises a first lane between the first WDM filter and the first channel port;
the second optical path comprises a second lane between the first WDM filter and the second channel port; and
a pitch distance between the first lane and the second lane is less than half the width of the face of the first WDM filter.

11. The WDM optical assembly of claim 8, wherein the optical signal router comprises a trapezoidal-shaped prism, the trapezoidal-shaped prism in optical communication with the first common port and the second common port.

12. The WDM optical assembly of claim 8, further comprising a third common port, a third optical path, a fourth common port, and a fourth optical path, wherein the third optical path comprises the optical signal router, the first WDM filter, the second WDM filter, and the third common port, and wherein the fourth optical path comprises the optical signal router, the first WDM filter, the second WDM filter, and the fourth common port.

13. A method of manufacturing a wavelength-division multiplexing (WDM) optical assembly, comprising:
positioning a first WDM filter having a first passband relative to an optical signal router;
positioning a first common port relative to the optical signal router, the first common port configured for optical communication of a first multiplexed signal;
positioning a first channel port relative to the optical signal router, the first channel port configured for optical communication of a first demultiplexed signal, the first multiplexed signal comprising the first demultiplexed signal;
forming a first optical path comprising the optical signal router, the first WDM filter, the first common port, and the first channel port;
positioning a second common port relative to the optical signal router, the second common port configured for optical communication of a second multiplexed signal;
positioning a second channel port relative to the optical signal router, the second channel port configured for optical communication of a second demultiplexed signal, the second multiplexed signal comprising the second demultiplexed signal;
forming a second optical path comprising the optical signal router, the first WDM filter, the second common port, and the second first channel port
mounting the first common port to a first side of a substrate; and
mounting the second common port to a second side of the substrate, wherein the first side of the substrate is opposite from the second side of the substrate.

14. The method of claim 13, further comprising:
positioning a second WDM filter having a second passband relative to the optical signal router;
positioning a third channel port relative to the optical signal router, the third channel port configured for optical communication of a third demultiplexed signal, the first multiplexed signal further comprising the third demultiplexed signal;
forming a third optical path comprising the optical signal router, the first WDM filter, the second WDM filter, the first common port, and the third channel port;
positioning a fourth channel port relative to the optical signal router, the fourth channel port configured for optical communication of a fourth demultiplexed signal, the second multiplexed signal further comprising the fourth demultiplexed signal; and
forming a fourth optical path comprising the optical signal router, the first WDM filter, the second WDM filter, the second common port, and the fourth channel port.

15. A method of manufacturing a wavelength-division multiplexing (WDM) optical assembly, comprising:
positioning a first WDM filter having a first passband relative to an optical signal router;
positioning a second WDM filter having a second passband relative to the optical signal router;
positioning a first common port relative to the optical signal router, the first common port configured for optical communication of a first multiplexed signal;
positioning a second common port relative to the optical signal router, the second common port configured for optical communication of a second multiplexed signal;
forming a first optical path comprising the optical signal router, the first WDM filter, the second WDM filter, and the first common port; and
forming a second optical path comprising the optical signal router, the first WDM filter, the second WDM filter, and the second common port;
mounting the first common port to a first side of a substrate; and
mounting the second common port to a second side of the substrate, wherein the first side of the substrate is opposite from the second side of the substrate.

16. A wavelength-division multiplexing (WDM) device, comprising:
a housing;
a first common collimator positioned within the housing and configured for optical communication of a first multiplexed signal;
a first common fiber optic pigtail operatively coupled to the first common collimator and extending from the housing;
a second common collimator positioned within the housing and configured for optical communication of a second multiplexed signal;
a second common fiber optic pigtail operatively coupled to the second common collimator and extending from the housing;

a first channel collimator positioned within the housing and configured for optical communication of a first demultiplexed signal;
a first channel fiber optic pigtail operatively coupled to the first channel collimator and extending from the housing;
a second channel collimator positioned within the housing and configured for optical communication of a second demultiplexed signal;
a second channel fiber optic pigtail operatively coupled to the second channel collimator and extending from the housing; and
a wavelength-division multiplexing (WDM) optical assembly positioned within the housing, the WDM optical assembly comprising:
an optical signal router;
a first WDM filter having a first passband; and
a first optical path comprising the optical signal router, the first WDM filter, the first common collimator, and the first channel collimator; and
a second optical path comprising the optical signal router, the first WDM filter, the second common collimator, and the second channel collimator.

17. A transceiver, comprising:
a housing;
a first common collimator positioned within the housing and configured for optical communication of a first multiplexed signal;
a second common collimator positioned within the housing and configured for optical communication of a second multiplexed signal;
a first channel collimator positioned within the housing and configured for optical communication of a first demultiplexed signal;
a second channel collimator positioned within the housing and configured for optical communication of a second demultiplexed signal; and
a wavelength-division multiplexing (WDM) optical assembly positioned within the housing, the WDM optical assembly comprising:
an optical signal router; and
a first WDM filter having a first passband;
a first optical path comprising the first common collimator and the first channel collimator; and
a second optical path comprising the second common collimator and the second channel collimator;
wherein the housing is configured for compliance with quad small form-factor pluggable (QSFP) standards.

18. The transceiver of claim 17, wherein the housing is configured for compliance with QSFP28 standards.

19. A wavelength-division multiplexing (WDM) optical assembly, comprising:
an optical signal router; and
a first WDM filter having a first passband, the first WDM filter optically positioned relative to the optical signal router to at least partially form:
a first optical path between a first common port configured for optical communication of a first multiplexed signal and a first channel port configured for optical communication of a first demultiplexed signal, the first multiplexed signal comprising the first demultiplexed signal; and
a second optical path between a second common port configured for optical communication of a second multiplexed signal and a second channel port configured for optical communication of a second demultiplexed signal, the second multiplexed signal comprising the second demultiplexed signal;
wherein the first WDM filter comprises a face having a first area disposed towards a first end of the face and a second area disposed towards a second end of the face opposite the first end, the first area of the first WDM filter defines the first optical path, and the second area of the first WDM filter defines the second optical path.

20. The WDM optical assembly of claim 19, wherein:
the first optical path comprises a first lane between the first WDM filter and the first channel port;
the second optical path comprises a second lane between the first WDM filter and the second channel port; and
a pitch distance between the first lane and the second lane is less than half a width of the face of the first WDM filter.

* * * * *